US009606786B2

(12) United States Patent
Takeuchi

(10) Patent No.: US 9,606,786 B2
(45) Date of Patent: Mar. 28, 2017

(54) INFORMATION PROCESSING APPARATUS, INFORMATION PROCESSING METHOD, AND PROGRAM

(75) Inventor: Yasuo Takeuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 574 days.

(21) Appl. No.: 13/164,381

(22) Filed: Jun. 20, 2011

(65) Prior Publication Data

US 2011/0320557 A1 Dec. 29, 2011

(30) Foreign Application Priority Data

Jun. 28, 2010 (JP) ................. 2010-145734

(51) Int. Cl.
| G06F 15/167 | (2006.01) |
| G06F 9/445 | (2006.01) |
| H04W 4/00 | (2009.01) |
| H04W 92/08 | (2009.01) |
| H04L 29/06 | (2006.01) |

(52) U.S. Cl.
CPC ............... *G06F 8/61* (2013.01); *H04W 4/00* (2013.01); *H04L 69/18* (2013.01); *H04W 92/08* (2013.01)

(58) Field of Classification Search
CPC ............... H04L 29/06; H04L 29/08072; H04L 29/08549
See application file for complete search history.

(56) References Cited

U.S. PATENT DOCUMENTS

| 6,629,166 | B1 * | 9/2003 | Grun ................. G06F 13/128 703/25 |
| 2004/0186918 | A1 | 9/2004 | Lonnfors et al. |
| 2004/0200903 | A1 * | 10/2004 | Ohya et al. ................ 235/492 |
| 2009/0182919 | A1 * | 7/2009 | Chang ............... G06F 13/4291 710/106 |
| 2009/0265722 | A1 * | 10/2009 | Lu ......................... G06F 21/57 719/327 |
| 2009/0307142 | A1 * | 12/2009 | Mardikar .................... 705/72 |
| 2010/0029202 | A1 * | 2/2010 | Jolivet et al. ............. 455/41.1 |
| 2010/0088188 | A1 * | 4/2010 | Kumar et al. ................ 705/17 |
| 2010/0190475 | A1 * | 7/2010 | El-Kadri et al. ......... 455/412.2 |
| 2011/0183611 | A1 * | 7/2011 | Wane ...................... 455/41.1 |
| 2012/0159195 | A1 * | 6/2012 | von Behren et al. ...... 713/193 |
| 2012/0220322 | A1 * | 8/2012 | Klassen et al. ............ 455/466 |

FOREIGN PATENT DOCUMENTS

| JP | 2001-143023 | 5/2001 |
| JP | 2004-139244 | 5/2004 |

(Continued)

OTHER PUBLICATIONS

Extended European Search Report issued Oct. 25, 2011, in Patent Application No. 11170476.3.

(Continued)

*Primary Examiner* — Philip Chea
*Assistant Examiner* — Van Kim T Nguyen
(74) *Attorney, Agent, or Firm* — Chip Law Group

(57) ABSTRACT

An information-processing apparatus includes a communication unit that transmits a first command to register in a memory a service provided by an application using a first communicative method. The communication unit transmits a second command to register in the memory a service indicator of the service using a second communicative method different from the first communicative method.

18 Claims, 31 Drawing Sheets

(56) References Cited

FOREIGN PATENT DOCUMENTS

| JP | 2005-136476 | 5/2005 |
| JP | 2006-99721 | 4/2006 |
| WO | WO 2009/022333 A2 | 2/2009 |

OTHER PUBLICATIONS

Vincent Alimi, et al., "Post-distribution provisioning and personalization of a payment application on a UICC-based Secure Element", International Conference on Availability, Reliability and Security, XP 31469274, 2009, pp. 701-705.
Gerald Madlmayr, et al., "The benefit of using SIM application toolkit in the context of near field communication applications", International Conference on the Management of Mobile Business, XP 2661358, 2007, 8 pages.
Gerald Madlmayr, et al., "Near Field Communication: State of Standardization", First International Conference on the Internet of Things, http://www.the-internet-of-things.org/iot2008/adjunctproceedings.pdf, XP 2661359, 2008, pp. 10-15.
U.S. Appl. No. 13/156,652, filed Jun. 9, 2011, Takeuchi.
U.S. Appl. No. 14/163,604, filed Jan. 24, 2014, Takeuchi.
Office Action mailed Jan. 7, 2014, in Japanese Patent Application No. 2010-145734.
Combined Chinese Office Action and Search Report issued May 15, 2014 in Patent Application No. 201110167256.8 with English Translation.

\* cited by examiner

FIG. 10

| | COMMUNICATION PATH | SUPPORTED PROTOCOL | TRANSMISSION AVAILABLE PACKET (SUPPORTED PROTOCOL) | UTILIZATION PURPOSE |
|---|---|---|---|---|
| 1 | FIRST COMMUNICATION METHOD (Type A) | 14443-1 TO 14443-3 Type A | UNIQUE PACKET | UNIQUE COMMAND |
| | | | GENERAL FORMAT (14443-4) | APDU COMMAND |
| 2 | SECOND COMMUNICATION METHOD (Type B) | 14443-1 TO 14443-3 (Type B) | GENERAL FORMAT (14443-4) | APDU COMMAND |
| 3 | THIRD COMMUNICATION METHOD (Type F) | 18092 | UNIQUE PACKET | FeliCa COMMAND |
| | | | GENERAL FORMAT (14443-4) | APDU COMMAND |
| 4 | WIRED COMMUNICATION METHOD | SERIAL | WIRED UNIQUE PACKET | FeliCa COMMAND |
| | | | TPDU (7816-3) T = 0/1 | APDU COMMAND |

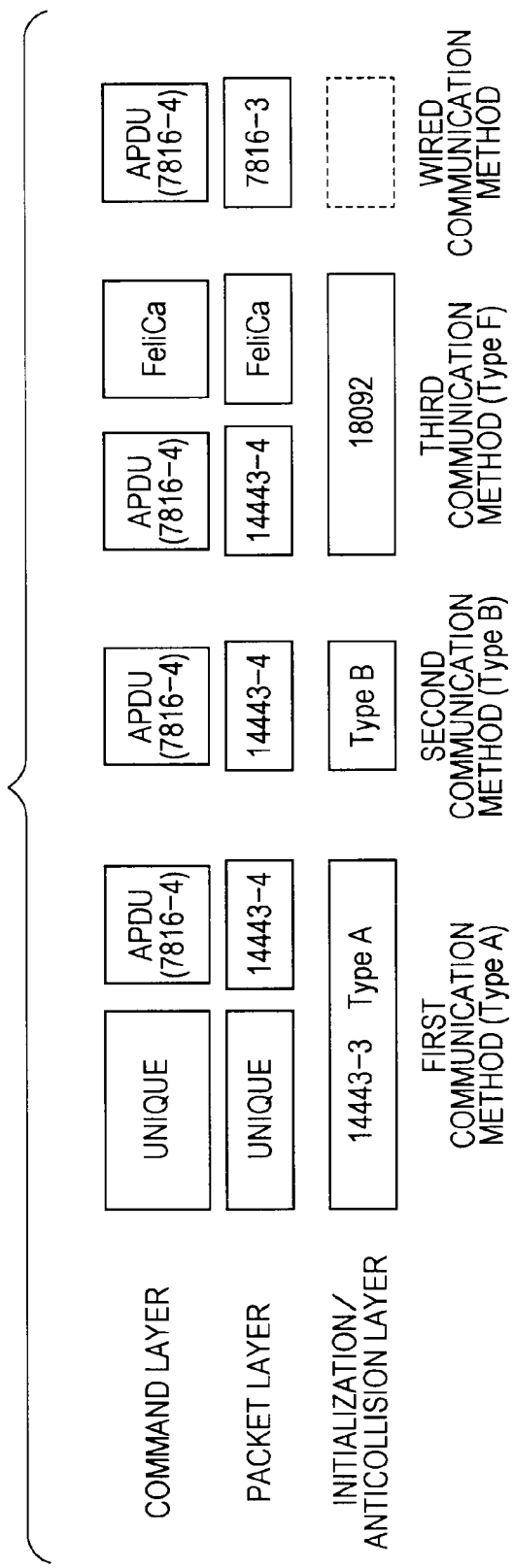

FIG. 25

| NUMBER | UTILIZED COMMUNICATION METHOD | TRANSMISSION AVAILABLE PACKET | UTILIZED ISSUANCE METHOD | ISSUANCE CONTENT (INFORMATION UPDATE + SERVICE REGISTRATION) |
|---|---|---|---|---|
| 1 | FIRST COMMUNICATION METHOD OR SECOND COMMUNICATION METHOD | GENERAL PACKET | APDU COMMAND | THIRD COMMAND WRAPPED WITH APDU COMMAND FORMAT + APDU COMMAND |
| 2 | THIRD COMMUNICATION METHOD | GENERAL PACKET INCLUDED IN THIRD PACKET + THIRD PACKET | APDU COMMAND + THIRD COMMAND | THIRD COMMAND + APDU COMMAND OR NO. 1 ABOVE |
| 3 | FIRST AND THIRD COMMUNICATION METHODS OR SECOND AND THIRD COMMUNICATION METHODS | GENERAL PACKET + THIRD PACKET | APDU COMMAND + THIRD COMMAND | NO. 1 OR NO. 2 ABOVE |
| 4 | WIRED COMMUNICATION METHOD (UART) | GENERAL PACKET FOR CONTACT | APDU COMMAND | THIRD COMMAND WRAPPED WITH APDU COMMAND FORMAT + APDU COMMAND |
| 5 | | GENERAL PACKET FOR CONTACT + WIRED PROTOCOL | APDU COMMAND + THIRD COMMAND | THIRD COMMAND + APDU COMMAND OR NO. 4 ABOVE |
| 6 | | WIRED PROTOCOL | THIRD COMMAND | UPDATE THROUGH APPLICATION |
| 7 | THIRD COMMUNICATION METHOD | THIRD PACKET | | |

INFORMATION PROCESSING APPARATUS, INFORMATION PROCESSING METHOD, AND PROGRAM

BACKGROUND

The present disclosure relates to information processing apparatuses, information processing methods, and programs, and particularly relate to an information processing apparatus suitably used when data managed in a chip or a card which supports a plurality of communication protocols is updated, an information processing method, and a program.

In recent years, cellular phones have been broadly used and various services are provided through cellular phones. Referring to FIG. 1A, a cellular phone 11 includes a chip 12 which includes services 13-1 and 13-2 written therein. Furthermore, the service 13-1 is provided for a user using an application 14-1 whereas the service 13-2 is provided for a user using an application 14-2.

An application corresponds to a series of executable modules which are written in software included in a cellular phone and is different from a service written in a chip. Cellular phones which are based on an MIDP 2.0 standard as disclosed in "Mobile Information Device Profile for Java™ 2 Micro Edition (JSR118)" include AMS (Application Management Software) whereas cellular phones which are based on an MIDP 1.0 standard as disclosed in "Mobile Information Device Profile (JSR-37) JCP Specification Java 2 Platform, Micro Edition, 1.0a" include a JAM (Java Application Manager) having a function similar to a function of the AMS. The AMS and the JAM perform management of applications included in the cellular phones. Note that the term "management" means maintenance of transition in a series of states including a downloading state, an installing state, and a deleting state of an application.

Application management software 15 manages information representing that the application 14-1 has been installed in the cellular phone and manages information representing that the application 14-1 has generated the service 13-1 in the chip so that the information is associated with the application 14-1. Similarly, the application management software 15 manages information representing that the application 14-2 has been installed in the cellular phone and manages information representing that the application 14-2 has generated the service 13-2 in the chip so that the information is associated with the application 14-2. For example, when the application 14-2 is to be deleted, the application management software 15 should perform a process of deleting the service 13-2 which is associated with the application 14-2 in advance.

Referring now to FIG. 1B, a case where the user changes the cellular phone 11 to a cellular phone 31 is taken as an example. For example, when the user purchases the cellular phone 31, a service to transfer data which has been included in the cellular phone 11 to the cellular phone 31 is performed in a shop where the user purchases the cellular phone 31. The services 13-1 and 13-2 stored in the chip 12 of the cellular phone 11 are transferred to a chip 32 included in the cellular phone 31. (The services 13-1 and 13-2 are simply referred to as a service 13 when it is not necessary to distinguish the services 13-1 and 13-2 from each other, and the same is true for the other components). Furthermore, information included in the application management software 15 is also transferred to application management software 33. However, the application 14 which is not managed by the chip 12 is not transferred to the cellular phone 31.

When the application management software 33 included in the cellular phone 31 has the service 13 but does not have the application 14 corresponding to the service 13, the application management software 33 displays a message prompting the user to download the application 14 corresponding to the service 13 on a display of the cellular phone 31. After the user downloads the application 14 in response to the message, the service 13 becomes available also in the new cellular phone 31.

SUMMARY

Although the chip 12 manages the service 13 and the application management software 15 (33) associates the service 13 with the application 14 as described above, the service 13 may be stored and managed in a UICC (Universal Integrated Circuit Card). It is preferable that, as shown in FIG. 2A, in a state in which a UICC 51 included in the cellular phone 11 stores the service 13, when the UICC 51 is detached from the cellular phone 11 and is attached to the other cellular phone 31, the service 13 is used in the cellular phone 31.

In this case, the service 13 stored in the UICC 51 is transferred to the cellular phone 31 to which the UICC 51 is inserted. However, the information on the application management software 15 is not transferred to the application management software 33. As a result, a process performed using the application management software 15 may not be performed using the application management software 33, and accordingly, the service 13 stored in the UICC 51 may not be available.

Therefore, as shown in FIG. 2B, the cellular phone 11 may include a viewer 71. The viewer 71 is included in all cellular phones and is used to view services managed by the UICC 51. For example, when the UICC 51 is detached from the cellular phone 11 and attached to the cellular phone 31 having the viewer 71, the services managed by the UICC 51 are viewable using the viewer 71.

Furthermore, when the service 13 is managed but an application corresponding to the service 13 does not exist, for example, the viewer 71 may have a function of displaying a message prompting the user to download the application.

The UICC 51 has a configuration illustrated in FIG. 3, for example. An application manager 102 included in the UICC is disposed on a UICC hardware 101, and applications 103 to 105 are managed on the application manager 102. The application 103 offers a service which realizes a function as a credit card, for example. The application 104 offers a transportation service including a payment of a fee for transportation, for example.

In the application manager 102 included in the UICC, when a Java Card™ disclosed by Sun Microsystems (trademark) is used as an execution environment, for example, Installer controls an application installing/deleting function and an integrated application management function is realized using management information in a registry and an authentication method which are standardized by Global Platform.

The application 105 offers a total service and specifically offers services 106-1 to 106-3. For example, the service 106-1 realizes a function as a credit card, the service 106-2 offers a function of transportation, and the service 106-3 offers coupons.

When the applications managed in the UICC 51 are viewed using the viewer 71 in a state in which the applications have been registered, display is performed as shown in FIG. 4, for example. A service name "service 103" representing the service provided by the application 103 and a service name "service 104" representing the service provided by the application 104 are displayed for the user using the viewer 71 so that the applications 103 to 105 are recognized. Although the application 105 provides the plurality of services, a service name "service 105" is provided for the user as a generic term.

As described above, although the application 105 offers the services 106-1 to 106-3, the viewer 71 recognizes only the applications 103 to 105 which have been registered in the application manager 102 of the UICC. That is, the services 106-1 to 106-3 which are provided by the application 105 are not recognized, and accordingly, information on the services 106-1 to 106-3 is not displayed for the user.

It is desirable to reliably view, using a viewer, information included in an apparatus such as a UICC which manages certain information and perform update of the information using an existing infrastructure.

In a first inventive aspect, an information-processing apparatus includes a communication unit that transmits a first command to register in a memory a service provided by an application using a first communicative method, wherein the communication unit transmits a second command to register in the memory a service indicator of the service using a second communicative method different from the first communicative method.

The communication unit can receive a first packet in the first communicative method and transmit a response to the first packet, and the communication unit can receive a second packet in the first communicative method and not transmit a response to the second packet.

The communication unit can receive a packet in the second communicative method and transmit a response to the packet.

The communication unit can receive, before receiving the first packet, a third packet in a third communicative method different from the first and second communicative methods and not transmit a response to the third packet.

The communication unit can receive, before receiving the first packet, a third packet in a third communicative method different from the first and second communicative methods and transmit a response to the third packet, and the communication unit can receive a fourth packet in the third communicative method and not transmit a response to the fourth packet.

The communication unit can receive, after receiving the first packet and before receiving the second packet, a third packet in a third communicative method different from the first and second communicative methods and not transmit a response to the third packet.

The communication unit can receive a request in the first communicative method from an other information-processing apparatus, the communication unit can transmit the request to the application, and the communication unit can receive from the application, in response to the request, data indicating whether the service has been registered in the memory.

The communication unit can receive from an other information-processing apparatus a packet unique to the application in the first communicative method and indicating the first command, and the communication unit can transmit the first command to the application to register the service.

The communication unit can communicate with the application through an application manager.

The communication unit can receive from the other information-processing apparatus a request to select the second communicative method, the communication unit can receive a packet conforming to the second communicative method and including the service indicator, and the communication unit can transmit the second command in response to receiving the packet including the service indicator to the application manager to register the service indicator.

The packet including the service indicator can conform to an APDU command format.

The first command can be wrapped with an APDU command format.

The application can be installed through the application manager using an APDU command.

The first command can be supplied to the application without passing through the application manager.

The communication unit can receive the packet via a noncontact communication with the other information-processing apparatus.

The information-processing apparatus can include a viewer that views the service indicator of the service.

In another inventive aspect, a method is implemented by an information-processing apparatus, the method including transmitting a first command to register in a memory a service provided by an application using a first communicative method; and transmitting, with the information-processing apparatus, a second command to register in the memory a service indicator of the service using a second communicative method different from the first communicative method.

In yet another inventive aspect, a card includes a storage unit that stores an application, and an interface that transmits a first command to register in the storage unit a service provided by the application using the first command conforming to a first communicative protocol of the application. The storage unit is configured to register a service indicator of the service using a second command conforming to a second communicative protocol different from the first communicative protocol of the application.

Accordingly, a viewer which is used in different apparatuses may be used to view information included in the apparatus which manages the information. Thus, content of information is reliably viewed.

Accordingly, the information included in the apparatus which manages the information may be updated using an existing infrastructure.

BRIEF DESCRIPTION OF THE DRAWINGS

FIG. 10 is a diagram illustrating the relationships among communication methods, packets, and commands;

FIG. 11 is a diagram illustrating layers of the communication methods;

FIG. 25 is a diagram illustrating the relationships among communication methods, packets, and commands;

DETAILED DESCRIPTION OF EMBODIMENTS

Exemplary embodiments of the present disclosure will be described hereinafter with reference to the accompanying drawings.

System

Figure 1A:
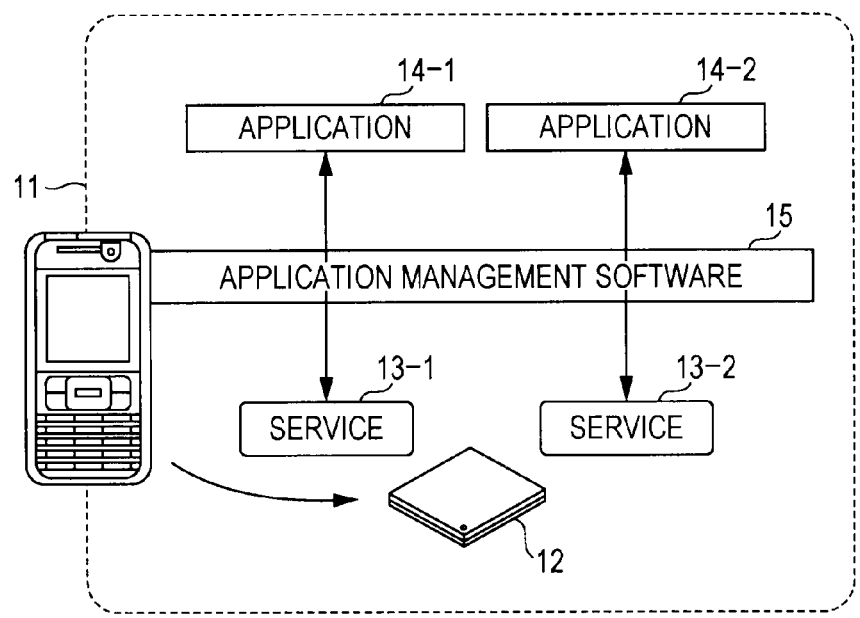
FIGS. 1A and 1B are diagrams illustrating service transfer of cellular phones in the related art.
Figure 1B:
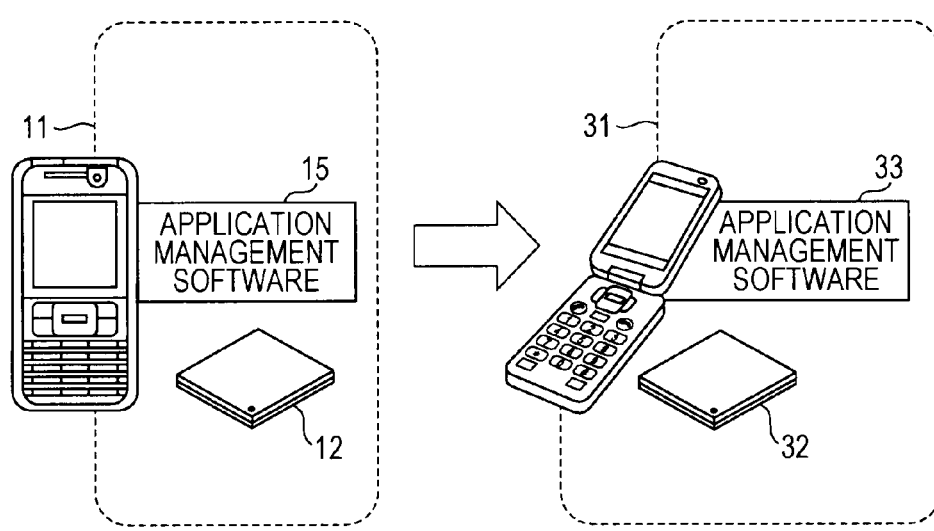
Figure 2A:
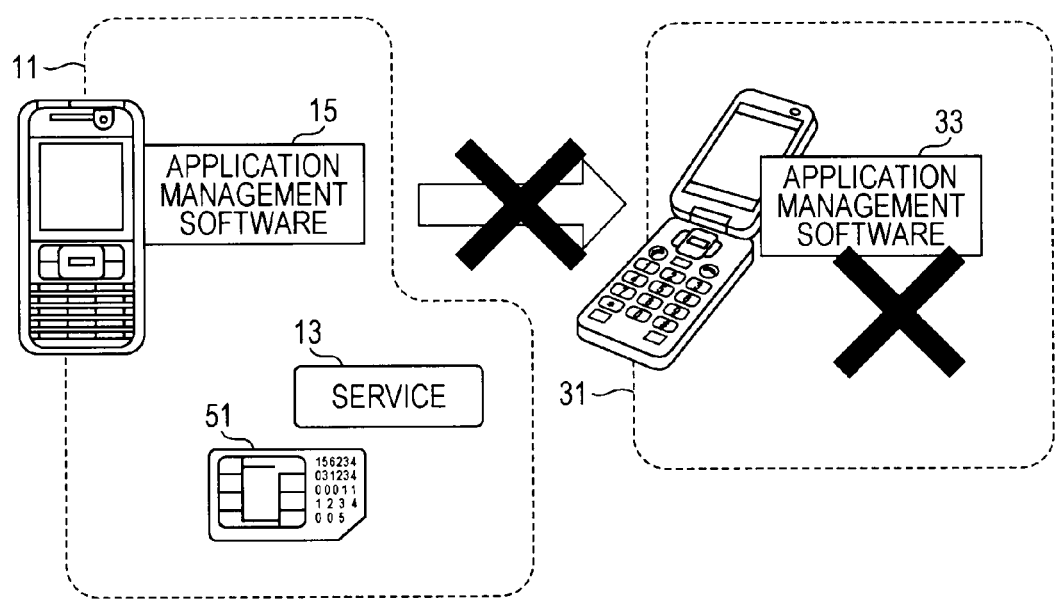
FIGS. 2A and 2B are diagrams illustrating service transfer using a UICC.
Figure 2B:
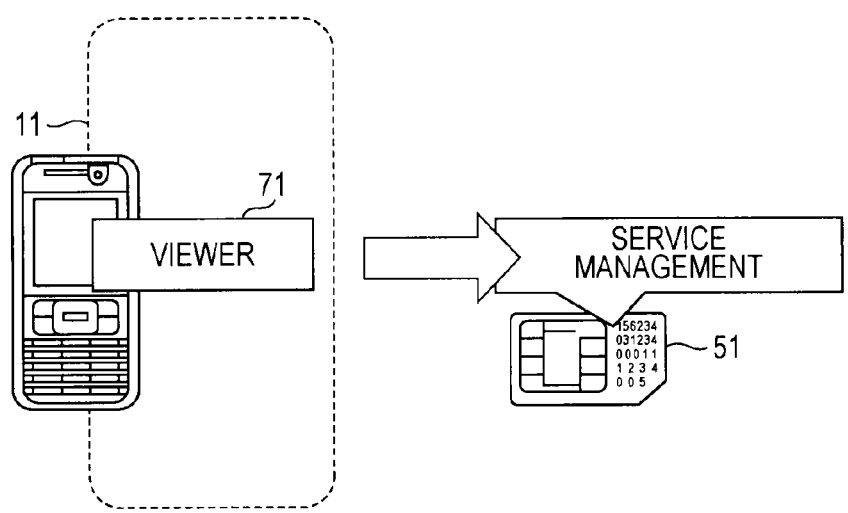
Figure 3:
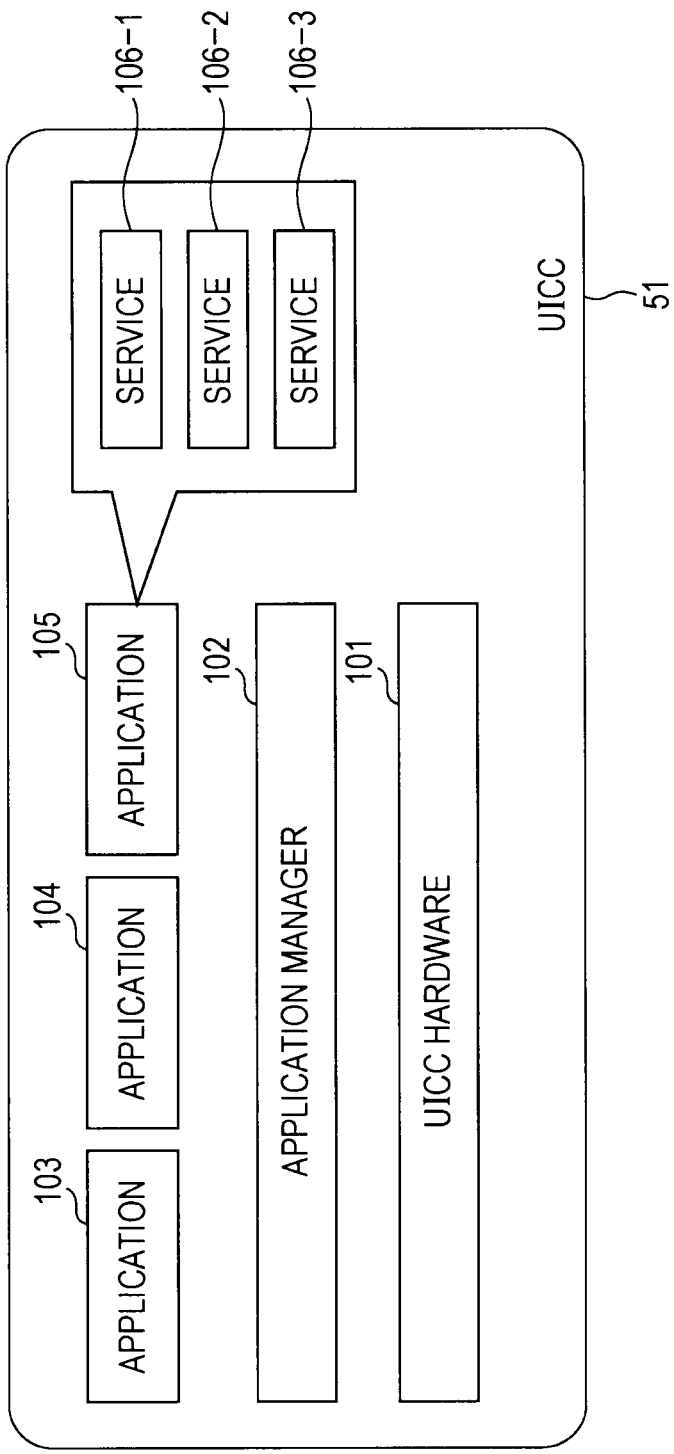
FIG. 3 is a diagram illustrating service registration in the UICC.
Figure 4:
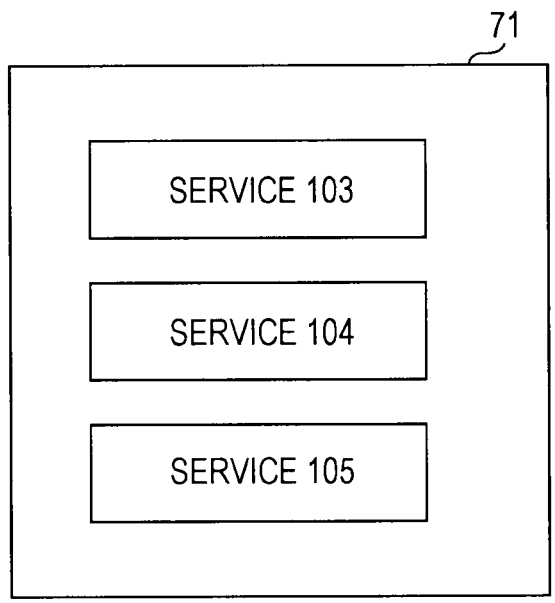
FIG. 4 is a diagram illustrating a screen displayed through a process performed by a viewer.
Figure 5:
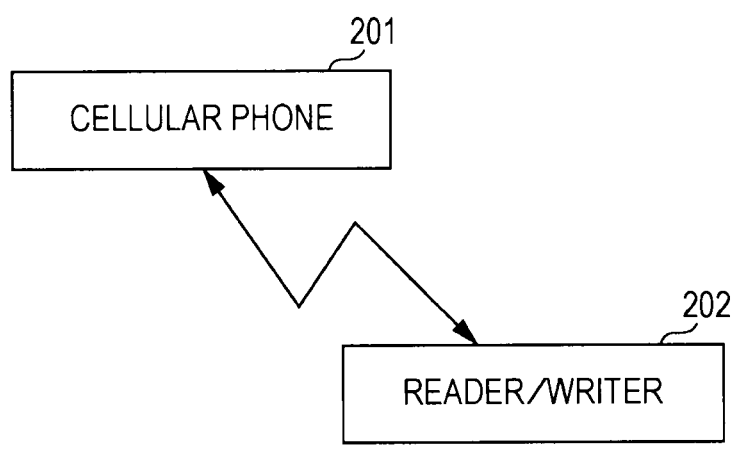
FIG. 5 is a diagram illustrating a configuration of a system according to an embodiment to which aspects of the present disclosure are applied.

FIG. 5 is a diagram illustrating a configuration of a system according to an embodiment to which aspects of the present disclosure are applied. The system shown in FIG. 5 includes a cellular phone 201 and a reader/writer 202. The cellular phone 201 and the reader/writer 202 perform noncontact communication with each other. That is, the reader/writer 202 is a means for performing noncontact communication with the cellular phone 201. Here, the description is made using the cellular phone 201 as an example, and aspects of the present disclosure are applicable to an IC card, for example, which communicates with the reader/writer 202 and which stores data.

Configuration of Cellular Phone 201

Figure 6:
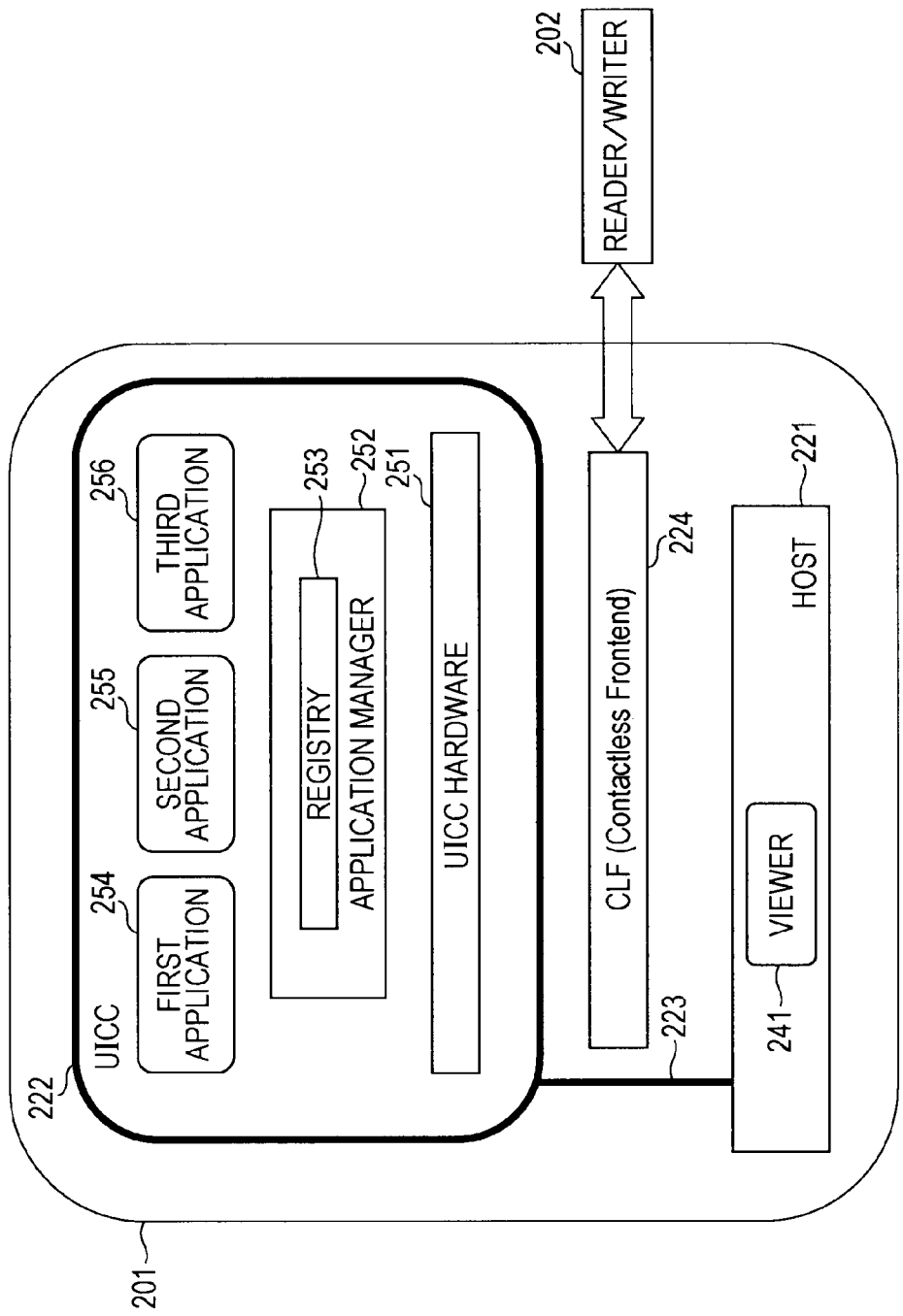
FIG. 6 is a diagram illustrating an internal configuration of an IC card.

FIG. 6 is a diagram illustrating an internal configuration of the cellular phone 201. The cellular phone 201 includes a host 221 and a UICC (Universal Integrated Circuit Card) 222. The host 221 and the UICC 222 are connected to each other so as to transmit and receive data through a UART (Universal Asynchronous Receiver Transmitter) 223. Thus, the host is a means for performing a wired communication with the UICC 222. The cellular phone 201 further includes a CLF (Contactless Frontend) 224 which controls the noncontact communication between the cellular phone 201 and the reader/writer 202. The CLF 224 is a means for communicating with the reader/writer 202 and the UICC 222 as shown in the various flowcharts.

Note that, although only some portions are shown for the description, the cellular phone 201 can include portions which realize a function of a telephone using a communication unit, not shown, a function of connection to a network, and the like.

The UICC 222 can include UICC hardware 251, an application manager 252, and a registry 253. Furthermore, the UICC 222 stores and manages first to third applications 254 to 256 in this embodiment. The first application 254 provides a service to realize a credit card function of the cellular phone 201, for example. Furthermore, the second application 255 provides a transportation service including a payment of a fee for transportation, for example.

Furthermore, the third application 256 provides an integrated service. As will be described hereinafter, the third application 256 is used to provide a plurality of services including a service which realizes a credit card function, a transportation service, and a coupon service. Although not shown in FIG. 6, an additional service may be registered in the UICC 222 as will be described with reference to FIG. 14, and the UICC 222 has a function of storing and managing the registered service.

Although the applications are managed by the application manager 252, it is not necessarily the case that the applications are managed under the same execution environment. For example, when the application manager 252 includes a Java Card™, one of the applications is realized by software and the other applications may be written in a ROM before shipping of the ROM or the other applications may be provided as another chip.

The UICC hardware 251 corresponds to a hardware portion included in the UICC 222 and includes an interface used to transmit data to or receive data from the CLF 224. Therefore, the UICC hardware 251 is a means for transmitting data to or receiving data from the CLF 224. The application manager 252 includes the registry 253. The application manager 252 refers to information written in the registry 253 and updates information included in the registry 253 in accordance with an instruction supplied from one of the applications.

Furthermore, the application manager 252 interprets a command supplied through the CLF 224. The application manager 252 supplies data to one of the applications in accordance with the interpretation and supplies data output from the application to the CLF 224. The application manager 252 is a means for supplying data to the applications and for supplying data to the CLF 224. The registry 253 manages information on services including names of the services, types of the services, and the like. The registry 253 is a means for managing the information on services.

A data flow of registration and update of an application and a service will now be described.

Data Flow of Registration and Update

Figure 7:
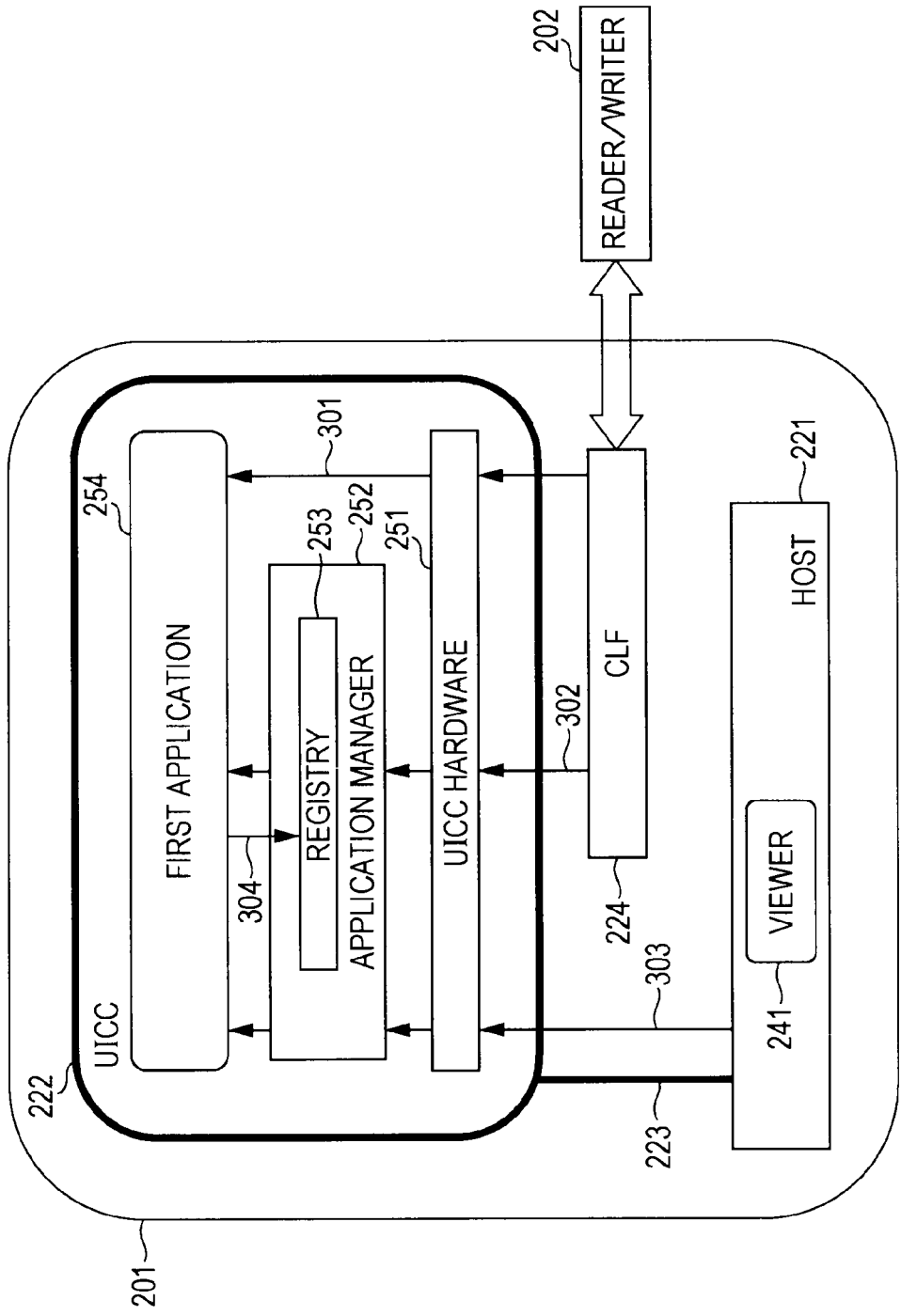
FIG. 7 is a diagram illustrating communication paths.

FIG. 7 shows a data flow performed when the first application 254 is accessed. The first application 254 of the UICC 222 is accessed using a communication path 301 from the reader/writer 202 through the CLF 224 and the UICC hardware 251. Furthermore, the first application 254 is accessed using a communication path 302 from the reader/writer 202 through the CLF 224 and the UICC hardware 251 and the application manager 252 which are included in the UICC 222.

The communication paths 301 and 302 are different from each other due to different command formats. A unique command format which supports a communication protocol of the first application 254 is transmitted to the first application 254 through the communication path 301. The reader/writer 202 and the CLF 224 communicate with each other in accordance with a protocol corresponding to the first application 254, and a unique command obtained through the communication is supplied from the CLF 224 to the UICC hardware 251. On the other hand, a general command format which supports the command protocol is transmitted to the first application 254 through the communication path 302. The reader/writer 202 and the CLF 224 communicate with each other in accordance with the protocol corresponding to the first application 254, and a command conforming to a general command format obtained through the communication is supplied from the CLF 224 to the UICC hardware 251.

That is, the communication path 301 which is connected to the first application 254 without using the application manager 252 or the communication path 302 which is connected to the first application 254 through the application manager 252 is used depending on a command format to be transmitted.

As will be described hereinafter, examples of the communication protocol include a Type A standard and a Type B standard which support ISO 14443-3 and ISO 14443-4, respectively, which are standardized by ISO 14443 and a so-called Type F standard which is standardized by ISO 18092. As a general command format utilizing such a communication protocol, a command format referred to as "Application Protocol Data Unit (APDU)" which is standardized by ISO 7816-4 has been used. A command conforming to the APDU command format is referred to as an APDU command hereinafter.

Referring back to FIG. 7, a communication path 303 is also used to access the first application 254. The communication path 303 is used to access the first application 254 from the host 221 through the wired UART 223 and the UICC hardware 251 and the application manager 252 which are included in the UICC 222.

As described above, the three communication paths are used to access the first application 254. Furthermore, the first application 254 may access the registry 253 included in the application manager 252, and a communication path used to access the registry 253 from the first application 254 is referred to as a communication path 304.

Figure 8:
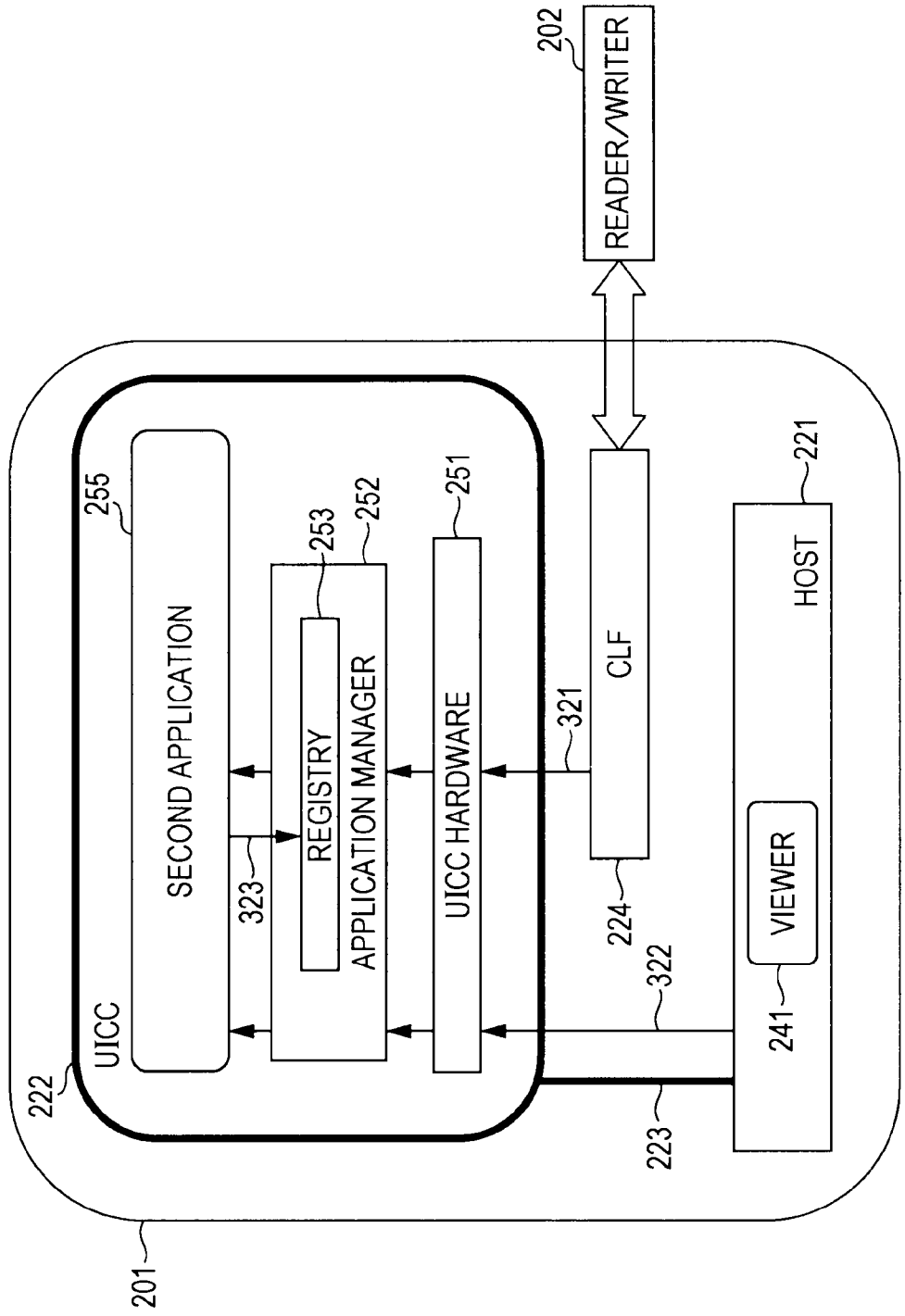
FIG. 8 is a diagram illustrating other communication paths.

Referring now to FIG. 8, a data flow performed when the second application 255 is accessed will be described. A communication path 321 is used to access the second application 255 from the reader/writer 202 through the CLF 224 and the UICC hardware 251 and the application manager 252 which are included in the UICC 222. A command format conforming to a general communication protocol is transmitted to the second application 255 through the communication path 321.

In addition, as with the first application 254, a wired communication path 322 is also used. The communication path 322 is used to access the second application 255 from the host 221 through the wired UART 223, the UICC hardware 251, and the application manager 252 which are included in the UICC 222.

As described above, the two communication paths are used to access the second application 255. Furthermore, the second application 255 may access the registry 253 included in the application manager 252. A communication path used to access the registry 253 from the second application 255 is referred to as a communication path 323.

Figure 9:
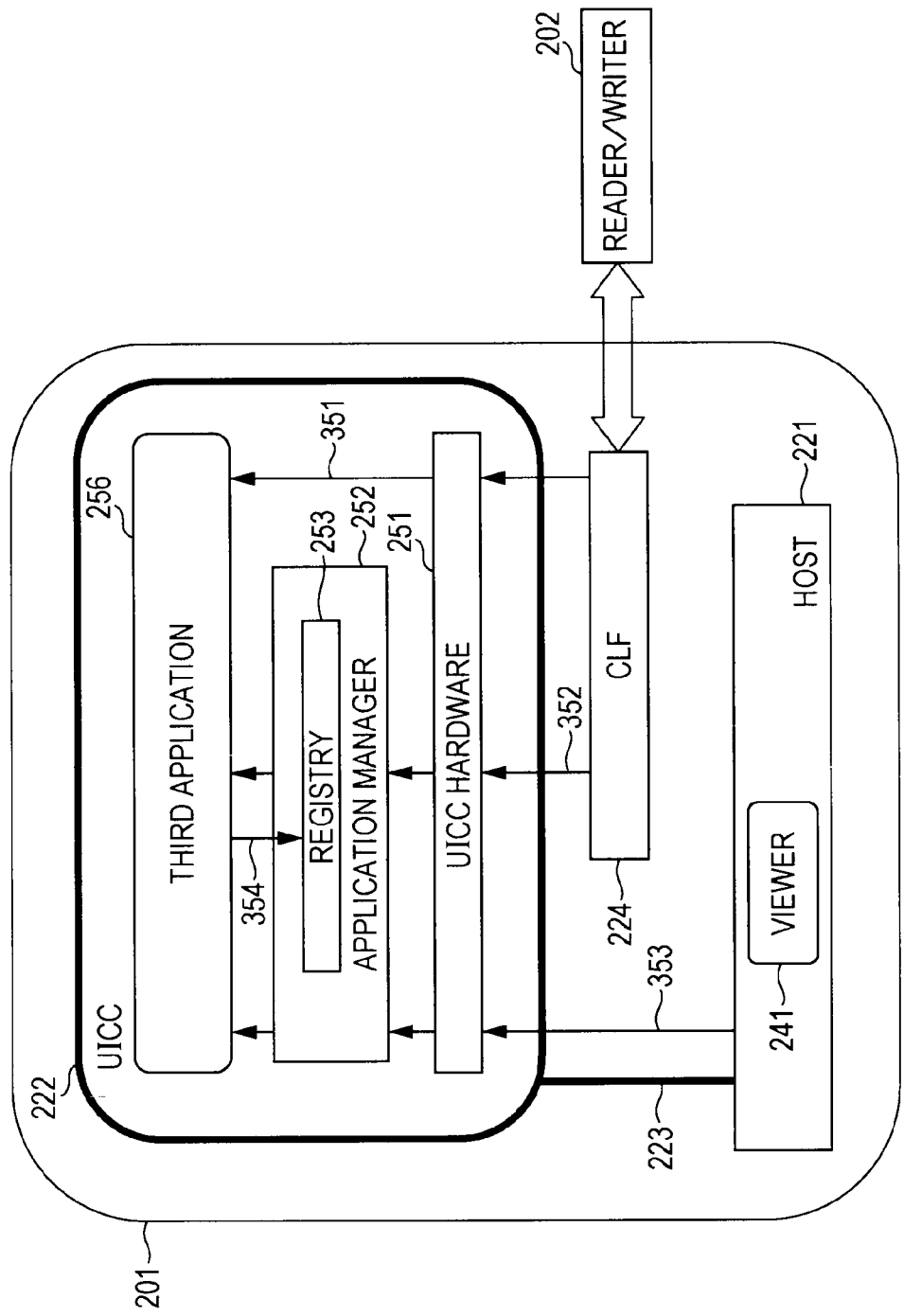
FIG. 9 is a diagram illustrating further communication paths.

Referring now to FIG. 9, a data flow performed when the third application 256 is accessed will be described. The third application 256 of the UICC 222 is accessed using a communication path 351 from the reader/writer 202 through the CLF 224 and the UICC hardware 251. Furthermore, the third application 256 is accessed using a communication path 352 from the reader/writer 202 through the CLF 224, the UICC hardware 251, and the application manager 252 which are included in the UICC 222.

As with the first application 254, the communication paths 351 and 352 are different from each other due to different command formats. The reader/writer 202 and the CLF 224 communicate with each other in accordance with a protocol corresponding to the third application 256, and the CLF 224 supplies a command unique to the third application 256 obtained through the communication to the UICC hardware 251.

A unique command format conforming to the communication protocol of the third application 256 is transmitted to the third application 256 through the communication path 351. On the other hand, a command format conforming to a general protocol is transmitted to the third application 256 through the communication path 352. The reader/writer 202 and the CLF 224 communicate with each other in accordance with a protocol supported by the third application 256, and the CLF 224 supplies a command conforming to the general command format obtained through the communication to the UICC hardware 251.

That is, the communication path 351 which is connected to the third application 256 without passing through the application manager 252 or the communication path 352 which is connected to the third application 256 through the application manager 252 is used depending on a command format to be transmitted.

As a communication path used to access the third application 256, a communication path 353 may also be used. The communication path 353 is used to access the third application 256 from the host 221 through the wired UART 223, the UICC hardware 251, and the application manager 252 which are included in the UICC 222.

As described above, the three communication paths are used to access the third application 256. Furthermore, the third application 256 may access the registry 253 included in the application manager 252 using a communication path 354.

Referring to FIG. 10, the communication paths, the communication protocols, and the command formats will be described. In FIG. 10, concrete examples are used for descriptions. The first application 254 corresponds to the communication method referred to as "Type A". Hereinafter, the communication method corresponding to the first application 254 is referred to as a "first communication method" and an example of the first communication method corresponds to Type A.

The first communication method corresponds to, among communication methods referred to as Type A, a communication method which is based on ISO 14443-2 and ISO 14443-3 as a communication protocol and which utilizes a unique packet as a transmission packet and a communication method which is based on ISO 14443-2 to ISO 14443-4 as a communication protocol and which utilizes a general packet.

The unique packet is used to transmit/receive a command unique to the first application 254. Therefore, when the unique packet is transmitted from the reader/writer 202, a command extracted by the CLF 224 is supplied to the first application 254 through the UICC hardware 251. In other words, since the unique packet has a unique specification, the unique packet is supplied to the first application 254 without being processed by the application manager 252.

Note that depending on a method for realizing the first application 254, the application manager 252 may be passed through or may not be passed through. For example, when the first application 254 is realized in the UICC hardware 251, the first application 254 may operate in the hardware out of the application manager 252's control, that is, without using the application manager 252. As another example, when the first application 254 is developed in a memory afterward as a module, the first application 254 is controlled by the application manager 252. In this case, the application manager 252 is passed through. When the application manager 252 is passed through, the access using the general command is performed as described above.

In this embodiment, the example shown in FIG. 7, that is, a case where, when the unique packet is transmitted from the reader/writer 202, the command extracted by the CLF 224 is supplied to the first application 254 through the UICC hardware 251 using the communication path 301 as described above, will be described.

Note that, in the following description, the unique command is referred to as a "first command" so as to represent that the unique command is transmitted/received using a unique packet (which is referred to as a "first packet") of the first application 254. An example of the first application utilizing the unique command includes MIFARE (trademark).

The application manager 252 processes an APDU command extracted through the process performed by the CLF 224. Therefore, when the reader/writer 202 outputs an APDU command, the APDU command is supplied to the first application 254 through the communication path 302 (shown in FIG. 7), that is, through the CLF 224, the UICC hardware 251, and the application manager 252. In this case, the application manager 252 performs a process so as to represent that the supplied command is to be transmitted to the first application 254 so that the command is supplied to the first application 254.

The general packet is used to transmit/receive a general command format, that is, the APDU command.

The second application 255 conforms to the communication method referred to as "Type B". Hereinafter, the communication method corresponding to the second application 255 is referred to as a "second communication method" where appropriate and an example of the second communication method includes Type B. The second communication method conforms to ISO 14443-2 to ISO 14443-4 serving as protocols.

In the second communication method (Type B), a general packet is used as a transmission available packet. The general packet is, as described above, used to transmit/receive a general command format, that is, transmit/receive an APDU command.

When the general packet is transmitted from the reader/writer 202, the CLF 224 processes the packet so as to extract an APDU command which is supplied to the second application 255 through the UICC hardware 251 and the application manager 252. In this case, thereafter, the application manager 252 processes the APDU command extracted from the supplied packet and performs a process so as to represent that the APDU command is to be transmitted to the second application 255 so that the command is supplied to the second application 255.

Note that, as with the case of the first application 254, also in the case of the second application 255, the application manager 252 may be passed through or may not be passed through depending on a method for realizing the second application 255. In this embodiment, as shown in FIG. 8, a case where the application manager 252 is passed through will be described as an example.

The third application 256 conforms to a communication method referred to as Type F. Hereinafter, a communication method corresponding to the third application 256 is referred to as a "third communication method" where appropriate, and an example of the third communication method includes Type F. The third communication method conforms to ISO 18092 as a communication protocol.

In the third communication method (Type F), a FeliCa (trademark) packet and a packet including a FeliCa packet and a general packet implemented on the FeliCa packet as a transmission available packet are used. The FeliCa packet is a packet unique to the third application 256. Therefore, when the FeliCa packet is output from the reader/writer 202, a FeliCa command extracted by the CLF 224 is supplied to the third application 256 from the CLF 224. The FeliCa packet is used to transmit/receive the FeliCa command.

Note that, as with the case of the first application 254, also in the third application 256, the application manager 252 may be passed through or may not be passed through depending on a method for realizing the third application 256. In this embodiment, as shown in FIG. 9, a case where the application manager 252 is passed through (an example of communication using the communication path 351) will be described as an example.

Note that, in the following description, the FeliCa command is referred to as a "third command" so that it is clearly described that the FeliCa command is transmitted/received by being included in a packet (hereinafter referred to as a "third packet") unique to the third application 256.

Type F also is compatible with a transmission/reception of a general command implemented on the FeliCa packet. The general packet is, as described above, used to transmit/receive a general command and also used to transmit/receive an APDU command.

When the general packet is transmitted from the reader/writer 202, the CLF 224 processes the packet so as to extract the APDU command which is supplied to the third application 256 through the UICC hardware 251 and the application manager 252. That is, the APDU command and response data to the APDU command are transmitted and received using the communication path 352 (shown in FIG. 9). In this case, the application manager 252 performs a process so as to represent that the supplied APDU command is to be transmitted to the third application 256 so that the APDU command is supplied to the third application 256.

As described above, examples of a case where transmission/reception of a packet is performed in a noncontact manner between the cellular phone 201 and the reader/writer 202 include a case where transmission/reception is performed using a packet, such as the first packet or the third packet, conforming to a service-unique command and a case where transmission/reception is performed using a command format, such as a general APDU command, conforming to ISO 7816-4.

Furthermore, a wired communication path may be used. Specifically, as shown in FIG. 10, when the communication path 303 (shown in FIG. 7), the communication path 322 (shown in FIG. 8), and the communication path 353 (shown in FIG. 9) are used for communication, a protocol for serial communication is used. Then, examples of a transmittable/receivable packet include a unique wired packet and a packet conforming to a TPDU (Transport Protocol Data Unit) (ISO 7816-3) standard.

When the third application 256 is to be processed, the unique wired packet is used to transmit/receive the third command (FeliCa command). The packet conforming to the TPDU standard is used to transmit/receive a general packet, that is, the APDU command in this case.

Referring to FIG. 11, layered structures of the first to third communication methods (Type A, Type B, and Type F, respectively) and the wired communication method will be described. The first communication method corresponding to the first application 254 supports ISO 14443-3 Type A in an initialization/anticollision layer. Furthermore, the first communication method supports a unique packet and a general packet which conforms to the ISO 14443-4 standard in a packet layer. Then, the first communication method supports a unique command format in a portion of a command layer corresponding to the unique packet of the packet layer and supports an APDU command format conforming to ISO 7816-4 in a portion of the command layer corresponding to the general packet of the packet layer conforming to the ISO 14443-4 standard.

The second communication method corresponding to the second application 255 conforms to the ISO 14443-3 Type B standard in an initialization/anticollision layer. Furthermore, the second communication method supports a general packet conforming to the ISO 14443-4 standard in a packet layer. Then, the second communication method supports an APDU command format conforming to ISO 7816-4 in a command layer corresponding to the general packet conforming to the ISO 14443-4 standard in the packet layer.

The third communication method corresponding to the third application 256 conforms to the ISO 18092 standard in an initialization/anticollision layer. Furthermore, the third communication method supports a packet conforming to the ISO 14443-4 standard and a FeliCa packet in a packet layer. Then, the third communication method supports the APDU command format conforming to ISO 7816-4 in a portion of a Type F command layer corresponding to the packet conforming to the ISO 14443-4 standard and supports a FeliCa command format in a portion of the command layer corresponding to the FeliCa packet in the packet layer.

Since the wired communication method is different from wireless communication methods, an initialization/anticollision layer is not necessary. A physical connection is realized in accordance with ISO 7815-1 and ISO 7816-2. The wired communication method supports a packet conforming to the ISO 7816-3 standard in a packet layer. Then, the wired communication method supports an APDU command format conforming to ISO 7816-4 in a command layer corresponding to the packet conforming to the ISO 7816-3 standard in the packet layer.

As described above, since each of the first application 254, the second application 255, and the third application 256 is accessed using the plurality of communication paths, the reader/writer 202 should determine one of the communication paths (communication method) used to transmit/receive data.

Figure 12:
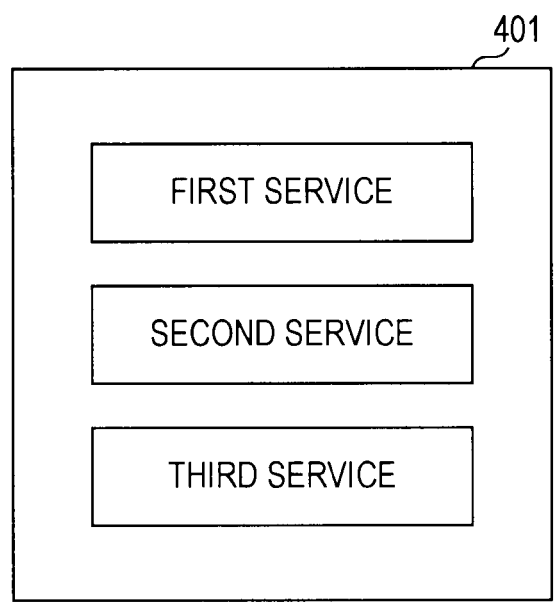
FIG. 12 is a diagram illustrating display of service names.

Referring back to FIG. 6, in a state in which the UICC 222 manages the first to third applications 254 to 256, when a viewer 241 performs a process, a screen illustrated in FIG. 12, for example, is displayed for the user. Thus, the viewer 241 is a means for displaying information. The "screen" means a screen displayed in a display 401 of the cellular phone 201, for example.

As shown in FIG. 12, the viewer 241 recognizes the first to third applications 254 to 256 which are recognized by the application manager 252. Then, the viewer 241 displays a service name "first service" of the first application 254, a service name "second service" of the second application 255, and a service name "third service" of the third application 256 in the display 401.

Figure 13:
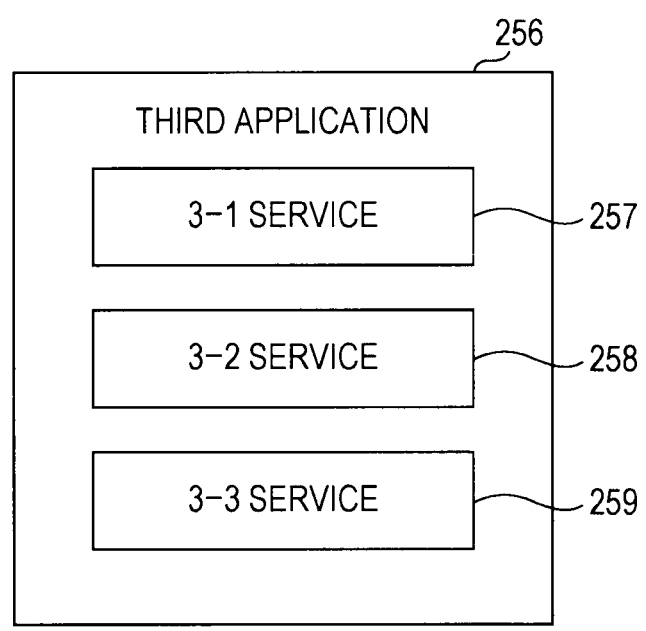
FIG. 13 is a diagram illustrating services.

The third application 256 is an integrated service and provides a plurality of services as illustrated in FIG. 13. That is, in an example illustrated in FIG. 13, the third application 256 provides a 3-1 service 257, a 3-2 service 258, and a 3-3 service 259.

As described above, even when the third application 256 provides the 3-1 service 257, the 3-2 service 258, and the 3-3 service 259, the viewer 241 recognizes only the first to third applications 254 to 256 which have been registered in the application manager 252, that is, the viewer 241 does not recognize the 3-1 service 257, the 3-2 service 258, and the 3-3 service 259 and does not display information on the 3-1 service 257, the 3-2 service 258, and the 3-3 service 259 for the user.

This is because the registry 253 is used to manage information on registered services. Here, registration of applications and services will be described.

Figure 14:
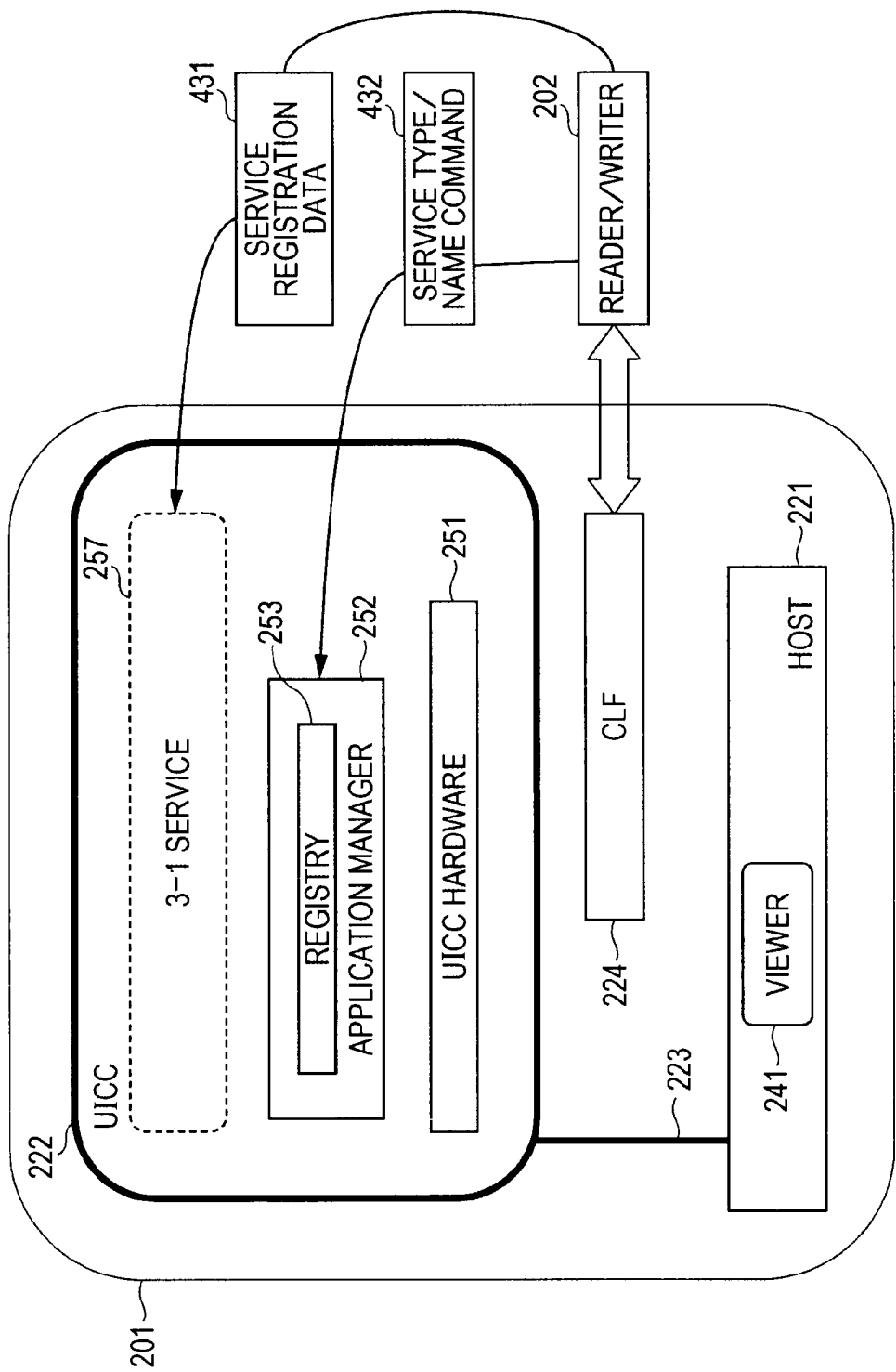
FIG. 14 is a diagram illustrating registration of a service and a corresponding service name.

As shown in FIG. 14, when the 3-1 service 257 is to be registered in a state in which the 3-1 service 257 has not been registered in the UICC 222 (the 3-1 service 257 is designated by a dotted line in FIG. 14 in order to represent that the 3-1 service 257 has not been registered and applications are not shown), data 431 used to register a service is supplied from outside of the UICC 222. The data used to register a service is referred to as "service registration data". The service registration data 431 is used to register the 3-1 service 257. Registration of a service using the service registration data 431 may be performed using an existing infrastructure. Referring to FIG. 14 for a description, the service registration data 431 may be supplied from the reader/writer 202 to the UICC 222 through the CLF 224. Furthermore, the service registration data 431 may be supplied from the host 221 to the UICC 222 through the UART.

However, even when the 3-1 service 257 is registered using the service registration data 431, information on the 3-1 service 257 is not registered in the registry 253 of the application manager 252. Therefore, the registration of the service is not recognized. Accordingly, a process of registering a type and a name of the service should be performed in order to update the information managed in the registry 253.

For example, a service-type/name command 432 should be transmitted to the application manager 252, and management information included in the application manager 252

(information included in the registry 253) should be updated. In this case, information representing that the 3-1 service 257 is included in the third application 256 (the 3-1 service 257 has been newly registered) should be registered in the registry 253 of the application manager 252 using the service-type/name command 432.

For example, the 3-1 service 257, the 3-2 service 258, and the 3-3 service 259 provided by the third application 256 may be individually registered as fourth to sixth applications similarly to the third application. In this case, the 3-1 service 257, the 3-2 service 258, and the 3-3 service 259 may be individually registered as fourth to sixth applications. However, if such registration is performed, the existing service registration data 431 may not be used, and accordingly, an operation utilizing the relationship among the existing applications may not be performed, that is, an operation utilizing the existing infrastructure may not be performed.

In order to view the individual services using the viewer 241 while the existing infrastructure is used at most, the service registration data 431 and the service-type/name command 432 may be individually transmitted so that a service name may be registered as described above. The example in which the third application 256 includes the plurality of services is described in this embodiment. However, also when the first application 254 or the second application 255 includes a plurality of services, the same process is performed.

As described with reference to FIGS. 7 to 11, each of the first to third applications 254 to 256 is accessible using the plurality of communication paths. Since the third application 256 corresponds to the communication paths 351 to 354 (as shown in FIG. 9), the 3-1 service 257 may be registered using the communication path 351 whereas the information included in the registry 253 may be updated using the communication path 352.

In order to realize such a process, the reader/writer 202 should determine communication paths used for the registration and the update when the reader/writer 202 performs a registration process or an updating process on the cellular phone 201. In accordance with the determination, an appropriate command, that is, a command of a packet confirming to a protocol suitable for the selected communication path should be generated.

Configuration of Reader/Writer

Figure 15:
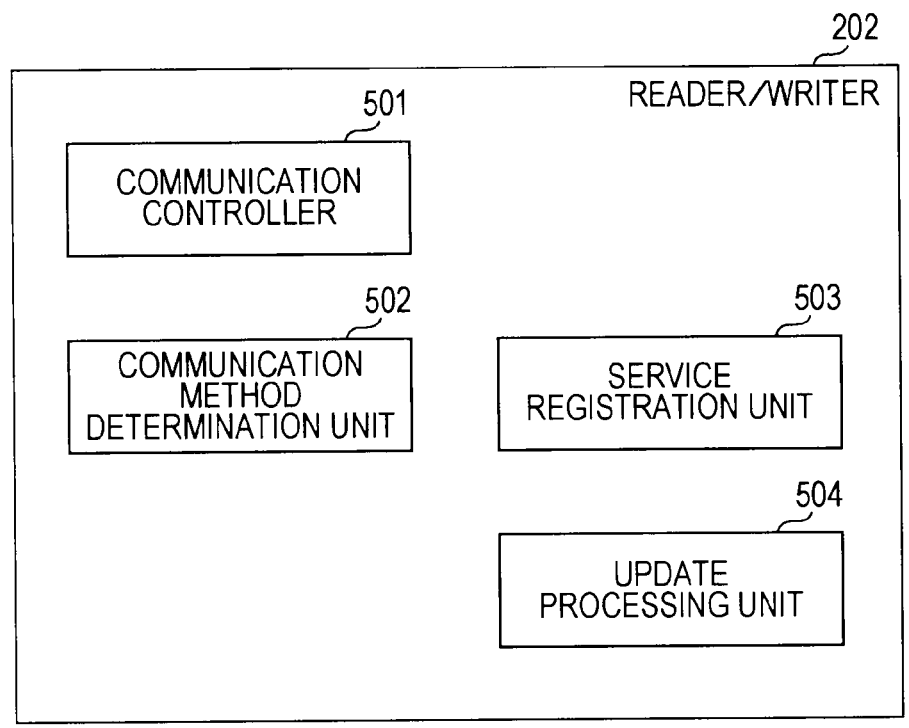
FIG. 15 is a diagram illustrating functions of a reader/writer.

The reader/writer 202 has the functions illustrated in FIG. 15. Specifically, the reader/writer 202 includes a communication controller 501, a communication method determination unit 502, a service registration unit 503, and an update processing unit 504. The communication controller 501 controls noncontact communication with the UICC 222 including a certain application (the third application 256, for example) and the application manager 252 which manages a service provided by the application (the 3-1 service 257, for example).

The communication method determination unit 502 performs a process of selecting a communication method used when a certain service is to be registered in the UICC 222 and a communication method used when the registry 253 is to be updated.

The service registration unit 503 executes generation of a command used to register a certain service in the UICC 222 using the communication method determined by the communication method determination unit 502. The update processing unit 504 executes generation of a command used to update information managed in the registry 253 of the UICC 222 using the communication method determined by the communication method determination unit 502.

Process of Reader/Writer

Figure 16:
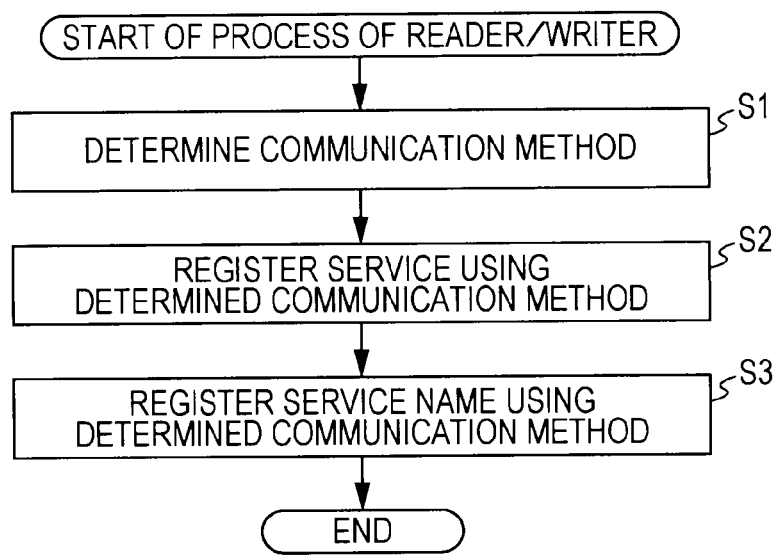
FIG. 16 is a flowchart illustrating a process of determining a communication method.

Next, a process performed by the reader/writer 202 will be described with reference to a flowchart illustrated in FIG. 16. In step S1, the communication method determination unit 502 determines communication methods. The determination of the communication methods in step S1 is performed by executing one of first to eighth processes described below with reference to FIGS. 17 to 24, respectively.

After the communication methods used for registration of a service and for registration of a service name are determined in step S1, the service registration unit 503 performs a service registration process using the determined communication methods in step S2. Thereafter, in step S3, the update processing unit 504 executes a service-name registration process (process of updating the registry 253) using the determined communication method. The service registration process and the service-name registration process will be described hereinafter with reference to a flowchart illustrated in FIG. 26 onwards.

First, a process of determining a communication method used for registration of a service to the UICC 222 and a communication method for update of the registry 253 which is performed in step S1 will be described. Eight processes of determining communication methods will be described as examples.

First Process of Determining Communication Methods

As a first process of determining communication methods, a method for examining all communication methods and selecting communication methods from among the communication method for appropriate communication will be described with reference to a flowchart illustrated in FIG. 17. In step S11, it is determined whether the first communication method is available. The determination as to whether the first communication method is available is made by determining whether a response to a packet transmitted in the first communication method is received.

When it is determined that the first communication method is available in step S11, the process proceeds to step S12. In step S12, it is determined whether an APDU command format is available in the first communication method. For example, the determination as to whether the APDU command format is available is made by determining whether a response to a generated APDU command in the first communication method is received.

When it is determined that the APDU command format is available in step S12, the process proceeds to step S13. Furthermore, also when it is determined that the APDU command format is not available in step S12, the process proceeds to step S13. Moreover, when it is determined that the first communication method is not available in step S11, the process proceeds to step S13.

Specifically, by performing the operations in step S11 and step S12, a determination as to whether the CLF 224 may perform communication using the first communication method is made. When it is determined that the communication is available using the first communication method, it is further determined whether the APDU command format is available. Results of the determinations are appropriately stored.

In step S13, it is determined whether the second communication method is available. That determination can be made in a manner analogous to that in which the determination of the availability of the first communication method is made. When it is determined that the second communication method is available in step S13, the process proceeds to step S14. In step S14, it is determined whether the APDU command format is available. That determination can be made in a manner analogous to that in which the determination of the availability of the APDU command format in the first communication method is made. When it is determined that the APDU command format is available, the process proceeds to step S15. Furthermore, also when it is determined that the APDU command format is not available in step S14, the process proceeds to step S15. Moreover, when it is determined that the second communication method is not available in step S13, the process proceeds to step S15.

Specifically, by performing the operations in step S13 and step S14, a determination as to whether the cellular phone 201 may perform communication using the second communication method is made. When it is determined that the communication is available using the second communication method, it is further determined whether the APDU command format is available in the second communication method. Results of the determinations are appropriately stored.

In step S15, it is determined whether the third communication method is available. That determination can be made in a manner analogous to that in which the determination of the availability of the first communication method is made. When it is determined that the third communication method is available in step S15, the process proceeds to step S16. In step S16, it is determined whether the APDU command format is available in the third communication method. That determination can be made in a manner analogous to that in which the determination of the availability of the APDU command format in the first communication method is made. When it is determined that the APDU command format is available, the process proceeds to step S17. Furthermore, also when it is determined that the APDU command format is not available, the process proceeds to step S17. Moreover, also when it is determined that the third communication method is not available in step S15, the process proceeds to step S17.

Specifically, by performing the operations in step S15 and step S16, it is determined whether the CLF 224 may perform communication using the third communication method. When it is determined that the communication is available using the third communication method, it is further determined whether the APDU command format is available. Results of the determinations are appropriately stored.

In step S17, the results of the determinations are stored. The results of the determinations in the individual steps may be stored in a table which is managed under a condition in which when the determination is affirmative, a flag is on whereas when the determination is negative, a flag is off.

In step S18, an optimum process is selected in accordance with a state. In this selection, a communication method which is available is selected. In some cases, a communication method in which it is determined that the APDU command format is available may be selected, or alternatively, a communication method which uses a unique packet may be selected where appropriate. An order of selection has been set, and in accordance with the order, a communication method which is determined to be available is selected. The selection is performed on the basis of such a predetermined selection condition. Furthermore, restriction of the reader/writer 202 is reflected when the selection is performed.

In step S19, a communication is performed using the communication method selected in step S18. When the first communication method is selected, for example, a communication is performed in accordance with the first communication method. As a result, it is determined whether the process (communication) is successfully performed in step S20. When the process is not successfully performed for some reason, the communication which is being performed in accordance with the communication method is interrupted, and one of the other communication methods is selected.

Specifically, when it is determined that the process is not successfully performed in accordance with the selected communication method in step S20, the process proceeds to step S21 where the state (condition) is updated. After the update, the process returns to step S18 and the processes in step S18 onwards are performed again. The update performed in step S21 includes a process of updating (changing) a state of the communication method corresponding to the communication failure to a state representing an unavailable communication method.

Figure 17:
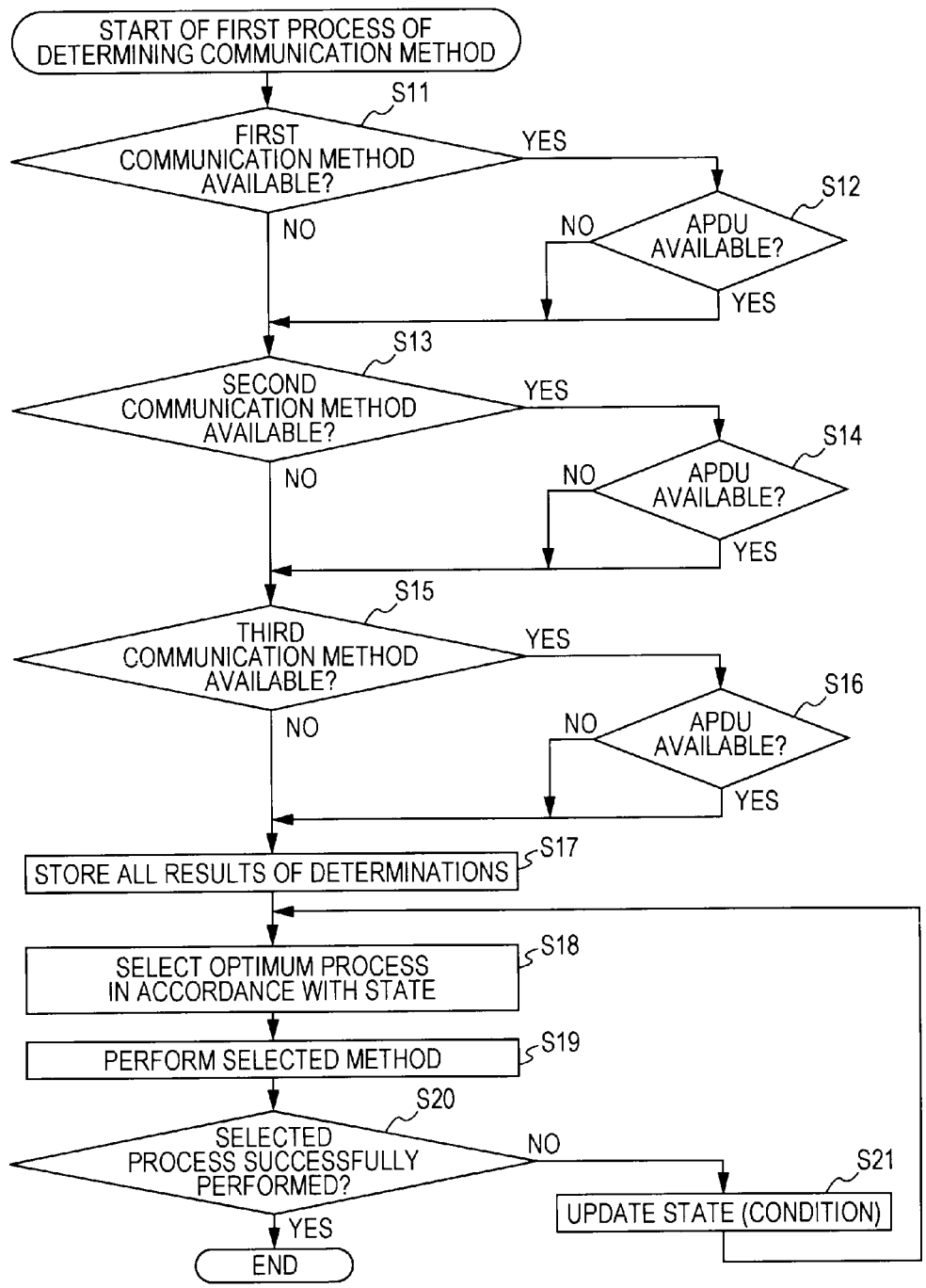
FIG. 17 is a flowchart illustrating another process of determining a communication method.

On the other hand, when it is determined that the process is successfully performed in accordance with the selected communication method in step S20, the process of the flowchart illustrated in FIG. 17 which relates to the process of determining a communication method is terminated. As subsequent processes, registration of a service and update of the registry 253 are performed in accordance with the selected communication method. These processes will be described hereinafter.

Note that the processing order illustrated in FIG. 17 is merely an example and the order is not limited to this. Specifically, since all the first to third communication methods are examined and results of the performances are stored, an order of the communication method to be examined does not matter, and therefore, any communication may be performed first.

As described above, when the reader/writer 202 may communicate with the CLF 224 by the plurality of communication methods, it is determined whether a communication with the CLF 224 is available for each communication method. Thereafter, among the communication methods which are determined to be available for the communication, an optimum communication method at that point in time is selected.

As described above, since communication methods are determined by examining all the communication methods, even when a communication in accordance with the selected communication method fails, recovery is easily performed.

Second Process of Determining Communication Method

As a second process of determining a communication method, a case where it is determined whether the first to third communication methods are available in that order, and when it is determined that at least one of the communication methods is available, the communication method is selected will be described with reference to a flowchart illustrated in FIG. 18.

Determination processes described with reference to flowcharts illustrated in FIGS. 18 to 24 have basically the following same processing flow. That is, first, one of the plurality of communication methods is selected, and it is determined whether a communication with the UICC 222 is available using the communication method. When it is determined that the communication is not available, one of the other communication methods is selected, and it is determined whether a communication with the UICC 222 is available again. When it is determined that the communication with the UICC 222 is available using the selected communication method, the communication method which is available for the communication is selected.

In step S51, it is determined whether the first communication method is available. When it is determined that the first communication method is available in step S51, the process proceeds to step S52. In step S52, it is determined whether the APDU command format is available in the first communication method. When it is determined that the APDU command format is available in step S52, the process proceeds to step S53.

In step S53, it is determined that the communication is realized using the first communication method, and the process of determining a communication method is terminated. Specifically, in this case, since the communication is allowed to be performed using the first communication method and the APDU command format of the first communication method is available, it is determined that registration of a service and update of the registry 253 (addition of a name of the service to be registered) are performed using the first communication method. In subsequent processes, a service is registered and a name of the service is additionally registered using the set communication method.

On the other hand, in step S52, when it is determined that the APDU command format is not available in step S52, the process proceeds to step S54. In step S54, it is determined whether the second communication method is available. When it is determined that the second communication method is available in step S54, the process proceeds to step S55.

In this case, it is determined that the first and second communication methods are available, and therefore, in step S55, it is determined that a registration process and an updating process are realized using the first and second communication methods. Specifically, the registration of the service is performed using the first communication method and the registration of the service name is performed using the second communication method. Alternatively, it is determined that the registration of the service and the service name is performed only using the second communication method.

Note that, in this case, the second communication method corresponds to a method in which communication is performed using the APDU command format. Therefore, when it is determined that the second communication method is available, a determination as to whether the APDU command format is available is not made.

Figure 18:
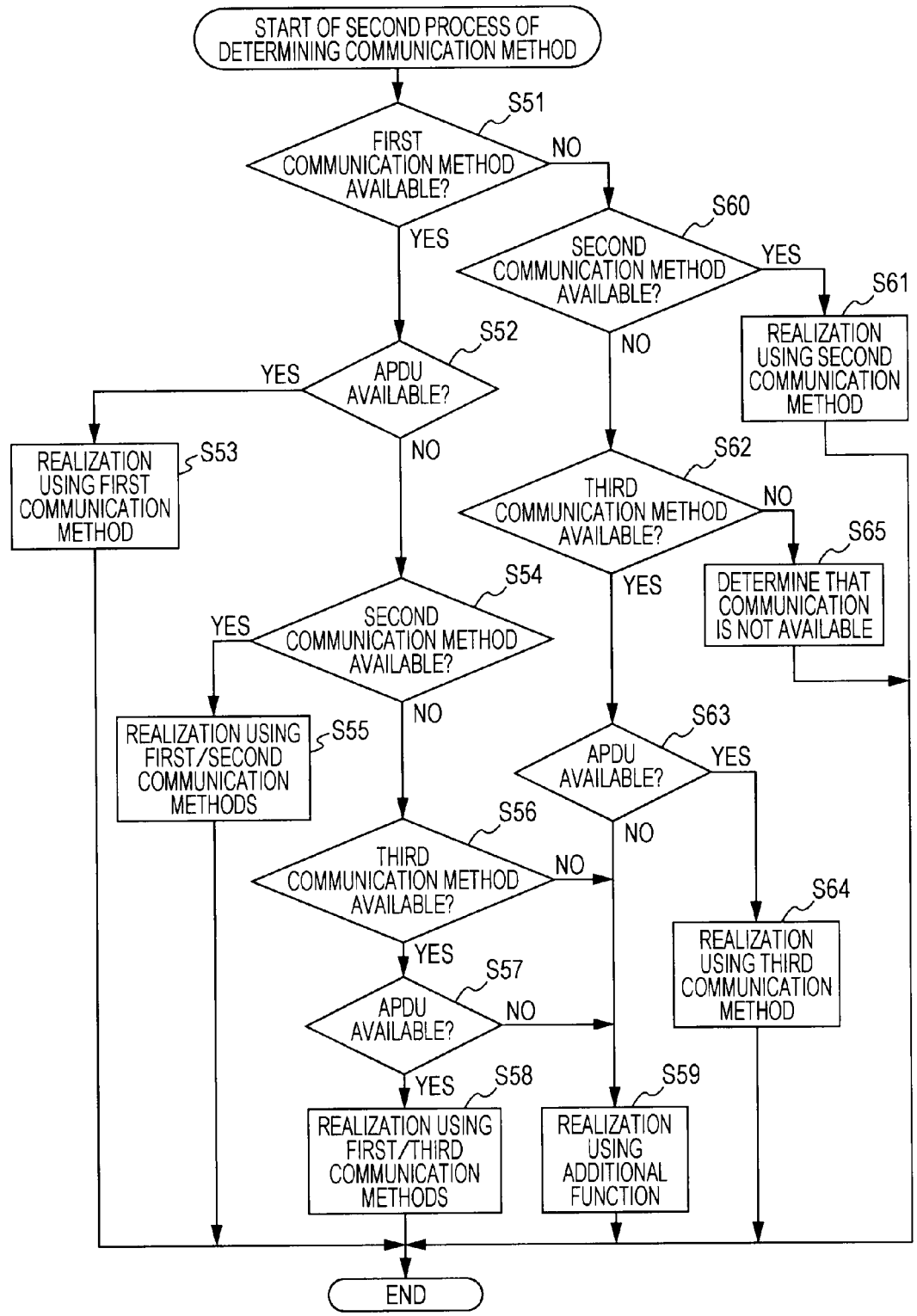
FIG. 18 is a flowchart illustrating still another process of determining a communication method.

In FIG. 18, the term "first/second communication methods" represents that the APDU command format is not available in the first communication method before the symbol "/" and the APDU command format is available in the second communication method before the symbol "/". The same is true for the other drawings, and a term "A/B" represents that the APDU command format is not available in A whereas the APDU command format is available in B.

On the other hand, in step S54, when it is determined that the second communication method is not available, the process proceeds to step S56. In step S56, it is determined whether the third communication method is available. When it is determined that the third communication method is available in step S56, the process proceeds to step S57.

In step S57, it is determined whether the APDU command format is available in the third communication method. When it is determined that the APDU command format is available in step S57, the process proceeds to step S58.

In this case, since it is determined that the first and the third communication methods are available and the APDU command format is available in the third communication method, it is determined that the registration process and the updating process are realized using the first and third communication methods in step S58. In this case, the first communication method, the third communication method, or the APDU command in the third communication method is used to register the service, and the APDU command in the third communication method is used to register the service name.

On the other hand, when it is determined that the first communication method is not available in step S51, the process proceeds to step S60. In step S60, it is determined whether the second communication method is available. When it is determined that the second communication method is available in step S60, the process proceeds to step S61.

In this case, since it is determined that the second communication method is available in step S60, it is determined that the registration process and the updating process are realized in step S61 using the second communication method.

On the other hand, when it is determined that the second communication method is not available in step S60, the process proceeds to step S62. In step S62, it is determined whether the third communication method is available. When it is determined that the third communication method is available in step S62, the process proceeds to step S63.

In step S63, it is determined whether the APDU command format is available in the third communication method. When it is determined that the APDU command format is available in step S63, the process proceeds to step S64.

In this case, it is determined that the third communication method and the APDU command format in the third communication method are available. Therefore, in step S64, it is determined that the registration process and the updating process are realized using the third communication method. Specifically, the registration of the service is performed using the third communication method or the APDU command in the third communication method, and the registration of the service name is performed using the APDU command in the third communication method.

On the other hand, when it is determined that the third communication method is not available in step S62, the process proceeds to step S65. In this case, communication is not performed using any one of the first to third communication methods. In other words, it is determined that communication with the CLF 224 is not performed using any one of the communication methods supported by the reader/writer 202. Accordingly, it is determined that the communication is not available in step S65.

On the other hand, when it is determined that the APDU command format is not available in step S63, the process proceeds to step S59. In this case, it is determined that, although communication may be performed using the third communication method, the APDU command format is not available. Similarly, when it is determined that the third communication method is not available in step S56, the process proceeds to step S59. In this case, it is determined that, although communication is available using the first communication method, the APDU command format is not available and communication may not be performed using the second and third communication methods.

Similarly, when it is determined that the APDU command format is not available in step S57, the process proceeds to step S59. In this case, it is determined that communication is performed using the first and third communication methods, but even when one of the communication methods is used, communication utilizing the APDU command format may not be performed.

A common state in which the process proceeds to step S59 is a state in which the APDU command format is not available. When the APDU command format is not available, the registry 253 may not be updated. Although described hereinafter in detail, the registry 253 is updated using the APDU command. Therefore, when the APDU command is not available, the registry 253 is not updated. Accordingly, an additional function is used for realization in step S59.

Note that "an additional function is used for realization" means that the update of the registry 253 is realized using a function additionally provided in an application installed in the UICC. That is, when the update of the registry 253 is realized without using an additional function, for example, when the update of the registry 253 is realized using the first communication method as illustrated in step S53, the registration of the service and the update of the registry 253 may be performed without changing the functions of the UICC 222.

After a communication method is determined as described above, the registration of the service and the update of the registry 253 corresponding to step S2 and step S3 (shown in FIG. 16) are executed in accordance with the determined communication method as will be described hereinafter.

Third Process of Determining Communication Method

As a third process of determining a communication method, a case where it is determined whether the first, third, and second communication methods are available in that order, and when it is determined that at least one of the communication methods is available, the communication method is selected so that a communication method is determined will be described with reference to a flowchart illustrated in FIG. 19. Note that since processes the same as those of the flowchart illustrated in FIG. 18 are included, descriptions of the same processes are omitted or reduced where appropriate.

In step S101, it is determined whether the first communication method is available. When it is determined that the first communication method is available in step S101, the process proceeds to step S102. In step S102, it is determined whether the APDU command format is available in the first communication method. When it is determined that the APDU command format is available in step S102, the process proceeds to step S103.

In step S103, it is determined that the registration and the update are realized using the first communication method, and the process of determining a communication method is terminated. Specifically in this case, since communication is performed using the first communication method and the APDU command format is available in the first communication method, the service registration and the update are performed using the first communication method.

On the other hand, when it is determined that the APDU command format is not available in step S102, the process proceeds to step S104. In step S104, it is determined whether the third communication method is available. In step S104, when it is determined that the third communication method is available, the process proceeds to step S105.

In step S105, it is determined whether the APDU command format is available in the third communication method. When it is determined that the APDU command format is available in step S105, the process proceeds to step S106.

In this case, since it is determined that the first and third communication methods and the APDU command format in the third communication method are available, it is determined that the registration process and the updating process are realized using the first and third communication methods in step S106.

On the other hand, when it is determined that the third communication method is not available in step S104, the process proceeds to step S107. In step S107, it is determined whether the second communication method is available. When it is determined that the second communication method is available in step S107, the process proceeds to step S108.

In this case, since it is determined that the first and second communication methods are available, the registration process and the updating process are realized using the first and second communication methods in step S108.

On the other hand, when it is determined that the APDU command format is not available in step S105, the process proceeds to step S109. In step S109, it is determined whether the second communication method is available. When it is determined that the second communication method is available in step S109, the process proceeds to step S110.

In this case, since it is determined that the first, third, and second communication methods are available, and the APDU command format is not available in the first and third communication methods, the registration is performed using the first communication method or the third communication method and the updating process is realized using the second communication method in step S110.

On the other hand, when it is determined that the first communication method is not available in step S101, the process proceeds to step S112. In step S112, it is determined whether the third communication method is available. When it is determined that the third communication method is available in step S112, the process proceeds to step S113.

In step S113, it is determined whether the APDU command format is available in the third communication method. When it is determined that the APDU command format is available in step S113, the process proceeds to step S114.

In this case, since it is determined that the third communication method and the APDU command format in the third communication method are available, the registration process and the updating process are realized using the third communication method in step S114.

On the other hand, when it is determined that the third communication method is not available in step S112, the process proceeds to step S115. In step S115, it is determined whether the second communication method is available. When it is determined that the second communication method is available in step S115, the process proceeds to step S116.

In this case, since it is determined that the second communication method is available, it is determined that the registration process and the updating process are realized using the second communication method in step S116.

On the other hand, when it is determined that the APDU command format is not available in step S113, the process proceeds to step S117. In step S117, it is determined whether the second communication method is available. When it is determined that the second communication method is available in step S117, the process proceeds to step S118.

In this case, since it is determined that the third and second communication methods are available, it is determined that the registration process is performed using the third communication method and the updating process is performed using the second communication method in step S118.

On the other hand, when it is determined that the third communication method is not available in step S115, the process proceeds to step S119. In this case, communication may not be performed using any one of the first to third communication methods, that is, communication with the CLF 224 is not performed using any one of the communication methods supported by the reader/writer 202. Accordingly, it is determined that the communication is not available in step S119.

On the other hand, when it is determined that the second communication method is not available in step S107, step S109, or step S117, the process proceeds to step S111. When it is determined that the second communication method is not available in one of these steps, the APDU command format is not available.

In this case, the update of the registry 253 is realized by additionally providing a function in the UICC 222 in step S111 (it is determined that the update process is performed using an additional function of the UICC 222).

Fourth Process of Determining Communication Method

Figure 20:
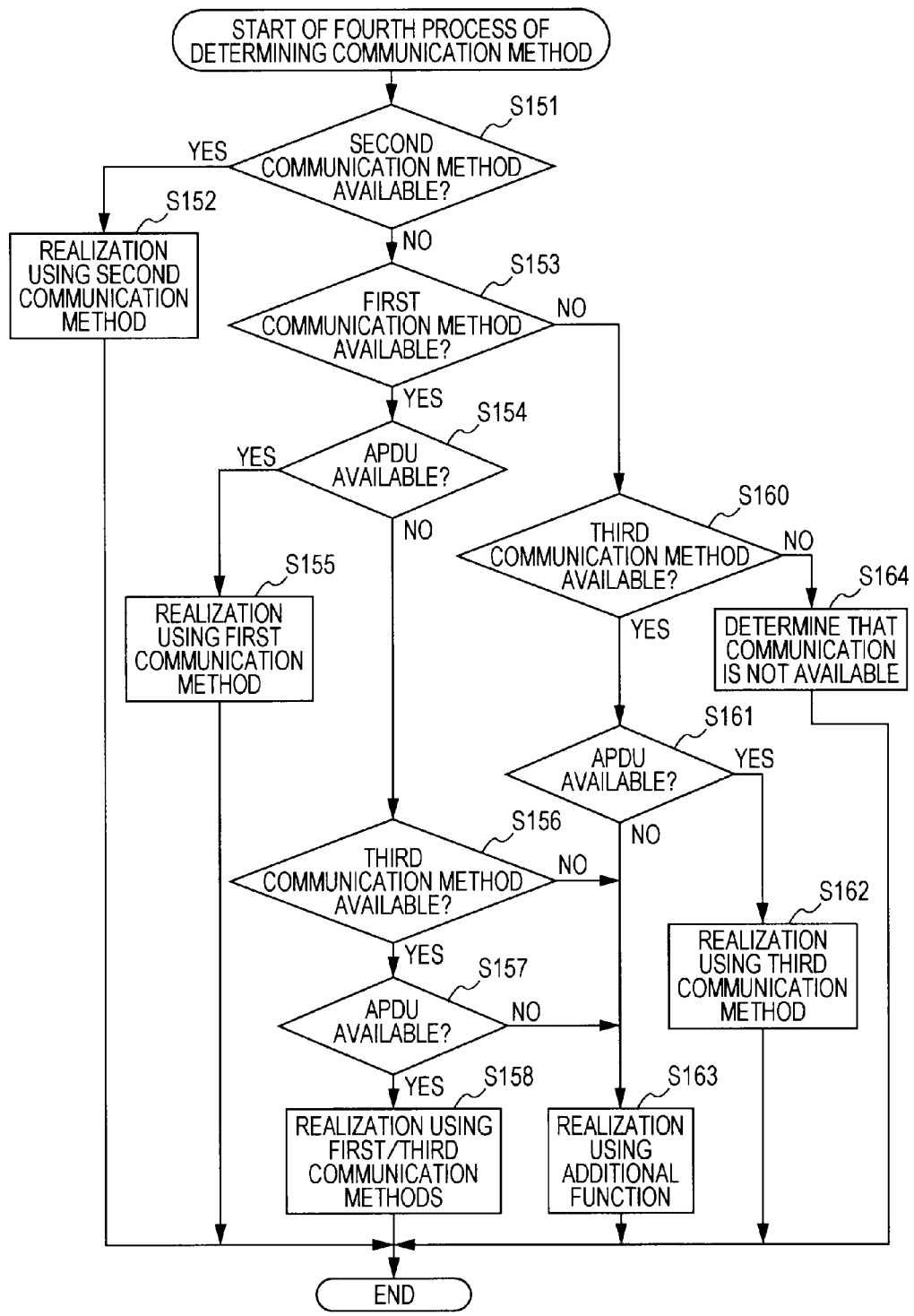
FIG. 20 is a flowchart illustrating a further process of determining a communication method.

As a fourth process of determining a communication method, a case where it is determined whether the second, first, and third communication methods are available in that order, and when it is determined that at least one of the communication methods is available, the communication method is selected so that a communication method is determined will be described with reference to a flowchart illustrated in FIG. 20.

In step S151, it is determined whether the second communication method is available. When it is determined that the second communication method is available in step S151, the process proceeds to step S152.

In this case, since it is determined that the second communication method is available, it is determined that the registration process and the updating process are realized using the second communication method in step S152.

On the other hand, when it is determined that the second communication method is not available in step S151, the process proceeds to step S153. In step S153, it is determined whether the first communication method is available. When it is determined that the first communication method is available in step S153, the process proceeds to step S154. In step S154, it is determined whether the APDU command format is available in the first communication method. When it is determined that the APDU command format is available in the first communication method, the process proceeds to step S155.

In this case, since communication may be performed using the first communication method and the APDU command format in the first communication method is available, it is determined that the registration of the service and the update are performed using the first communication method in step S155.

On the other hand, when it is determined that the APDU command format is not available, the process proceeds to step S156. In step S156, it is determined whether the third communication method is available. When it is determined that the third communication method is available in step S156, the process proceeds to step S157. In step S157, it is determined whether the APDU command format is available in the third communication method. When it is determined that the APDU command format is available in step S157, the process proceeds to step S158.

In this case, since it is determined that the first and third communication methods and the APDU command format in the third communication method are available, it is determined that the registration process and the updating process are performed using the first and third communication methods in step S158. In this case, it is determined that the registration of the service is performed using the first communication method or the third communication method, and the registration of the service name is performed using the third communication method.

On the other hand, when it is determined that the first communication method is not available in step S153, the process proceeds to step S160. In step S160, it is determined whether the third communication method is available. When it is determined that the third communication method is available in step S160, the process proceeds to step S161. In step S161, it is determined whether the APDU command format is available in the third communication method. When it is determined that the APDU command format is available in step S161, the process proceeds to step S162.

In this case, since it is determined that the third communication method and the APDU command format in the third communication method are available, it is determined that the registration process and the updating process are realized using the third communication method in step S162.

On the other hand, when it is determined that the third communication method is not available in step S160, the process proceeds to step S164. In this case, since it is determined that communication may not be performed using any of the first to third communication methods, that is, communication with the CLF 224 is not performed using any one of the communication methods supported by the reader/writer 202, it is determined that the communication is not available in step S164.

On the other hand, when it is determined that the third communication method is not available in step S156 or when it is determined that the APDU command format is not available in step S157 or step S161, the process proceeds to step S163. In this case, it is determined that the APDU command format is not available. Therefore, it is determined that the update of the registry 253 is realized by additionally providing a function in the UICC 222 in step S163 (it is determined that the update is performed using an additional function of the UICC 222).

Fifth Process of Determining Communication Method

Figure 21:
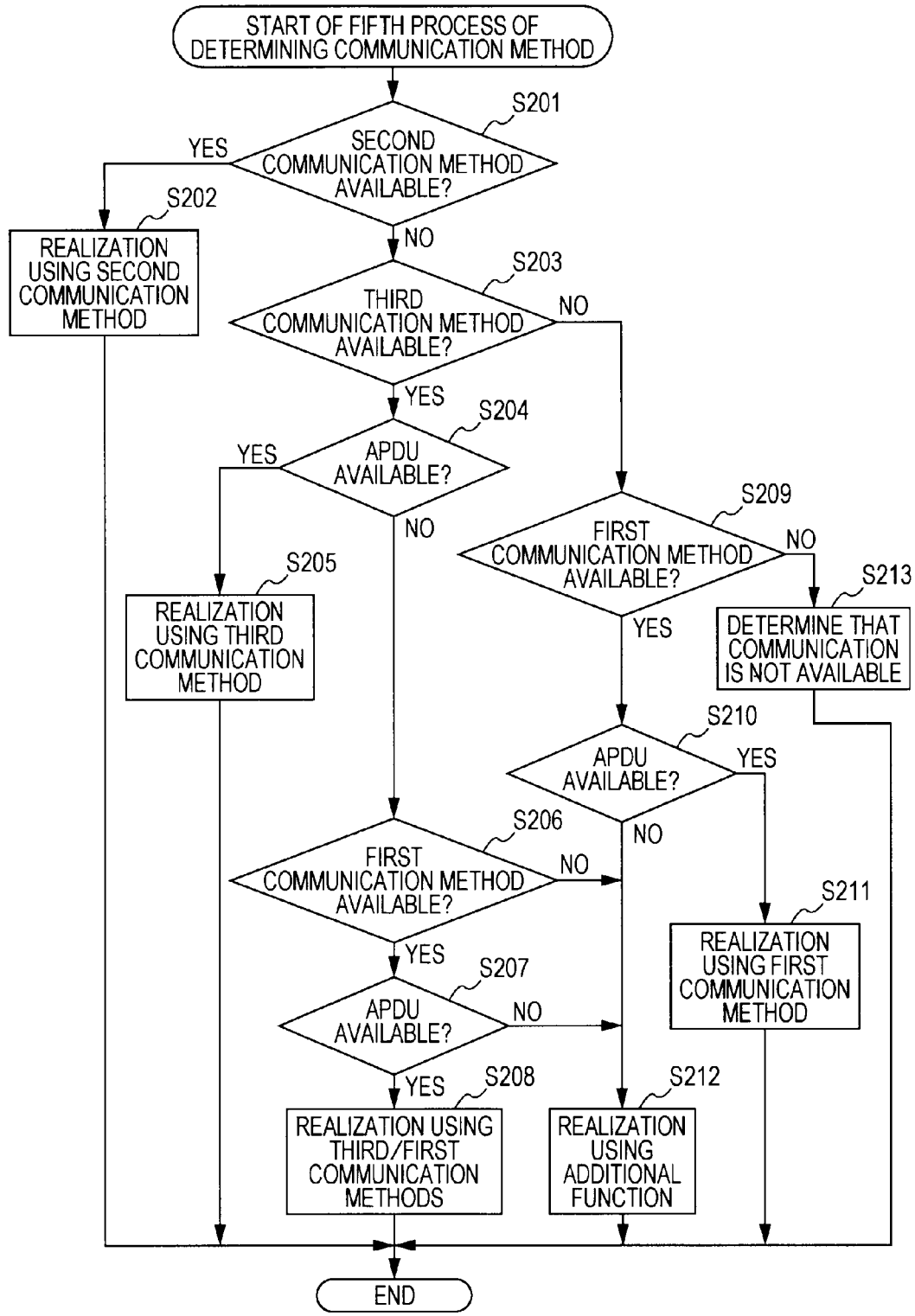
FIG. 21 is a flowchart illustrating a still further process of determining a communication method.

As a fifth process of determining a communication method, a case where it is determined whether the second, third, and the first communication methods are available in that order, and when it is determined that at least one of the communication methods is available, the communication method is selected so that a communication method is determined will be described with reference to a flowchart illustrated in FIG. 21.

In step S201, it is determined whether the second communication method is available. When it is determined that the second communication method is available in step S201, the process proceeds to step S202.

In this case, since it is determined that the second communication method is available, it is determined that the registration process and the updating process are realized using the second communication method in step S202.

On the other hand, when it is determined that the second communication method is not available in step S201, the process proceeds to step S203. In step S203, it is determined whether the third communication method is available. When it is determined that the third communication method is available in step S203, the process proceeds to step S204. In step S204, it is determined whether the APDU command format is available in the third communication method. When it is determined that the APDU command format is available in step S204, the process proceeds to step S205.

In this case, since communication may be performed using the third communication method and the APDU command format in the third communication method is available, it is determined that the registration of the service and the update are performed using the third communication method in step S205.

On the other hand, when it is determined that the APDU command format is not available in step S204, the process proceeds to step S206. In step S206, it is determined whether the first communication method is available. When it is determined that the first communication method is available in step S206, the process proceeds to step S207. In step S207, it is determined whether the APDU command format is available in the first communication method. When it is determined that the APDU command format is available in step S207, the process proceeds to step S208.

In this case, since it is determined that the third and first communication methods and the APDU command format in the first communication method are available, it is determined that the registration of the service is performed using the third communication method or the first communication method and the update of the service name is performed using the APDU command in the first communication method in step S208.

On the other hand, when it is determined that the third communication method is not available in step S203, the process proceeds to step S209. In step S209, it is determined whether the first communication method is available. When it is determined that the first communication method is available in step S209, the process proceeds to step S210. In step S210, it is determined whether the APDU command format is available in the first communication method. When it is determined that the APDU command format is available in step S210, the process proceeds to step S211.

In this case, since it is determined that the first communication method and the APDU command format in the first communication method are available, it is determined that the registration process and the updating process are realized using the first communication method in step S211.

On the other hand, when it is determined that the first communication method is not available in step S209, the process proceeds to step S213. In this case, since it is determined that communication may not be performed using any one of the first to third communication methods, that is, communication with the CLF 224 is not performed using any one of the communication methods supported by the reader/writer 202, it is determined that communication is not available in step S213.

On the other hand, when it is determined that the first communication method is not available in step S206 or when it is determined that the APDU command format is not available in step S207 or step S210, the process proceeds to step S212. In this case, it is determined that the APDU commend format is not available. That is, it is determined that the update of the registry 253 is realized by additionally providing a function in the UICC 222 in step S212 (it is determined that the update is performed using an additional function of the UICC 222).

Sixth Process of Determining Communication Method

Figure 22:
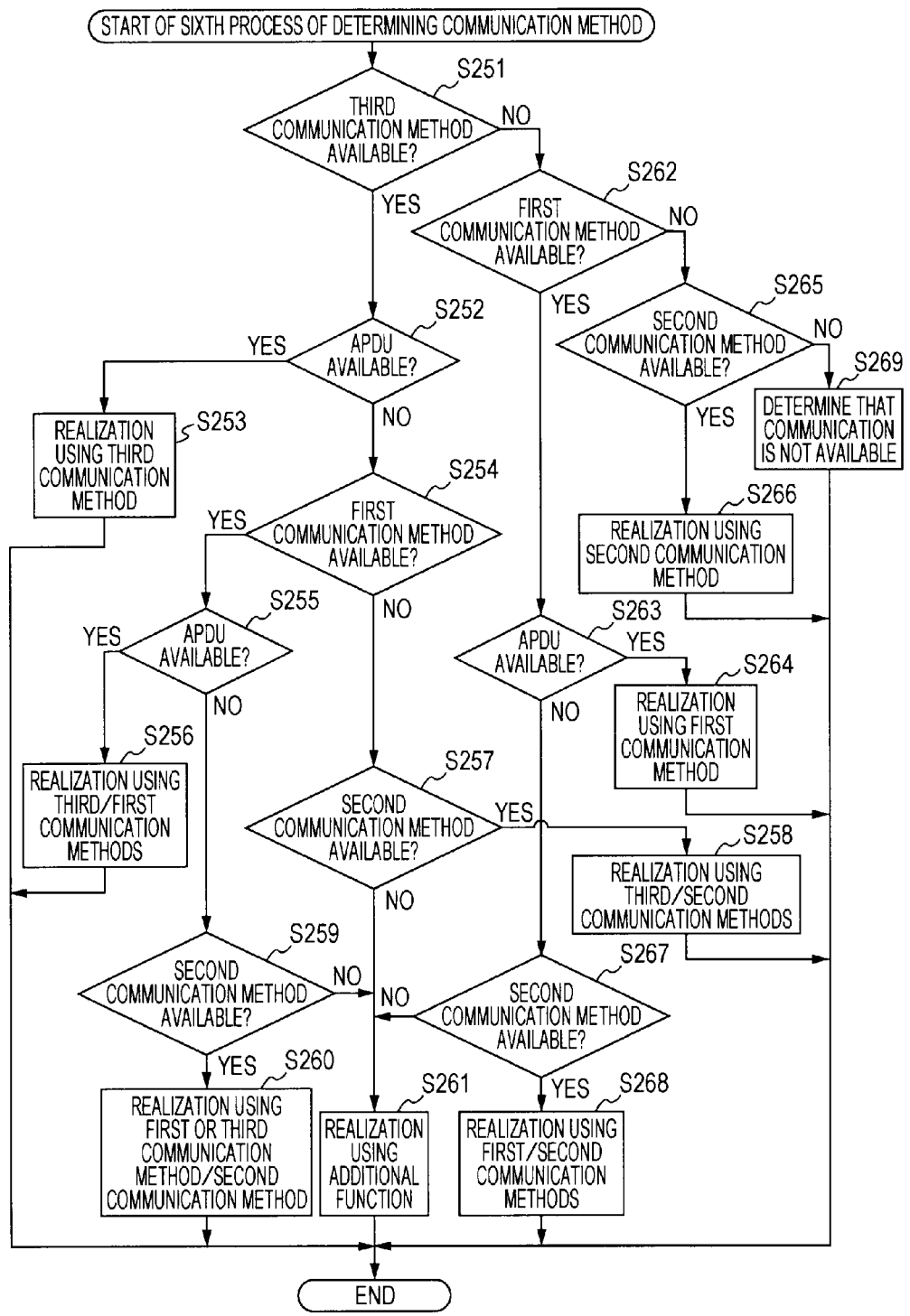
FIG. 22 is a flowchart illustrating a yet further process of determining a communication method.

As a sixth process of determining a communication method, a case where it is determined whether the third, first, and second communication methods are available in that order, and when it is determined that at least one of the communication methods is available, the communication method is selected so that a communication method is determined will be described with reference to a flowchart illustrated in FIG. 22.

In step S251, it is determined whether the third communication method is available. When it is determined that the third communication method is available in step S251, the process proceeds to step S252. In step S252, it is determined whether the APDU command format is available in the third communication method. When it is determined that the APDU command format is available in step S252, the process proceeds to step S253.

In this case, since it is determined that the third communication method is available and the APDU command format in the third communication method is available, it is determined that the registration of the service and the update are performed using the third communication method in step S253.

On the other hand, when it is determined that the APDU command format is not available in step S252, the process proceeds to step S254. In step S254, it is determined whether the first communication method is available. When it is determined that the first communication method is available in step S254, the process proceeds to step S255. In step S255, it is determined whether the APDU command format is available in the first communication method. When it is determined that the APDU command format is available in step S255, the process proceeds to step S256.

In this case, since it is determined that the third and first communication methods and the APDU command format in the first communication method are available, it is determined that the registration of the service and the update are performed using the third and first communication methods in step S256.

On the other hand, when it is determined that the first communication method is not available in step S254, the process proceeds to step S257. In step S257, it is determined whether the second communication method is available. When it is determined that the second communication method is available in step S257, the process proceeds to step S258.

In this case, since it is determined that the third and second communication methods are available, it is determined that the registration of the service and the update are performed using the third and second communication methods in step S258.

On the other hand, when it is determined that the APDU command format is not available in step S255, the process proceeds to step S259. In step S259, it is determined whether the second communication method is available. When it is determined that the second communication method is available in step S259, the process proceeds to step S260.

In this case, since it is determined that the third, first, and second communication methods are available and the APDU command format is not available in the third and first communication methods, it is determined that the registration is performed using the third and first communication methods and the update is performed using the second communication method in step S260.

On the other hand, when it is determined that the third communication method is not available in step S251, the process proceeds to step S262. In step S262, it is determined whether the first communication method is available. When it is determined that the first communication method is available in step S262, the process proceeds to step S263. In step S263, it is determined whether the APDU command format is available in the first communication method. When it is determined that the APDU command format is available in step S263, the process proceeds to step S264.

In this case, since it is determined that the first communication method and the APDU command format in the first communication method are available, it is determined that the registration and the update are performed using the first communication method in step S264.

On the other hand, when it is determined that the first communication method is not available in step S262, the process proceeds to step S265. In step S265, it is determined whether the second communication method is available. When it is determined that the second communication method is available in step S265, the process proceeds to step S266.

In this case, since it is determined that the second communication method is available, it is determined that the registration and the update are performed using the second communication method in step S266.

On the other hand, when it is determined that the APDU command format is not available in step S263, the process proceeds to step S267. In step S267, it is determined whether the second communication method is available. When it is determined that the second communication method is available in step S267, the process proceeds to step S268.

In this case, since it is determined that the first and second communication methods are available, it is determined that the registration process is performed using the first communication method and the updating process is performed using the second communication method in step S268.

On the other hand, when it is determined that the second communication method is not available in step S265, the process proceeds to step S269. In this case, since it is determined that communication is not available using any one of the first to third communication methods, that is, communication with the CLF 224 is not performed using any one of the communication methods supported by the reader/writer 202, it is determined that the communication is not available in step S269.

On the other hand, when it is determined that the second communication method is not available in step S257, step S259, or step S267, the process proceeds to step S261. When it is determined that the second communication method is not available in any one of these steps, it is determined that the APDU command format is not available.

In this case, it is determined that the update of the registry 253 is realized by additionally providing a function in the UICC 222 in step S261 (the update is performed using an additional function of the UICC 222).

Seventh Process of Determining Communication Method

As a seventh process of determining a communication method, a case where it is determined whether the third, second, and first communication methods are available in that order, and when it is determined that at least one of the communication methods is available, the method is selected so that a communication method is determined will be described with reference to a flowchart illustrated in FIG. 23.

In step S301, it is determined whether the third communication method is available. When it is determined that the third communication method is available in step S301, the process proceeds to step S302. In step S302, it is determined whether the APDU command format is available in the third communication method. When it is determined that the APDU command format is available in step S302, the process proceeds to step S303.

In this case, since the third communication method is available and the APDU command format in the third communication method is available, it is determined that the registration and the update are performed using the third communication method in step S303.

On the other hand, when it is determined that the APDU command format is not available in step S302, the process proceeds to step S304. In step S304, it is determined whether the second communication method is available. When it is determined that the second communication method is available in step S304, the process proceeds to step S305.

In this case, since it is determined that the third and second communication methods are available, it is determined that the registration process and the updating process are realized using the third and second communication methods in step S305.

On the other hand, when it is determined that the second communication method is not available in step S304, the process proceeds to step S306. In step S306, it is determined whether the first communication method is available. When it is determined that the first communication method is available in step S306, the process proceeds to step S307. In step S307, it is determined whether the APDU command format is available in the first communication method. When it is determined that the APDU command format is available in step S307, the process proceeds to step S308.

In this case, since it is determined that the third and first communication methods and the APDU command format in the first communication method are available, it is determined that the registration of the service is performed using the third communication method or the first communication method, and the registration of the service name is performed using the APDU command format in the first communication method in step S308.

On the other hand, when it is determined that the third communication method is not available in step S301, the process proceeds to step S310. In step S310, it is determined whether the second communication method is available. When it is determined that the second communication method is available in step S310, the process proceeds to step S311.

In this case, since it is determined that the second communication method is available, it is determined that the registration process and the updating process are realized using the second communication method in step S311.

On the other hand, when it is determined that the second communication method is not available in step S310, the process proceeds to step S312. In step S312, it is determined whether the first communication method is available. When it is determined that the first communication method is available in step S312, the process proceeds to step S313. In step S313, it is determined whether the APDU command format is available in the first communication method. When it is determined that the APDU command format is available in step S313, the process proceeds to step S314.

In this case, since it is determined that the first communication method and the APDU command format in the first communication method are available, it is determined that the registration process and the updating process are realized using the first communication method in step S314.

On the other hand, when it is determined that the first communication method is not available in step S312, the process proceeds to step S315. In this case, since it is determined that communication is not available using any one of the first to third communication methods, that is, communication with the CLF 224 is not performed using any one of the communication methods supported by the reader/writer 202, it is determined that the communication is not available in step S315.

On the other hand, when it is determined that the first communication method is not available in step S306 or when it is determined that the APDU command format is not available in step S307 or step S313, the process proceeds to step S309. In this case, it is determined that the APDU command format is not available. Therefore, it is determined that the update of the registry 253 is realized by additionally providing a function in the UICC 222 in step S309 (the update is performed using an additional function of the UICC 222).

Eighth Process of Determining Communication Method

Figure 24:
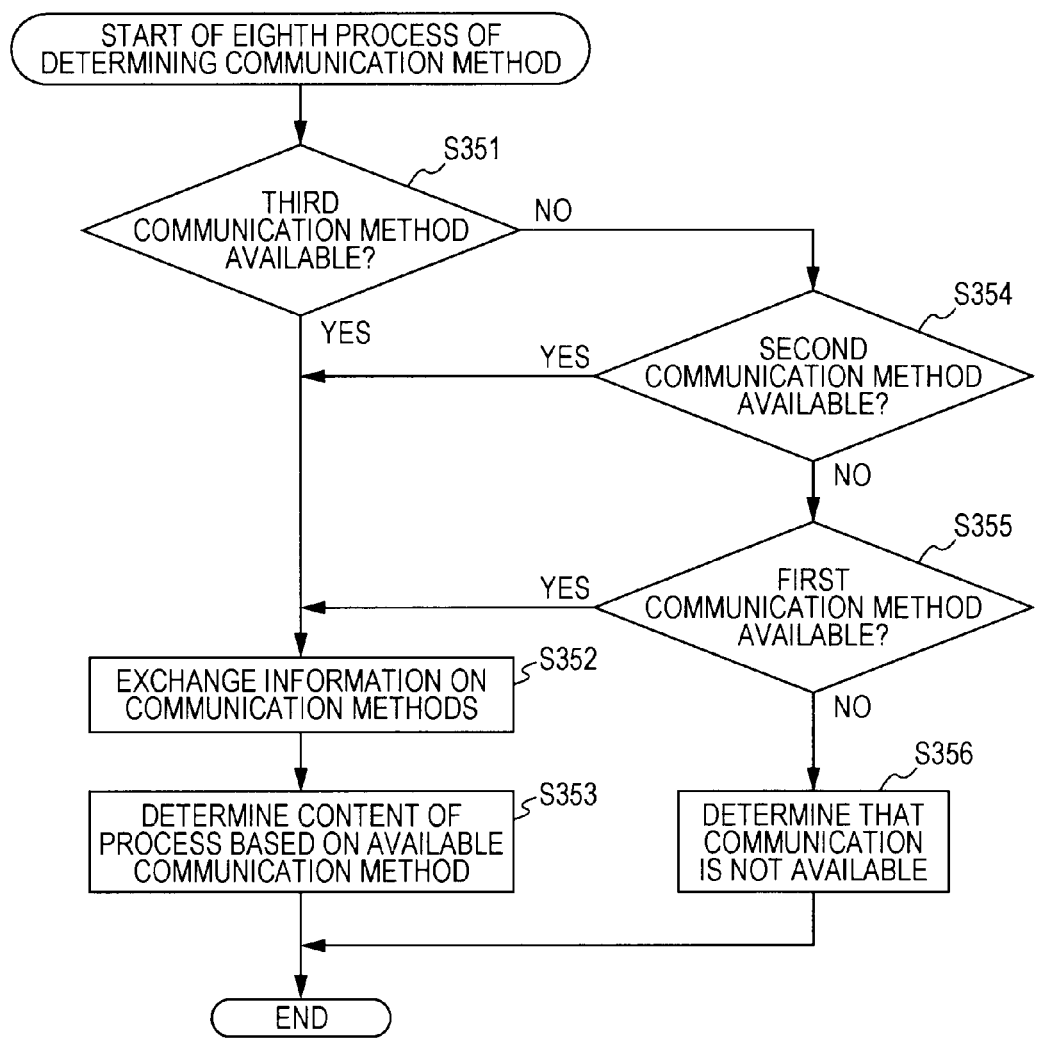
FIG. 24 is a flowchart illustrating a yet further process of determining a communication method.

As an eighth process of determining a communication method, a case where communication with the cellular phone 201 is performed so that information on a communication method supported by the cellular phone 201 is obtained whereby a communication method is determined will be described with reference to a flowchart illustrated in FIG. 24.

In step S351, it is determined whether the third communication method is available. When it is determined that the third communication method is available in step S351, the process proceeds to step S352. In step S352, information on communication methods is exchanged.

In this case, since it is determined that the third communication method is available in step S351, communication with the cellular phone 201 is performed using the third communication method, and information on communication methods supported by the cellular phone 201 and information on communication methods supported by the reader/writer 202 are exchanged.

The exchange of the information on communication methods is performed such that the reader/writer 202 supplies a command to notify the reader/writer 202 of communication methods supported by the cellular phone 201 to the cellular phone 201 using the third communication method and the cellular phone 201 transmits the communication methods supported by the cellular phone 201 in response to the received command.

Alternatively, the exchange of the information on the supported communication methods may be performed such that the reader/writer 202 notifies the cellular phone 201 of the communication methods supported by the reader/writer 202 using the third communication method, and the cellular phone 201 selects at least one of the communication methods supported by the cellular phone 201 from among the notified communication methods and returns information on the selection to the reader/writer 202.

After the exchange of information on the communication methods is performed in step S352, the process proceeds to step S353. In step S353, as a result of the information exchange, processing content is determined from among the obtained communication methods. The processing content represents execution of the registration process and the updating process using the third communication method, for example.

On the other hand, when it is determined that the communication is not available using the third communication method in step S351, the process proceeds to step S354. In step S354, it is determined whether the second communication method is available. When it is determined that the second communication method is available in step S354, the process proceeds to step S352.

Although the process performed in step S352 has been described hereinabove, this case is different from the case described above in that the second communication method is used for information exchange. Then, in step S353, processing content is determined in accordance with information on a communication method obtained as a result of the information exchange.

On the other hand, when it is determined that the second communication method is not available in step S354, the process proceeds to step S355. In step S355, it is determined whether the first communication method is available. When it is determined that the first communication method is available in step S355, the process proceeds to step S352.

Although the process performed in step S352 has been described hereinabove, this case is different from the case described above in that the first communication method is used for information exchange. Then, in step S353, processing content is determined in accordance with information on a communication method obtained as a result of the information exchange.

On the other hand, when it is determined that the first communication method is not available in step S355, the process proceeds to step S356. In this case, since it is determined that the first to third communication methods are not available, it is determined that the communication with the cellular phone 201 is not available in step S356, and the process is terminated.

When the reader/writer 202 may perform communication using a plurality of communication methods, one of the communication methods is selected and it is determined whether the reader/writer 202 may communicate with the UICC 222 using the selected communication method. When it is determined that the communication is available, information exchange is performed with the UICC 222 using the communication method, and one of the communication methods is selected in accordance with a result of the information exchange.

Note that, although the case where the determinations as to whether the third, second, and first communication methods are available are performed in that order has been described here, the order is not limited to this.

In this embodiment, the first to eighth determination processes are taken as examples of a process of determining a communication method. However, a determination as to which one of the determination processes is used may be made depending on a design phase of the reader/writer 202 or an installation location of the reader/writer 202.

Furthermore, when the user may determine a communication method, at least one of the first to eighth determination processes may be selected in accordance with the communication method determined by the user. For example, in the second to eighth determination methods, it is determined first whether one of the first to third communication methods is available. Accordingly, one of the determination processes in which it is first determined whether the communication method selected by the user is available may be selected.

Figure 19:
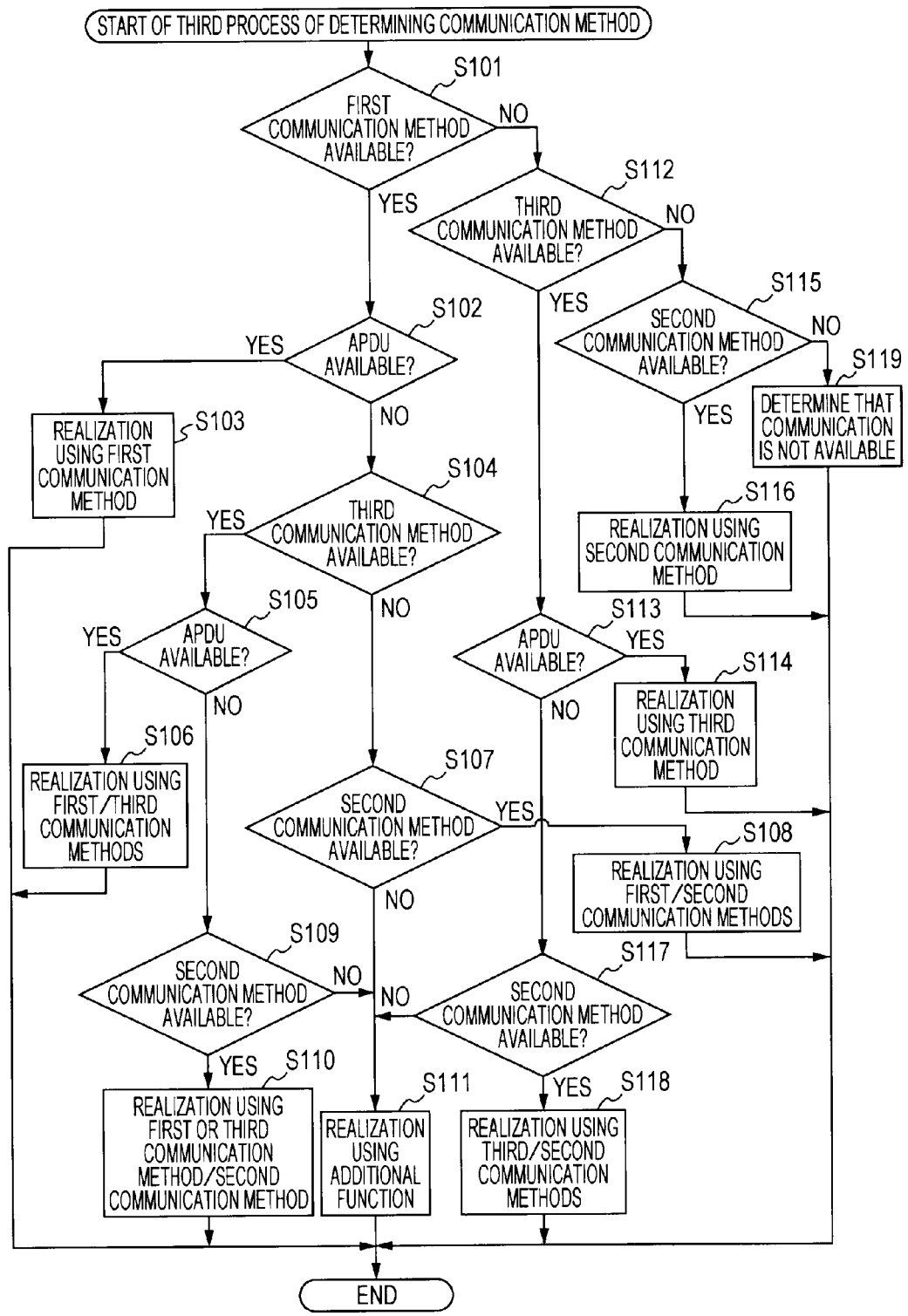
FIG. 19 is a flowchart illustrating yet another process of determining a communication method.

When the user selects the first communication method, for example, the second determination process illustrated in the flowchart of FIG. 18 may be started or the third determination process illustrated in the flowchart of FIG. 19 may be started. Furthermore, in this case, in the eighth determination process illustrated in the flowchart shown in FIG. 24, a process of determining whether the first communication method is available may be first executed.

Processes Regarding Registration and Update

By performing the processes described above, a communication method used for registration of a service and a communication method used for update of the registry 253 (process of registering a service name) are determined. Here, combinations of communication methods which may be highly likely to be set as results of the processes described above will now be listed.

First Combination (determined in step S314 of FIG. 23, for example): Both of the registration and the update are performed using the first communication method (that is, the APDU command format is available in the first communication method).

Second Combination (determined in step S311 of FIG. 23, for example): Both of the registration and the update are performed using the second communication method.

Third Combination (determined in step S303 of FIG. 23, for example): Both of the registration and the update are performed using the third communication method (that is, the APDU command format is available in the third communication method).

Fourth Combination (determined in step S55 of FIG. 18): The registration is performed using the first communication method and the update is performed using the second communication method (that is, the APDU command format is not available in the first communication method).

Fifth Combination (determined in step S260 of FIG. 22): The registration is performed using the first communication method or the third communication method, and the update is performed using the second communication method (that is, the APDU command format is not available in the first and third communication methods).

Sixth Combination (determined in step S305 of FIG. 23): The registration is performed using the third communication method and the update is performed using the second communication method (that is, the APDU command format is not available in the third communication method).

Seventh Combination (determined in step S58 of FIG. 18): The registration is performed using the first communication method and the update is performed using the third communication method (that is, the APDU command is not available in the first communication method).

Eighth Combination (determined in step S308 of FIG. 23, for example): The registration is performed using the third communication method and the update is performed using the first communication method (that is, the APDU command format is not available in the third communication method).

Ninth Combination (determined in step S309 of FIG. 23): The registration and the update are realized using an additional function (that is, a function is added to the UICC 222 so as to perform the registration and the update).

The nine combinations may be set as described above. Furthermore, although a wired communication method is not included in the processes of determining a communication method, a wired communication method corresponding to the communication path 353 illustrated in FIG. 9, for example, from the host 221 through the UART 223 may be used.

Here, a case where the third application 256 provides the 3-1 service 257, the 3-2 service 258, and the 3-3 service 259 as described above will be described as an example. Furthermore, a case where the 3-1 service 257 is additionally registered in the third application 256 (corresponding to the case which is described with reference to FIG. 14) will be described as an example.

The 3-1 service 257 may be registered and updated using combinations of commands illustrated in FIG. 25. Referring to FIG. 25, a communication method used in the combination number 1 corresponds to the first communication method or the second communication method. The combination number 1 corresponds to the first combination or the second combination described above.

In the combination number 1, since the APDU command format is transmittable/receivable, the APDU command format is used for the registration of a service and the registration of a service name. In this case, when the service is registered, data obtained by associating a packet conforming to the APDU command format in the set communication method (the first communication method or the second communication method in this case) with a third command which is unique to the third application 256 is generated, and the generated data is transmitted/received. Specifically, in this case, when a service is registered, the third command which is wrapped with the APDU command format is used. Furthermore, when a service name is registered (when the registry 253 is updated), an APDU command is used.

The communication method used in the combination number 2 is the third communication method. The combination number 2 corresponds to the third combination described above. In the combination number 2, since the APDU command format and the third packet are transmittable/receivable, the APDU command format and the third packet are used for the registration of a service and the registration of a service name. In this case, the service is registered using the third command. Furthermore, the service name is registered using the APDU command, and a packet thereof conforms to the APDU command format in the third communication method.

Furthermore, in the combination number 2, similarly to the combination number 1, the service may be registered using the third command which is wrapped with the APDU command format, and the service name may be registered (the registry 253 is updated) using the APDU command in the third communication method.

A communication method used in the combination number 3 includes a combination of the first and third communication methods and a combination of the second and third communication methods. The combination number 3 corresponds to the fifth to eighth combinations described above. In the combination number 3, since the APDU command format and the third packet are transmittable/receivable, the registration of a service and the registration of a service name are performed using the APDU command format and the third packet.

In this case, when the third communication method supports the APDU command format, similarly to the combination number 2, a service is registered using the third command and a service name is registered using the APDU command. On the other hand, when the third communication method does not support the APDU command format, a service is registered using the third command which is wrapped with the APDU command format and a service name is registered using the APDU command. In this case, the APDU command format which wraps the third command is transmitted/received in accordance with the first communication method or the second communication method which supports the APDU command format.

The communication methods used in the combination numbers 4 to 6 are wired communication methods. In the combination number 4, the APDU command format is transmittable/receivable. Similarly to the combination number 1, a service is registered using the third command which is wrapped with the APDU command format and a service name is registered using the APDU command.

In the combination number 5, the APDU command format and a packet conforming to a wired protocol are transmittable/receivable. A service is registered using the third command and a service name is registered using the APDU command. Alternatively, similarly to the combination number 4, a service may be registered using the third command which is wrapped with the APDU command format and a service name may be registered using the APDU command.

A communication method used in the combination number 6 is a wired communication method. In the combination number 6, a packet conforming to a wired protocol is transmittable/receivable. A communication method used in the combination number 7 is the third communication method. In the combination number 7, the third packet is transmittable/receivable. The combination numbers 6 and 7 correspond to the ninth combination described above. In the combination numbers 6 and 7, only a communication method using a unique packet is supported.

When only a communication method using a unique packet is allowed to be performed, registration of a service and registration of a service name are not performed only by processing a packet and the like using the reader/writer 202. Therefore, an additional function is added to the UICC 222 so as to perform the registration and the update. For example, new service registration data and a new command (or a block) are added through an application (through the third application 256 in this case) and the registration and the update of a service are performed.

Next, a process of registering a service executed in step S2 (shown in FIG. 16) and a process of registering a service name executed in step S3 will be described in addition to processes performed by the cellular phone 201 with reference to flowcharts.

Registrations of Service and Service Name Using Third Communication Method and Second Communication Method First, referring to flowcharts illustrated in FIGS. 26 and 27, a case where it is determined that the third communication method is available, the APDU command format in the third communication is not available, and the second communication is available will be described.

Figure 23:
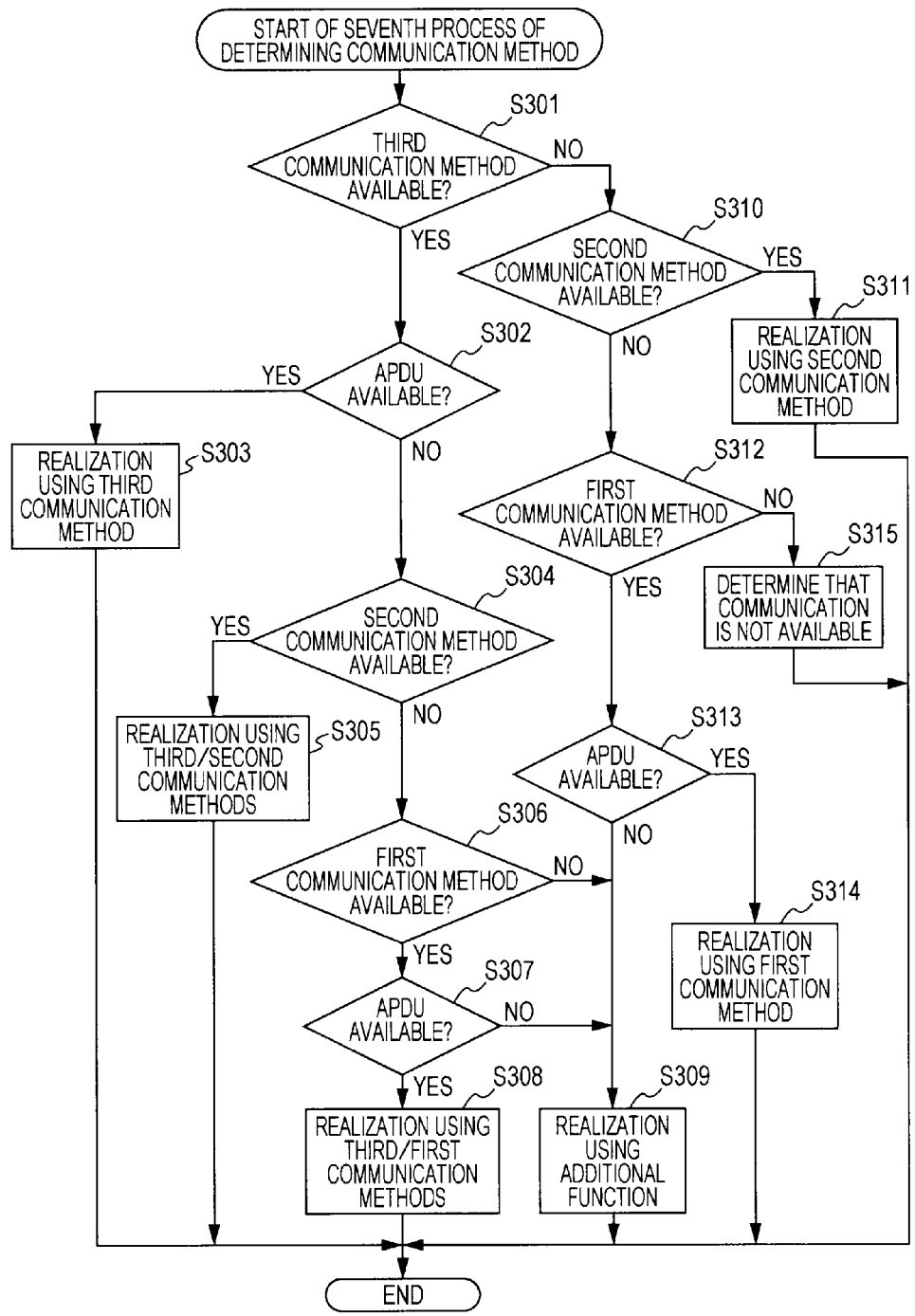
FIG. 23 is a flowchart illustrating a yet further process of determining a communication method.

This determination is made in a case where the process of a flowchart illustrated in FIG. 23 is executed, and as a result of the determination, it is determined that a registration and an update are realized using the third/second communication methods in step S305. This case corresponds to the fifth combination or the sixth combination. Furthermore, this case corresponds to the combination number 3 in FIG. 25.

Figure 26:
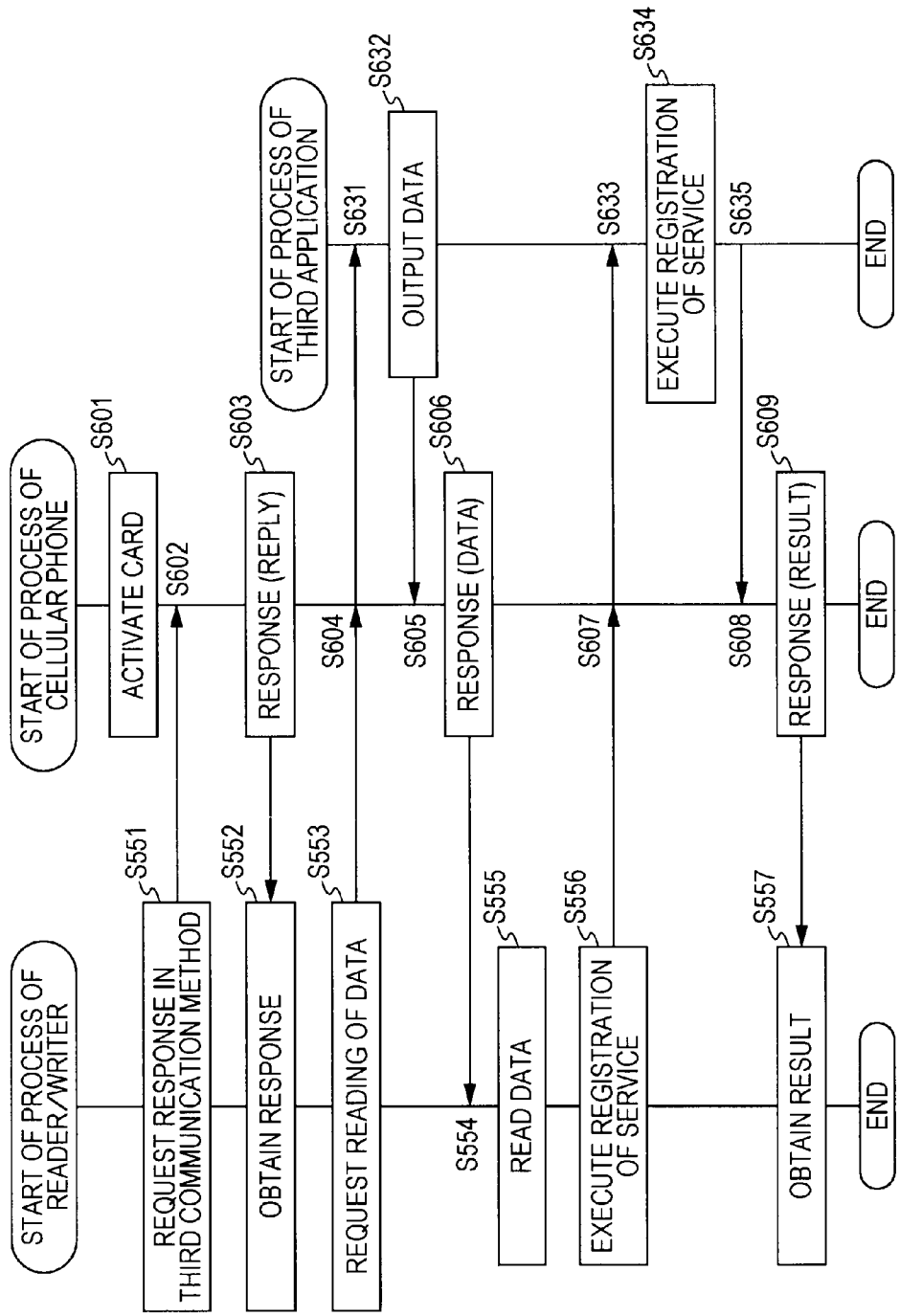
FIG. 26 is a flowchart illustrating registration of a service and a service name.
Figure 27:
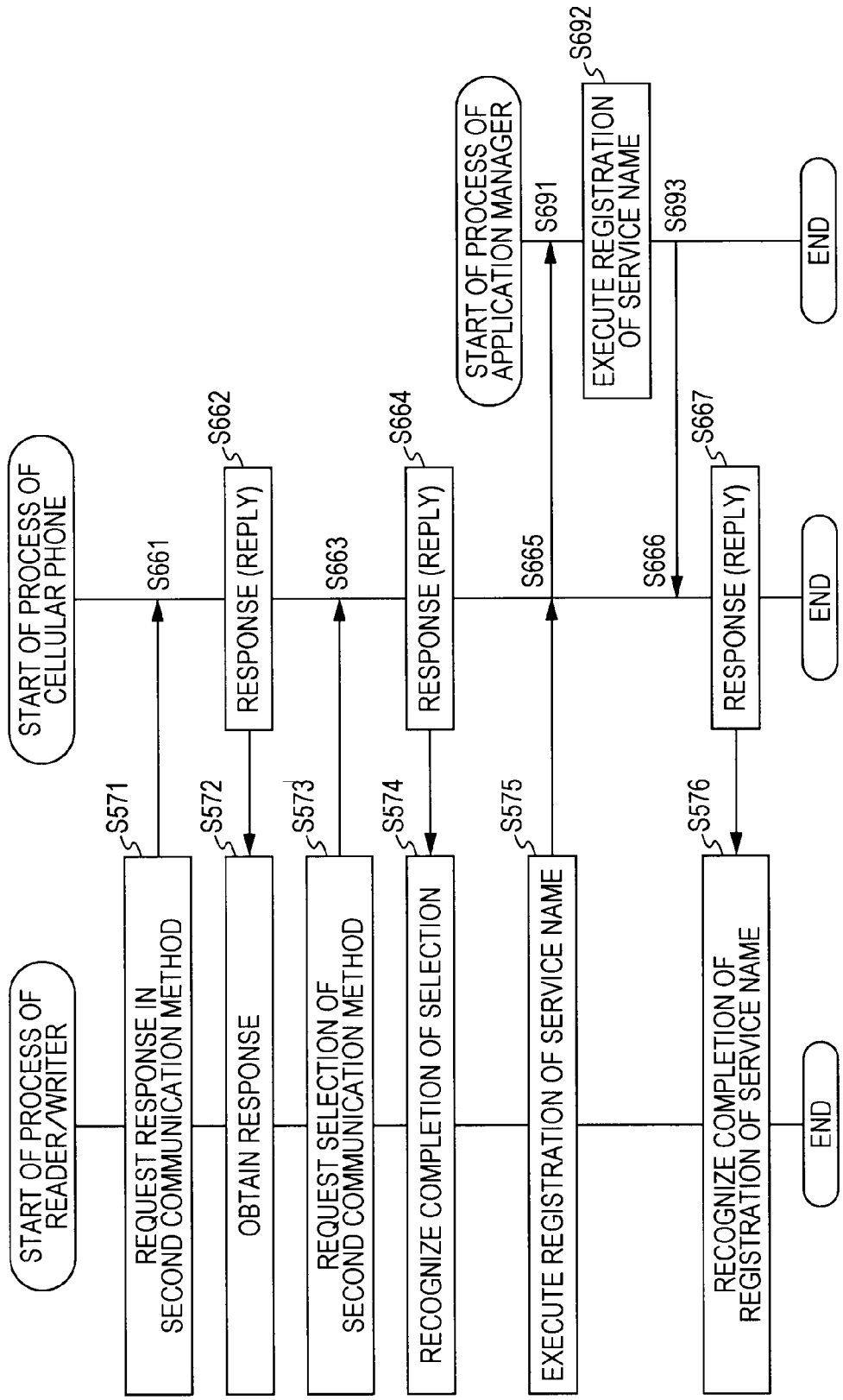
FIG. 27 is a flowchart illustrating another registration of a service and a service name.

The flowchart illustrated in FIG. 26 represents a process of registering a service. First, in step S601, the cellular phone 201 activates a card. The card corresponds to the UICC 222. Note that the activation of the card is performed in the cellular phone 201 when the process of determining a communication method is performed by the reader/writer 202 in step S1 (shown in FIG. 16) so that the reader/writer 202 and the cellular phone 201 (the CLF 224) communicate with each other.

In step S551, the reader/writer 202 requests the cellular phone 201 to reply using the third communication method. When receiving the request in step S602, the cellular phone 201 (the CLF 224) transmits a response in step S603. In this case, the response represents that communication using the third communication method is accepted. When receiving the response from the cellular phone 201 (the CLF 224) in step S552, the reader/writer 202 requests the cellular phone 201 (the CLF 224) to read data in step S553.

When receiving the request for reading data from the reader/writer 202 in step S604, the cellular phone 201 (the CLF 224) transmits the request to the third application 256. In this case, since the communication is performed using the third communication method, the reader/writer 202 supplies the third packet to the third application 256 through the CLF 224 (shown in FIG. 9). Specifically, in this case, the packet is transmitted from the reader/writer 202 to the third application 256 through the communication path 351 in FIG. 9.

When the request for reading data from the reader/writer 202 through the communication path 351 (shown in FIG. 9) is received in step S631, the data corresponding to the reading request is read in step S632 and is supplied to and received by the cellular phone 201 (the CLF 224) in step S605. In step S606, the CLF 224 transmits the data supplied from the third application 256 as a response to the request from the reader/writer 202.

When receiving the data from the cellular phone 201 (the CLF 224) as the response in step S554, the reader/writer 202 checks a state of the card included in the read data and checks a service to be registered in step S555. For example, when the 3-1 service 257 (shown in FIG. 14) has not been registered, data corresponding to the 3-1 service 257 is prepared. When the data is prepared, registration of the service is executed.

In this case, since the service registration is performed using the third packet in the third communication method, the data used for the service registration is packetized as a third packet and the packet is transmitted to the cellular phone 201 (the CLF 224) in step S556. This process corresponds to the process of transmitting the service registration data 431 illustrated with reference to FIG. 14. When receiving the service registration data from the reader/writer 202 in step S607, the cellular phone 201 (the CLF 224) supplies the received data to the third application 256.

When receiving the supplied data in step S633, the third application 256 executes the process of registering the service in step S634. In step S634, the third application 256 executes the service registration. As a result, when the service registration is successfully performed or fails, a result of the registration process is output in step S635.

When receiving the result in step S608, the cellular phone 201 (the CLF 224) transmits the result of the registration process performed by the third application 256 to the reader/writer 202 as a response in step S609. In step S557, the response from the cellular phone 201 (the CLF 224) is received by the reader/writer 202 in step S557.

When the response represents that the registration of a service is successfully performed in the cellular phone 201, the reader/writer 202 starts a process of registering a service name (which will be described hereinafter with reference to FIG. 27) whereas when the response represents that the registration fails, the reader/writer 202 executes a process of registering a service by executing the process in step S556. Furthermore, when the response from the cellular phone 201 (the CLF 224) represents a failure, the processing of registering the service may be performed using a communication method which is different from that set at that time. In this embodiment, the description will be continued assuming that the process of registering a service has been successfully performed.

When it is determined that the process of registering a service is successfully performed, a process of registering a service name is started. The process of registering a service name will be described with reference to the flowchart illustrated in FIG. 27. In this case, since the process of registering a service described above is performed using the third communication method and the process of registering a service name is performed using the second communication method, the communication methods should be switched from one to another. Therefore, in step S571, the reader/writer 202 requests the cellular phone 201 (the CLF 224) to reply in the second communication method.

When receiving the request in step S661, the cellular phone 201 (CLF 224) transmits a response in step S662. In this case, the response represents that a communication in the second communication method is accepted. When receiving the response from the cellular phone 201 (the CLF 224) in step S572, the reader/writer 202 requests the cellular phone 201 to select the second communication method in step S573.

When receiving the request in step S663, the cellular phone 201 (the CLF 224) enters a mode in which the communication is performed in the second communication method, and thereafter, transmits a response (reply) in step S664 representing that the second communication method is selected to the reader/writer 202. When receiving the response in step S574, the reader/writer 202 checks the received response so as to recognize that the second communication method is selected in the cellular phone 201.

By this, when the reader/writer 202 and the cellular phone 201 (the CLF 224) start communicating with each other using the second communication method, the reader/writer 202 performs the process of registering a service name in step S575. For example, in this case, since the 3-1 service 257 has been registered, a packet used to register a service name of the 3-1 service 257 to the registry 253 is generated. Furthermore, the generated packet conforms to the second communication method, that is, the generated packet includes data conforming to the APDU command format in this case.

The data transmitted from the reader/writer 202 to the cellular phone 201 by executing the process of registering a service name by the reader/writer 202 is received by the cellular phone 201 in step S665. The received data is supplied to the application manager 252.

Since the data conforms to the APDU command format, the APDU command format supplied from the CLF 224 is supplied to the application manager 252 through the UICC hardware 251. The APDU command format may be processed by the application manager 252. When receiving the data conforming to the APDU command format which is associated with the registration of a service name in step S691, the application manager 252 executes the process of registering a service name in step S692.

The application manager 252 writes information such as the name, a type, and so on of the service which is newly registered in the registry 253 in accordance with the received APDU command. The information such as a name, a type, and the like is included in the APDU command supplied from the reader/writer 202.

When the registration of a service name and the like is terminated in step S692, the application manager 252 outputs a result of the process to the CLF 224 in step S693. When receiving the processing result from the application manager 252 in step S666, the CLF 224 transmits a response to the reader/writer 202 in step S667. The response includes information representing whether the process of registering a service name has been successfully performed.

When receiving the result in step S576, the reader/writer 202 recognizes completion of the registration of a service name when the response represents success, and thereafter, the process is terminated. On the other hand, when the received response represents failure, the process of registering a service name is performed again by executing the process of step S575, for example.

As described above, when the 3-1 service 257 provided by the third application 256 is registered, the third communication method (the third packet and the third command) which is supported by the third application 256 is used for the registration. On the other hand, the second communication method (APDU command) which is supported by the application manager 252 is used for information on the 3-1 service 257, for example, information on a name of the 3-1 service 257, a type of the service to be provided, and the like.

Accordingly, by performing registration of services and registration of service names as described above, the application manager 252 may manage the information on the registered services. Since the information on the registered services is managed in the registry 253, the information may be viewed using the viewer 241. Since the information may be viewed using the viewer 241, the information may be provided for the user.

Therefore, when the third application 256 provides the integrated service and provides the three services, i.e., the 3-1 service 257, the 3-2 service 258, and the 3-3 service 259, display of the three services may be performed for the user. A display method will be described hereinafter, and first, registration of a service and a service name using another combination of communication methods will be described.

Registration of Service and Service Name in Second Communication Method

Next, a case where it is determined that only the second communication method is available (registration of a service and a service name is performed using the second communication method) will be described with reference to FIGS. 28 and 29.

This determination is made when the process illustrated in the flowchart shown in FIG. 23 is performed, and as a result, it is determined that the registration is realized using the second communication method in step S311. A flowchart illustrated in FIG. 28 represents a process of registering a service. First, in step S801, the cellular phone 201 activates a card (the UICC 222).

In step S701, the reader/writer 202 requests the cellular phone 201 (the CLF 224) to reply using the second communication method. When receiving the request in step S802, the cellular phone 201 (the CLF 224) transmits a response in step S803. In this case, the response represents that the communication using the second communication method is accepted. When receiving the response from the cellular phone 201 (the CLF 224) in step S702, the reader/writer 202 requests the cellular phone 201 (the CLF 224) to select the second communication method in step S703.

When receiving the request in step S804, the cellular phone 201 (the CLF 224) changes its state to a state in which the communication is performed using the second communication method, and thereafter, transmits a response (reply) representing that the second communication method is selected to the reader/writer 202 in step S805. When receiving the response in step S704, the reader/writer 202 recognizes that the second communication method is selected in the cellular phone 201 by checking the received response.

In this way, when the reader/writer 202 and the cellular phone 201 (the CLF 224) start communicating with each other using the second communication method, the reader/writer 202 requests the cellular phone 201 (the CLF 224) to read data in step S705.

When receiving the request for reading data from the reader/writer 202 in step S806, the cellular phone 201 (the CLF 224) transmits the request to the third application 256. In this case, since the communication is performed in the second communication method, a third command wrapped with the APDU command format is supplied from the reader/writer 202 to the UICC hardware 251 through the CLF 224 (shown in FIG. 9), and the third command is further supplied from the UICC hardware 251 to the application manager 252. The application manager 252 processes a supplied APDU command format so as to extract the third command and supplies the third command to the third application 256.

This flow of the packet corresponds to the communication path 352 described with reference to FIG. 9. When receiving a request for reading data from the reader/writer 202 through the communication path 352 in step S831, the third application 256 reads data requested by the third command and supplies the data to the cellular phone 201 (the CLF 224) in step S832. When receiving the data supplied from the third application 256 in step S807, the CLF 224 transmits the data as a response to the request from the reader/writer 202 in step S808.

The reader/writer 202 which obtained the data from the cellular phone 201 as the response in step S706 reads data corresponding to a registered service in step S707. For example, when the 3-1 service 257 (shown in FIG. 14) has not been registered in service list information, the 3-1 service 257 should be registered. After the data is read, the state of the card is checked, and since it is determined that a service to be registered does not exist, the registration of a service is executed in step S708.

In this case, since the service is registered using the APDU command format in the second communication method, a process of packetizing the data for the service registration in the APDU command format and transmitting the data to the cellular phone 201 using the second communication method is performed in step S708. When receiving the data for the service registration from the reader/writer 202 in step S809, the cellular phone 201 (the application manager 252) transmits the received data to the third application 256.

When receiving the supplied data in step S833, the third application 256 executes the process of registering a service in step S834. In step S834, the third application 256 executes the service registration. When the registration is successfully performed or fails, a result of the registration process is supplied to the application manager 252 in step S835.

When receiving the result in step S810, the application manager 252 transmits the result of the registration process performed by the third application 256 to the reader/writer 202 as a response in step S811. In step S709, the response from the cellular phone 201 is received by the reader/writer 202.

When the received response represents that the service registration is successfully performed in the cellular phone 201, the reader/writer 202 subsequently starts the process of registering a service name (which will be described hereinafter with reference to FIG. 29) whereas when the response represents that the service registration fails, the reader/writer 202 executes the process of registering a service by executing the process of step S708 again, for example. Here, the description is continued assuming that the service registration is successfully performed.

In this way, when the 3-1 service 257 provided by the third application 256 is registered, data obtained by associating the packet (APDU command format) used in the determined communication method with a command unique to the third application 256 is generated, and the data is transmitted/received whereby the registration process is executed. That is, when the 3-1 service 257 provided by the third application 256 is registered, the third command used in the third application 256 is wrapped with the APDU command format and the registration process is performed.

A process of registering information on the registered service, for example, information on a service name and a service type which is subsequently performed after the service is registered by performing the process described above, will be described with reference to a flowchart illustrated in FIG. 29.

In this case, since the communication using the second communication method is started when the service is registered, the reader/writer 202 and the cellular phone 201 may communicate with each other using the second communication method. Therefore, a process of starting the communication using the second communication method is omitted, and in step S751, the reader/writer 202 executes a process of registering a service name.

In this case, for example, since the 3-1 service 257 has been registered, a packet used to register a service name of the 3-1 service 257 to the registry 253 included in the application manager 252 of the UICC is generated. Furthermore, the generated packet supports the second communication method, that is, the packet includes an APDU command.

When the reader/writer 202 executes the process of registering a service name in step S751, data transmitted from the reader/writer 202 to the cellular phone 201 is received by the cellular phone 201 (the CLF 224) in step S851. The received data is supplied to the application manager 252.

Since the data conforms to the APDU command format, the APDU command received by the CLF 224 is supplied to the application manager 252 through the UICC hardware 251. When receiving the data which is associated with the registration of a service name as the APDU command in step S881, the application manager 252 executes the process of registering a service name in step S882.

The application manager 252 writes information on a name, a type, and the like of the service which is newly registered to the registry 253 in accordance with the received APDU command. The information on a name, a type, and the like is also included in the APDU command supplied from the reader/writer 202.

After the registration of a service name and the like is terminated in step S882, the application manager 252 outputs a result of the process to the CLF 224 in step S883. When receiving the processing result from the application manager 252 in step S852, the CLF 224 transmits a response to the reader/writer 202 in step S853. The response includes information representing whether the process of registering a service name has been successfully performed.

When receiving the result in step S752, the reader/writer 202 recognizes completion of the registration of a service name when the response represents that the process has been successfully performed. On the other hand, when the received response represents that the process has failed, the process in step S751 is performed again whereby the process of registering a service name is performed again.

In this way, when the 3-1 service 257 provided by the third application 256 is registered, the third command supported by the third application 256 which is wrapped with the APDU command format supported by the application manager 252 is used.

Furthermore, the APDU command supported by the application manager 252 is used for the information on the 3-1 service 257, for example, the information on a name of the 3-1 service 257 and the information on a type of the service to be provided.

As described above, by registering the service and the service name, the application manager 252 manages the information on the registered service. Since the information on the registered service is managed, the information may be viewed using the viewer 241. Since the information may be viewed using the viewer 241, the information may be provided for the user.

Process Performed by Application Manager

The UICC 222 may include an application referred to as an "application manager". The UICC 222 illustrated in FIG. 30 includes an application manager 601. The application manager 601 is stored in an IC chip implemented on a certain IC card, that is, the UICC 222 in this case, and performs control such as management of resources included in the UICC 222 and download of an application from an external device.

When the UICC 222 includes the application manager 601, an application which supports wireless communication, for example, the first application 254, the second application 255, or the third application 256 is implemented at a time of installation using the application manager 601. Each of the wireless-communication-compliant applications should obtain (select) an operation authority from a runtime environment of the application at a time of operation. Furthermore, when each of the applications is executed, the application manager 601 does not directly affect the application.

Figure 30:
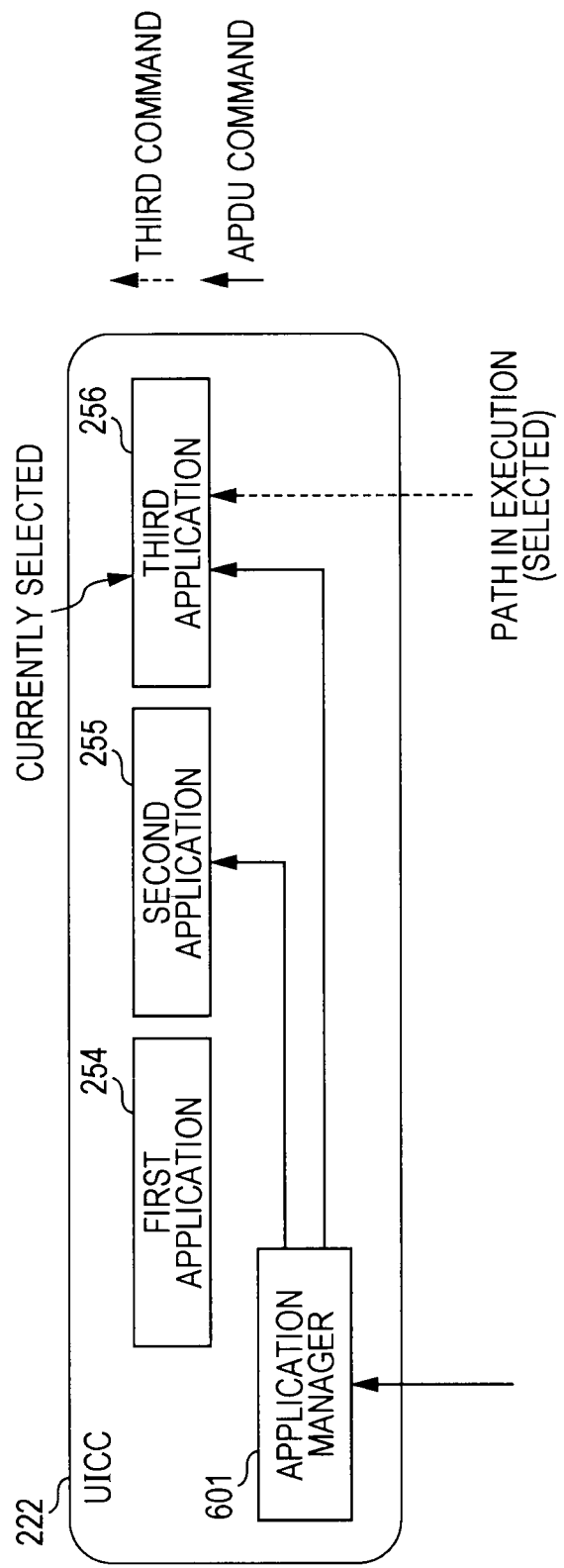
FIG. 30 is a diagram illustrating an application manager.

As illustrated in FIG. 30, an APDU command is used to install the second and third applications 255 and 256 through the application manager 601, for example. After the installation, when the third application 256 is selected by the application manager 601, the third application 256 is activated without using the application manager 601. In this case, the third packet is directly supplied to the third application 256.

Figure 31:
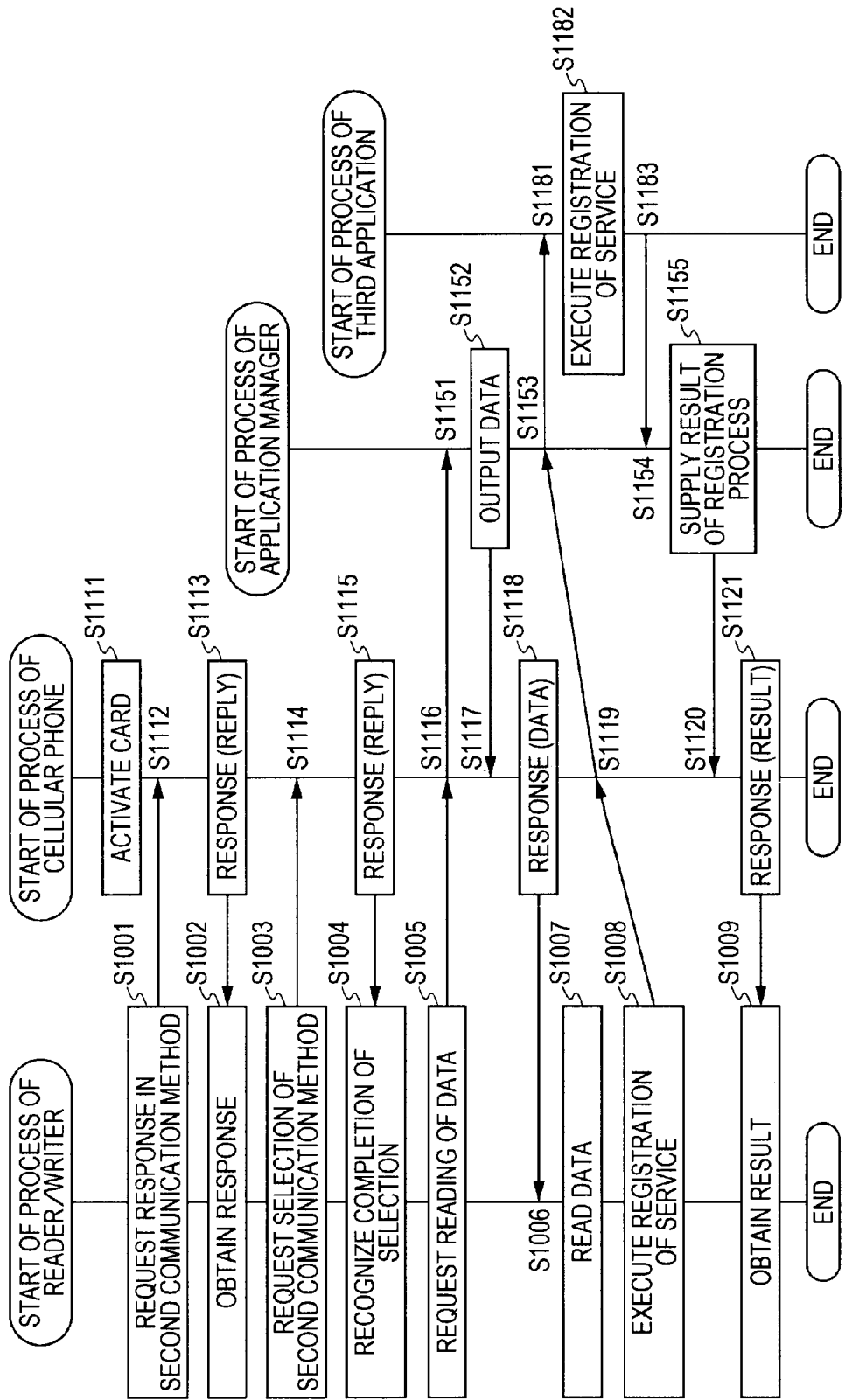
FIG. 31 is a flowchart illustrating further registration of a service and a service name.

In a case where the UICC 222 includes the application manager 601 as described above, when the 3-1 service 257 is registered using the second communication method described with reference to the flowchart illustrated in FIG. 28, the process is performed in accordance with a flowchart illustrated in FIG. 31.

Figure 28:
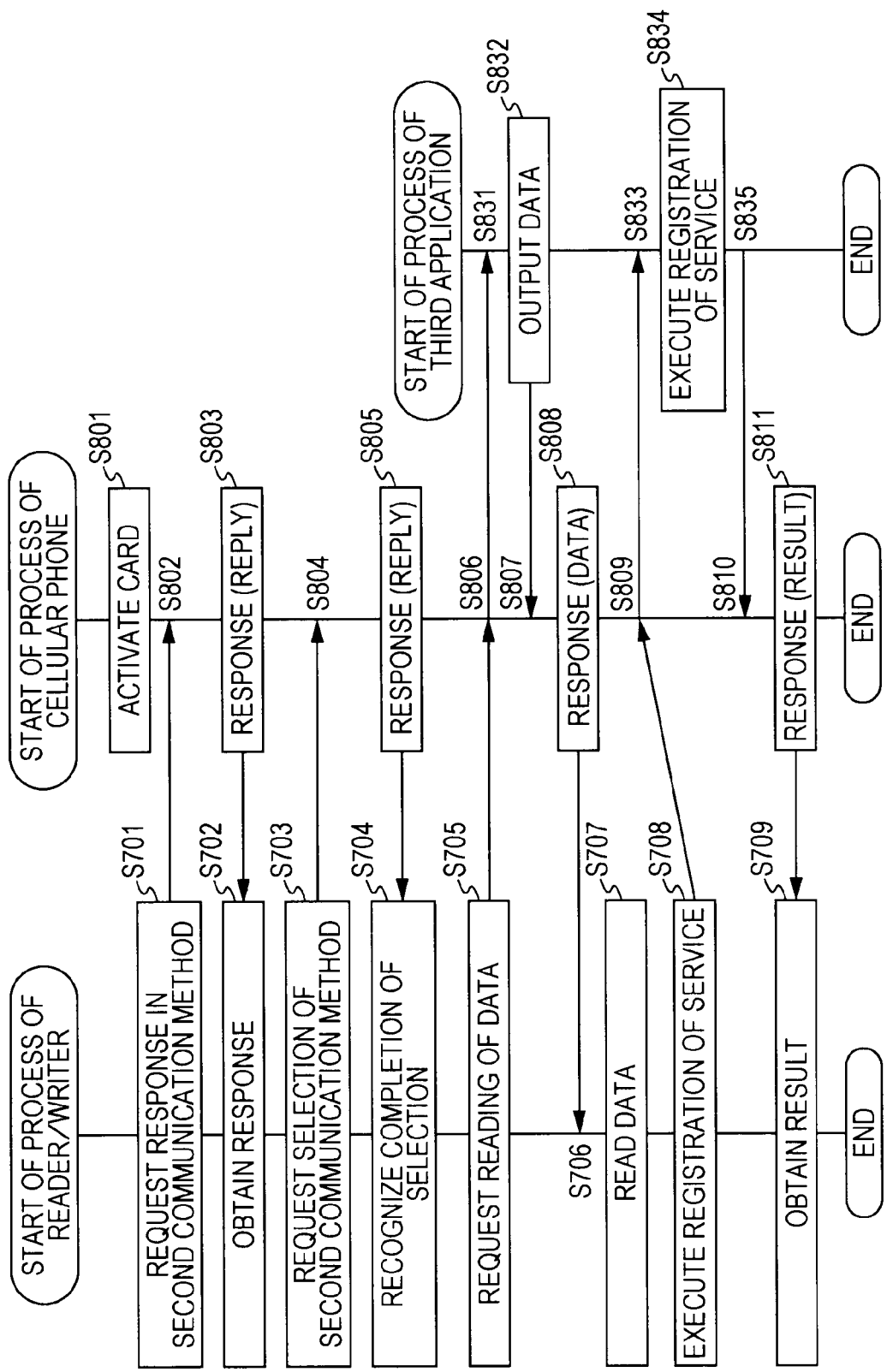
FIG. 28 is a flowchart illustrating still another registration of a service and a service name.
Figure 29:
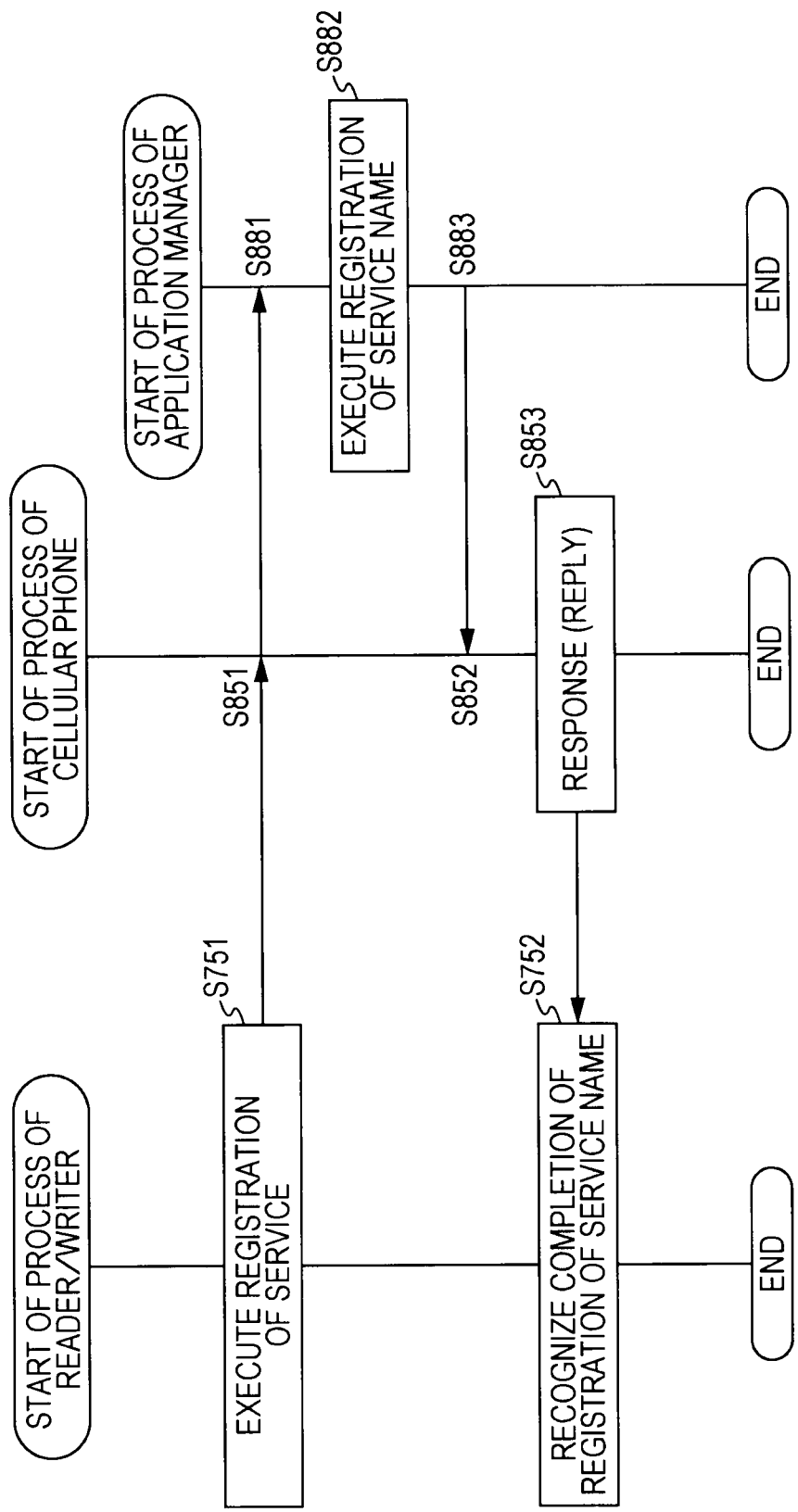
FIG. 29 is a flowchart illustrating yet another registration of a service and a service name.

A process from step S1001 to step S1009 performed by the reader/writer 202 is the same as that performed in step S701 to step S709 illustrated in FIG. 28. That is, the same process may be performed to register a service by the reader/writer 202 irrespective of whether the UICC 222 includes the application manager 601. This means that the UICC 222 may register a service using the same infrastructure irrespective of whether the UICC 222 includes the application manager 601.

A process from step S1111 to step S1115 executed by the cellular phone 201 is the same as the process from step S801 to step S805 illustrated in FIG. 28. That is, setting for communication using the second communication method in the process performed by the reader/writer 202 and setting for the communication using the second communication method in the process performed by the cellular phone 201 are not changed irrespective of whether the UICC 222 includes the application manager 601.

As a result of the processes, when the communication is available using the second communication method, the reader/writer 202 requests the cellular phone 201 (the CLF 224) to read data in step S1005. When receiving the request for reading data from the reader/writer 202 in step S1116, the cellular phone 201 (the CLF 224) transfers the request to the application manager 601 and is received in step S1151.

In step S1152, the application manager 601 outputs the requested data to the CLF 224. When receiving the data in step S1117, the CLF 224 transmits a response for the request from the reader/writer 202 in step S1118. When receiving the data from the cellular phone 201 (the CLF 224) as the response in step S1006, the reader/writer 202 reads the data on a service to be registered in step S1007.

In this case, since the registration of the service is performed using the APDU command in the second communication method, a process of packetizing the data for the registration of the service into an APDU command format and transmitting the data to the cellular phone 201 using the second communication method is executed in step S1008. When receiving the data for the registration of the service from the reader/writer 202 in step S1119, the cellular phone 201 (the CLF 224) supplies the received data to the application manager 601.

In step S1153, the application manager 601 transfers the supplied data to the third application 256. When receiving the supplied data in step S1181, the third application 256 executes a process of registering a service in step S1182. In step S1182, the third application 256 executes the service registration, and as a result, when the process has been successfully performed or when the process has failed, the result of the registration process is supplied to the application manager 601 in step S1183.

The application manager 601 receives the result from the third application 256 in step S1154 and supplies the result of the registration process to the CLF 224 in step S1155. When receiving the result in step S1120, the CLF 224 transmits the result of the registration process of the third application 256 to the reader/writer 202 as a response in step S1121. In step S1009, the response from the cellular phone 201 is received by the reader/writer 202 whereby the process of registering a service is terminated.

As described above, the reader/writer 202 performs on the UICC 222 including the application manager 601 a process the same as the process performed on the UICC 222 which does not include the application manager 601 so that the registration of a service is performed.

After the service registration is performed as described above, a process of registering a service name is subsequently performed. Since the process is the same as that in the flowchart illustrated in FIG. 29, a description of the process is omitted. That is, the process of registering a service name to the UICC 222 which includes the application manager 601 is performed similarly to the process of registering a service to the UICC 222 which does not include the application manager 601.

In other words, since the registration of a service name is performed by the application manager 252, the application manager 601 does not perform a process, and therefore, the cellular phone 201 registers a service name through a process similar to that in the case where the UICC 222 does not include the application manager 601.

Registration of Service and Service Name Using Additional Function

Next, registration of a service and a service name using an additional function will be described with reference to a flowchart illustrated in FIG. 32. Here, a case where it is determined that the third communication method is available but it is determined that the APDU command format in the third communication method is not available, and the 3-1 service 257 provided by the third application 256 is registered will be described as an example.

The case where it is determined that the third communication method is available but the APDU command format in the third communication method is not available corresponds to a case where it is determined that a packet unique to the third application 256 is to be transmitted/received. The determination is made when it is determined that registration and update are realized using an additional function in step S163 as a result of execution of the process of the flowchart illustrated in FIG. 20, for example.

Figure 32:
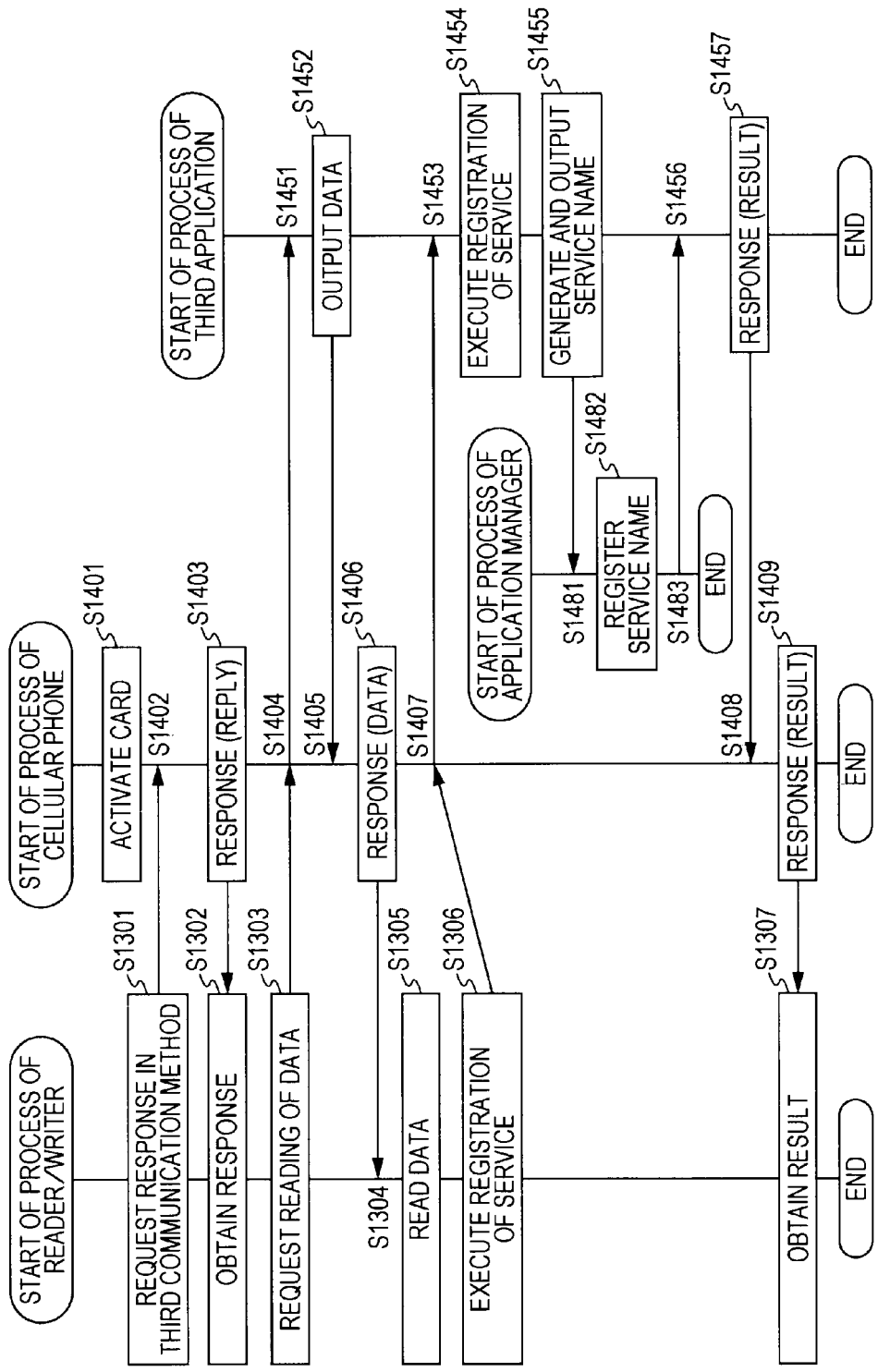
FIG. 32 is a flowchart illustrating still further registration of a service and a service name.

In a process in the flowchart illustrated in FIG. 32, a process from step S1301 to step S1307 executed by the reader/writer 202 is the same as the process from step S551 to step S557 in the flowchart illustrated in FIG. 26. Therefore, detailed descriptions thereof are omitted. Furthermore, in the process in the flowchart illustrated in FIG. 32, since a process from step S1401 to step S1409 executed by the cellular phone 201 is the same as the process from step S601 to step S609 in the flowchart illustrated in FIG. 26, a description thereof is omitted.

Furthermore, in the process in the flowchart illustrated in FIG. 32, since the process from step S1451 and step S1452 executed by the third application 256 is the same as the process from step S631 and step S632 in the flowchart illustrated in FIG. 26, a description thereof is omitted.

In step S1453, the third application 256 receives a third command regarding the registration of a service transmitted as a third packet from the reader/writer 202, and in step S1454, the third application 256 executes service registration in accordance with the third command. After terminating the registration of the service, the third application 256 generates a service name in step S1455 and outputs the service name to the application manager 252.

That is, in this case, the third application 256 processes the command supplied from the reader/writer 202 so as to generate a service name (information on the service) and supplies the service name to the application manager 252.

Referring back to FIG. 9, when only a packet conforming to a communication protocol of the third application 256 is allowed to be transmitted/received, a unique packet is transmitted/received using the UICC hardware 251. That is, a third packet supplied from the reader/writer 202 is received by the CLF 224 and further supplied from the CLF 224 through the UICC hardware 251 to the third application 256. Therefore, since the third application 256 may be accessed, the 3-1 service 257 provided by the third application 256 may be registered.

However, since a communication protocol used to access the application manager 252 does not exist, the registry 253 may not be directly accessed from the reader/writer 202. On the other hand, the third application 256 has the communication path 354 used to access the registry 253.

Therefore, the third application 256 issues an instruction to the application manager 252 and the application manager 252 updates the information included in the registry 253. That is, in this case, by the process of the third application 256, information such as a service name, a service type, and the like is registered in the registry 253.

For the registration, the third application 256 generates a service name in step S1455 (illustrated in FIG. 32). Data used to generate the service name is supplied from the reader/writer 202. A process of supplying the data may be performed when the service registration is executed in step S1306 or the data may be automatically generated from data provided by the third application in advance. Accordingly, the reader/writer 202 transmits the data used to register the service and the data used to register the service name to the cellular phone 201 (the third application 256) using the third packet.

Furthermore, a command causing the third application 256 to generate a service name may be provided and the command may be transmitted from the reader/writer 202. At a timing when the service is registered, the third application may automatically continue the process. Furthermore, the third application 256 recognizes such a command and executes a process. In step S1455, such a command is interpreted by the third application 256 so that a service name is generated and is output to the application manager 252.

In step S1481, the application manager 252 receives the service name and the command for instructing to register the service name from the third application 256 through the API (Application Program Interface). In step S1482, the application manager 252 registers the received service name in the registry 253 in accordance with the received command. After the registration is terminated, data representing that the registration is terminated is output to the third application 256 in step S1483.

When receiving the data representing that the registration is terminated from the application manager 252 in step S1456, the third application 256 outputs the data representing that the registration of the service and the registration of the service name have been terminated to the CLF 224 as a response in step S1457. When receiving the response from the third application 256 in step S1408, the CLF 224 transfers the response to the reader/writer 202 in step S1409.

The reader/writer 202 receives the response in step S1307 and interprets the response so as to recognize that the registration process is terminated.

As described above, the process of registering a service name is executed using the third application 256. To realize the process, a service may be defined as below.

Pattern 1: As described above, a command which is to be interpreted by the third application 256 is provided. In Pattern 1, a definition in which a start command representing a start of a service registration and an end command representing an end of the service registration are prepared, and transmissions and receptions of service registration data between the start and the end are collectively used as a service unit is considered.

Pattern 2: A series of operations of generating a service region is automatically detected as a single service unit. In this case, a service region generated by a single command or a single unit including commands integrally connected to one another is determined as a service unit.

In addition to the definition of a service, a method for supplying a service name of the service, that is, a method for generating and registering a service name performed in step S1455 should be also defined.

Pattern 1: A command for instructing generation and registration of a service name is provided and the command is set to be interpreted by the third application 256. By transmitting the command from the reader/writer 202, the registration of a service may be performed by the third application 256.

Pattern 2: A new region is provided and a service name is registered. In Pattern 2, a definition block including a service name is defined, content thereof is interpreted, and the registry 253 of the application manager 252 is updated. Also in this case, the reader/writer 202 should perform writing on the block, that is, the reader/writer 202 should perform input. In other words, since update is performed by the input performed by the reader/writer 202, the reader/writer 202 may control an updating timing.

Pattern 3: A correspondence table may be stored for registration of a service name. In Pattern 3, a correspondence table including numbers used to identify regions and services, such as system codes or service codes, and service names is stored in the third application 256. When a service is registered, an identification number corresponding to the service and a service name are read from the correspondence table so that the service name is registered. Furthermore, when a service which is not included in the stored correspondence table is newly provided, the correspondence table itself is updated. The update of the correspondence table may be performed by executing a process of transmitting a command from the reader/writer 202, for example.

The process of generating a service name and the process of registering a service name are performed using one of the patterns. The third application 256 registers the generated service name to the registry 253 through the API.

Process of Displaying Service Name

Figure 33:
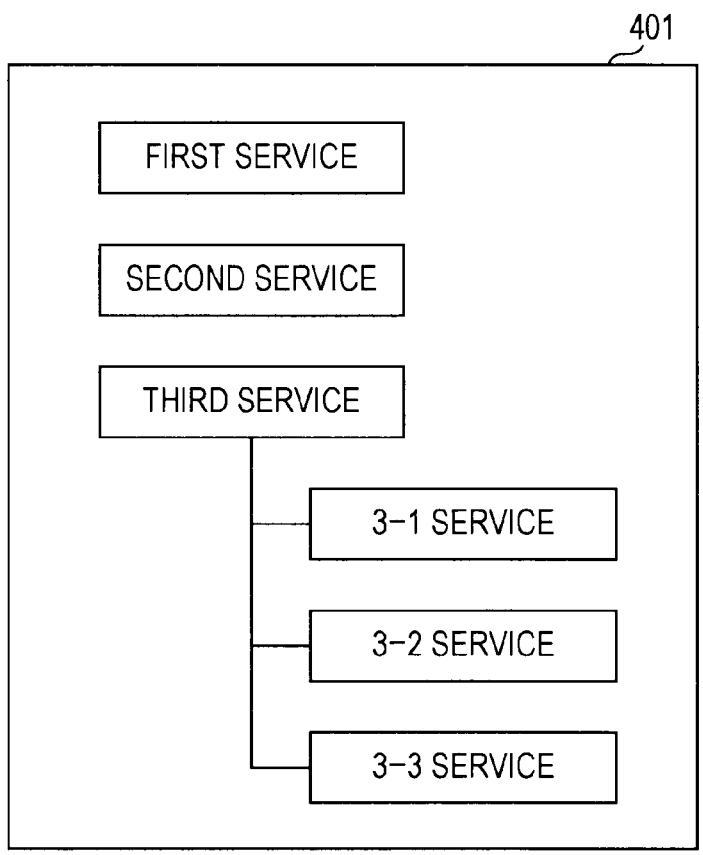
FIG. 33 is a diagram illustrating display of service names.
Figure 34:
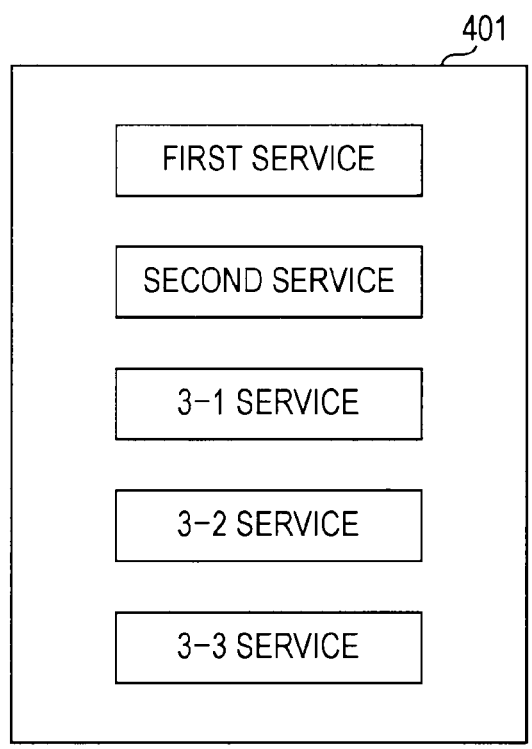
FIG. 34 is a diagram illustrating another display of service names.

The service and the service name are registered as described above, and information on the registered service is displayed on a screen illustrated in FIG. 33 or FIG. 34 for the user using the viewer 241.

As shown in FIG. 33, the viewer 241 recognizes the first to third applications 254, 255, and 256 which are recognized by the application manager 252. Furthermore, since the processes described above are performed, information representing that the 3-1 service 257, the 3-2 service 258, and the 3-3 service 259 are associated with the service of the third application 256 is registered in the registry 253, the viewer 241 recognizes the services.

As a result of the recognition, the viewer 241 causes the display 401 to display a name "first service" of a service provided by the first application 254, a name "second service" of a service provided by the second application 255, and a name "third service" of a service provided by the third application 256.

Furthermore, the third application 256 is an integrated service and provides the 3-1 service 257, the 3-2 service 258, and the 3-3 service 259. Since information on the services is also recognized by referring to the registry 253, the information is also displayed in the display 401.

Specifically, as illustrated in FIG. 33, a name "3-1 service" corresponding to the 3-1 service 257, a name "3-2 service" corresponding to the 3-2 service 258, and a name "3-3 service" corresponding to the 3-3 service 259 are displayed below the name "third service" corresponding to the third application 256 so as to be associated with the name "third service".

With this display, the user recognizes that the third service includes the three services, i.e., the 3-1 service, the 3-2 service, and the 3-3 service. Such display is enabled when the registry 253 manages the service names corresponding to the 3-1 service 257, the 3-2 service 258, and the 3-3 service 259.

Another display example is illustrated in FIG. 34. In the display example illustrated in FIG. 34, the name "first service" of the service provided by the first application 254 and the name "second service" of the service provided by the second application 255 are displayed in the display 401. Furthermore, the name "3-1 service" corresponding to the 3-1 service 257, the name "3-2 service" corresponding to the 3-2 service 258, and the name "3-3 service" corresponding to the 3-3 service 259 are displayed below the name "second service".

With this display, the user recognizes the five services including the first service, the second service, the 3-1 service, the 3-2 service, and the 3-3 service. In this case, the user recognizes the 3-1 service, the 3-2 service, and the 3-3 service on the same level as the first and second services without recognizing that the third application 256 provides the three services. Such display is enabled when the registry 253 manages the service names corresponding to the 3-1 service 257, the 3-2 service 258, and the 3-3 service 259.

The display states are different from each other depending on a method for managing service names. Accordingly, the method for managing service names will be described, where the term "AID" is an abbreviation for Application Identifier. First, a case where dummy AIDs are assigned to the services and the services are managed using the dummy AIDs will be described. Furthermore, when the dummy AIDs are written to the registry 253, information on the services is managed by the registry 253.

In a case where a plurality of applications are registered in the UICC 222, for example, when names of files assigned to some of the applications coincide with each other, a normal operation may not be performed and the files may be damaged. To address this problem, the application identifiers (AIDs) are assigned so that uniqueness of the applications is ensured. In this way, the applications are managed using the AIDs. Furthermore, the AIDs are unique values so that the uniqueness is ensured.

The AID is defined by ISO 7816-5, is constituted by 16 bytes including an RID of 5 bytes and a PIX of remaining 11 bytes. The RID represents a provider of an application, and is a unique ID acquired by a certain company, for example. Therefore, one company basically has one RID. The RID is an abbreviation for Registered Application Provider Identifier, and the PIX is an abbreviation for Proprietary Application Identifier Extension.

The PIX is an ID which may be uniquely employed by a company to which the RID is assigned. Therefore, the third application 256 generates a dummy AID in accordance with a rule below. The dummy AID is assigned to an application which does not actually exist. Furthermore, the dummy AID is used to display an application registered in the UICC 222 using the viewer 241.

Therefore, the dummy AID is not selected by the user to activate an application. Furthermore, the services included in the third application 256 do not have AIDs.

Then, the dummy AID is configured as follows:

Dummy AID=(RID)+(value assigned to third application 256 (portion of PIX))+(unique service number defined by company (portion of PIX))

The dummy AID configured as described above does not affect another application. Since the dummy AID is written in the registry 253, the dummy AID may be configured within a framework of the third application 256 without being affected by an application other than the third application 256, for example, the first application 254. Therefore, when an application is to be called by specifying the dummy AID, the third application may be called since the dummy AID partially coincides with the AID of the third application which is a source of the dummy AID.

The dummy AIDs configured as described above are registered in the registry 253 from the third application 256 through the API. Since the viewer 241 recognizes the dummy AIDs managed by the registry 253, the viewer 241 recognizes applications to which the dummy AIDs are assigned.

In this case, services are assigned to the dummy AIDs, and accordingly, the viewer 241 recognizes the registered services. Since such recognition is enabled, the screen provided through the process performed by the viewer 241 may correspond to the screen illustrated in FIG. 33 or FIG. 34.

Depending on the configuration of the dummy AID and a method for assigning the dummy AIDs to the services, the services realized by the corresponding applications may be displayed in a layered manner or may be displayed in the same layer.

Advantages

As described above, even when the services provided by the third application 256 are individually registered in the UICC 222, for example, the individual services may be recognized by the viewers 241 which are employed in different cellular phones 201 in common. Since such recognition is realized, a screen used by the user to recognize the individual services may be displayed as described above.

Furthermore, the individual services may be displayed in the same layer of the services provided by the other applications for the user. Furthermore, even when a new service is registered, the service may be displayed in the same layer of the services which have been registered. Alternatively, as illustrated in FIG. 33, the services provided by the certain application may be displayed in a layered manner so as to be associated with the application.

Furthermore, when the services are recognized, corresponding applications may be additionally registered where appropriate. That is, a degree of freedom may be added to the relationship between the services and the applications.

Furthermore, the registration of the services and the registration of the service names may be performed utilizing the existing infrastructure at a maximum. Therefore, even when the system is transformed so that the UICC 222 manages the services, a cost necessary for the transition may be reduced. Furthermore, since the infrastructure is sufficiently utilized, the transition of the system may be executed without considerable change. Accordingly, a confusion generated due to the system transition may be prevented for the user and developers.

Recording Medium

The series of processes described above may be executed by hardware or software. The series of processes can be executed by software by programs installed in a computer. Examples of the computer include a computer incorporated in dedicated hardware and a general personal computer capable of executing various functions by installing various programs.

Figure 35:
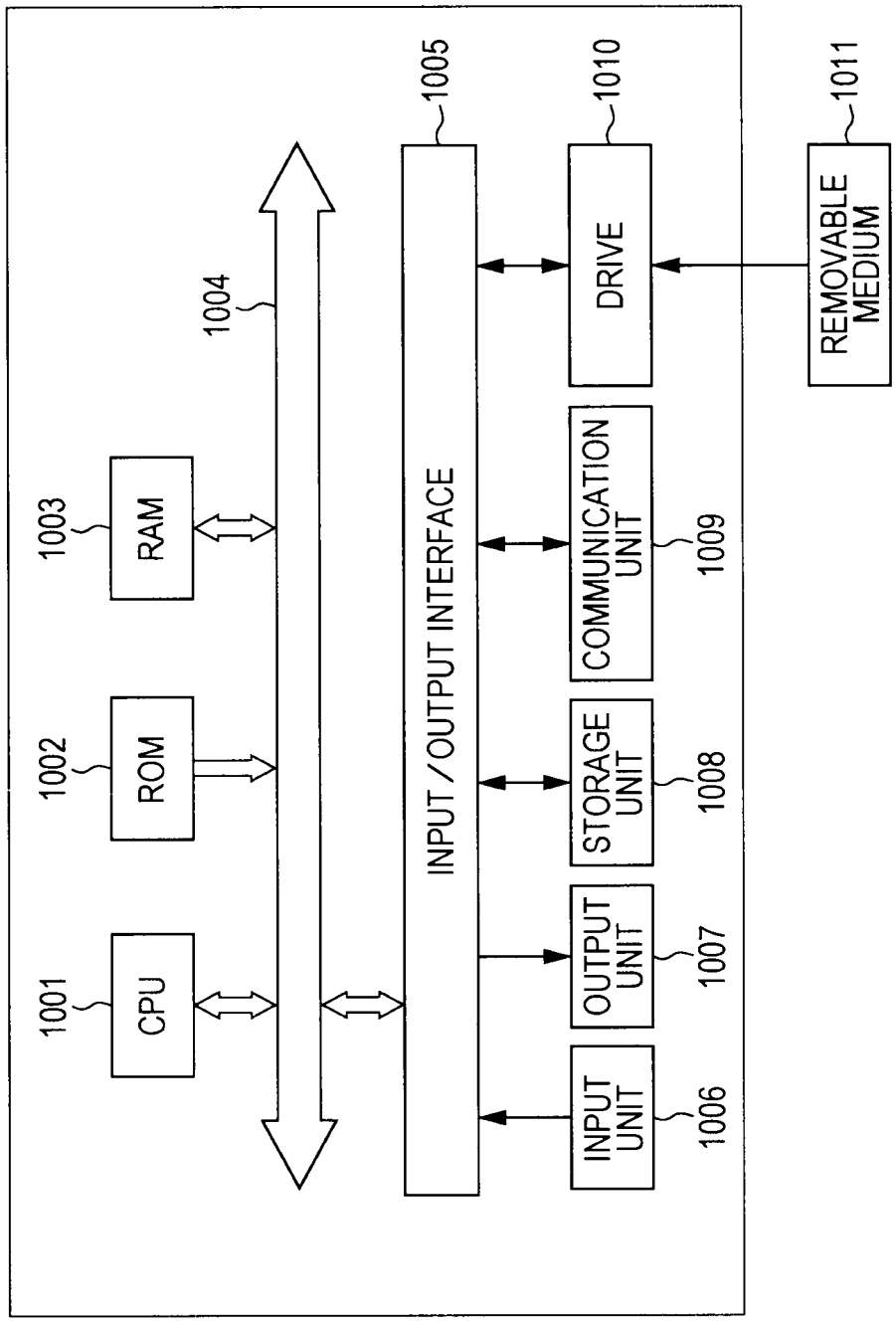
FIG. 35 is a diagram illustrating a recording medium.

FIG. 35 is a block diagram illustrating a configuration of the hardware which executes the series of processes in accordance with the programs. A CPU (Central Processing Unit) 1001, a ROM (Read Only Memory) 1002, and a RAM (Random Access Memory) 1003 can be connected to one another through a bus 1004. Furthermore, an input/output interface 1005 can be connected to the bus 1004. An input unit 1006, an output unit 1007, a storage unit 1008, a communication unit 1009, and a drive 1010 can be connected to the input/output interface 1005.

The input unit 1006 can include a keyboard, a mouse, and a microphone. The output unit 1007 can include a display and a speaker. The storage unit 1008 can include a hard disk and a nonvolatile memory. The communication unit 1009 can include a network interface. The drive 1010 can drive a removable medium 1011 such as a magnetic disk, an optical disc, a magneto-optical disc, or a semiconductor memory.

In the hardware configured as above, the CPU 1001 can load programs stored in the storage unit 1008 through the input/output interface 1005 and the bus 1004 to the RAM 1003 and execute the programs whereby the series of processes is performed.

The programs executed by CPU 1001 may be provided by being recorded in the removable medium 1011 serving as a non-transitory package medium, for example. Alternatively, the programs may be provided through a transitory wired or wireless transmission medium such as a local area network, the Internet, or digital satellite broadcasting.

In the hardware, the programs may be installed in the storage unit 1008 through the input/output interface 1005 by attaching the removable medium 1011 to the drive 1010. Alternatively, the programs may be received by the communication unit 1009 through a wireless transmission medium and installed in the storage unit 1008. Alternatively, the programs may be installed in the ROM 1002 or the storage unit 1008 in advance.

Note that the programs may be executed in a chronological order in accordance with the order described in this specification. Alternatively, the programs may be executed in parallel or at an appropriate timing when the programs are called, for example.

Furthermore, in this specification, the term system represents an entire apparatus including a plurality of devices.

The present application contains subject matter related to that disclosed in Japanese Priority Patent Application JP 2010-145734 filed in the Japan Patent Office on Jun. 28, 2010, the entire contents of which are hereby incorporated by reference.

Note that the embodiments of the present disclosure are not limited to the foregoing embodiments, and various modification may be made without departing from the scope of the present disclosure.

What is claimed is:

1. A first information-processing apparatus, comprising: circuitry configured to:
receive, from a second information-processing apparatus, a request to communicate by a first communicative method;
transmit a first command to register, in a memory at the first information-processing apparatus, a service provided by an application by the first communicative method;
receive, from the second information-processing apparatus, a request to switch from the first communicative method to a second communicative method that is different from the first communicative method,
wherein the request to switch from the first communicative method to the second communicative method is received based on an unavailability of an Application Protocol Data Unit (APDU) command format in the first communicative method; and
receive, from the second information-processing apparatus, a second command to write, in the memory at the first information-processing apparatus, a name or type of the registered service by the second communicative method different from the first communicative method.

2. The first information-processing apparatus according to claim 1, wherein the circuitry is further configured to:
receive a first packet in the first communicative method;
transmit a response based on the first packet;
receive a second packet in the first communicative method; and
stop transmission of a response based on the second packet.

3. The first information-processing apparatus according to claim 2, wherein the circuitry is further configured to:
receive a third packet in the second communicative method; and
transmit a response based on the third packet.

4. The first information-processing apparatus according to claim 2, wherein the circuitry is further configured to:
receive, before receipt of the first packet, a third packet in a third communicative method different from the first communicative method and the second communicative method; and
stop transmission of a response based on the third packet.

5. The first information-processing apparatus according to claim 2, wherein the circuitry is further configured to:

receive, before receipt of the first packet, a third packet in a third communicative method different from the first communicative method and the second communicative method;

transmit a response based on the third packet;

receive a fourth packet in the third communicative method; and stop transmission of a response based on the fourth packet.

6. The first information-processing apparatus according to claim 2, wherein the circuitry is further configured to:

receive, after receipt of the first packet and before receipt of the second packet, a third packet in a third communicative method different from the first communicative method and the second communicative method; and stop transmission of a response based on the third packet.

7. The first information-processing apparatus according to claim 1, wherein the circuitry is further configured to:

receive a request in the first communicative method from the second information-processing apparatus, transmit the request to the application; and receive from the application, based on the request, data that indicates whether the service has been registered in the memory at the first information-processing apparatus.

8. The first information-processing apparatus according to claim 1, wherein the circuitry is further configured to: receive, from the second information-processing apparatus, a first packet unique to the application in the first communicative method and indicate the first command; and transmit the first command to the application to register the service.

9. The first information-processing apparatus according to claim 8, wherein the circuitry is further configured to communicate with the application through an application manager.

10. The first information-processing apparatus according to claim 9, wherein the circuitry is further configured to:

receive a second packet that conforms to the second communicative method and includes the name or type; and transmit the second command based on receipt of the second packet that includes the name or type to the application manager to register the name or type.

11. The first information-processing apparatus according to claim 10, wherein the second packet that includes the name or type conforms to the APDU command format.

12. The first information-processing apparatus according to claim 1, wherein the first command is wrapped with the APDU command format.

13. The first information-processing apparatus according to claim 9, wherein the application is installed through the application manager by an APDU command.

14. The first information-processing apparatus according to claim 9, wherein the first command that bypasses the application manager is supplied to the application.

15. The first information-processing apparatus according to claim 8, wherein the circuitry is further configured to receive the first packet via a contactless communication with the second information-processing apparatus.

16. The first information-processing apparatus according to claim 1, further comprising a viewer that views the name or type of the service.

17. A method, comprising:

in a first information-processing apparatus:

receiving, from a second information-processing apparatus, a request to communicate via a first communicative method;

transmitting a first command to register, in a memory at the first information-processing apparatus, a service provided by an application via the first communicative method;

receiving, from the second information-processing apparatus, a request to switch from the first communicative method to a second communicative method that is different from the first communicative method, wherein the request to switch from the first communicative method to the second communicative method is received based on an unavailability of an Application Protocol Data Unit (APDU) command format in the first communicative method; and receiving, from the second information-processing apparatus, a second command to write, in the memory at the first information-processing apparatus, a name or type of the registered service via the second communicative method different from the first communicative method.

18. A first apparatus, comprising:

a card that stores an application; and a communication unit configured to:

receive, from a second apparatus, a request to communicate by a first communicative protocol of the application;

transmit a first command to register in the card a service provided by the application by the first communicative protocol of the application;

receive, from the second apparatus, a request to switch from the first communicative protocol to a second communicative protocol that is different from the first communicative protocol, wherein the request to switch from the first communicative protocol to the second communicative protocol is received based on an unavailability of an Application Protocol Data Unit (APDU) command format in the first communicative protocol; and receive, from the second apparatus, a second command to write in the card a name or type of the registered service by the second communicative protocol different from the first communicative protocol of the application.

* * * * *